(12) United States Patent
Miyajima

(10) Patent No.: US 11,610,092 B2
(45) Date of Patent: Mar. 21, 2023

(54) INFORMATION PROCESSING SYSTEM, INFORMATION PROCESSING APPARATUS, INFORMATION PROCESSING METHOD, AND RECORDING MEDIUM

(71) Applicant: SONY CORPORATION, Tokyo (JP)

(72) Inventor: Yasushi Miyajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 628 days.

(21) Appl. No.: 16/078,437

(22) PCT Filed: Dec. 21, 2016

(86) PCT No.: PCT/JP2016/088253
§ 371 (c)(1),
(2) Date: Aug. 21, 2018

(87) PCT Pub. No.: WO2017/163515
PCT Pub. Date: Sep. 28, 2017

(65) Prior Publication Data
US 2019/0050708 A1    Feb. 14, 2019

(30) Foreign Application Priority Data
Mar. 24, 2016  (JP) .............................. JP2016-059331

(51) Int. Cl.
*G06N 3/00* (2006.01)
*G06N 3/006* (2023.01)
(Continued)

(52) U.S. Cl.
CPC ............. *G06N 3/006* (2013.01); *G06Q 50/00* (2013.01); *G06Q 50/10* (2013.01); *H04L 51/02* (2013.01)

(58) Field of Classification Search
CPC ........ G06N 3/006; G06Q 50/00; G06Q 50/10; H04L 51/02
(Continued)

(56) References Cited

U.S. PATENT DOCUMENTS

2002/0010589 A1   1/2002  Nashida et al.
2007/0124721 A1*  5/2007  Cowing ................ G06F 16/487
                                                                  717/100
(Continued)

FOREIGN PATENT DOCUMENTS

CN    103152375 A    6/2013
JP    2001-76002 A   3/2001
(Continued)

OTHER PUBLICATIONS

"Method and system for initiating a conversation between users through a computer agent based on profile and interest of the user" ip.com Sep. 9, 2015 "IP" pp. 1-2.*
(Continued)

*Primary Examiner* — Sherrod L Keaton
(74) *Attorney, Agent, or Firm* — Oblon, McClelland, Maier & Neustadt, L.L.P.

(57) ABSTRACT

An information processing system including: a storage section that stores information about a plurality of agents capable of dialogue with a user, each agent having different attributes; a communication section that receives a message from the user from a client terminal, and also replies to the client terminal with a response message; and a control section that executes control to select a specific agent from the plurality of agents, according to an instruction from the user, record attributes of the specific agent updated according to dialogue between the specific agent and the user as the attributes of a user agent, specify a partner user who most resembles the attributes of the user agent by comparing the (Continued)

attributes of the user agent and attributes of a plurality of actually existing partner users, and notify the user of the existence of the partner user at a predetermined timing.

17 Claims, 51 Drawing Sheets

(51) Int. Cl.
  *G06Q 50/10* (2012.01)
  *G06Q 50/00* (2012.01)
  *H04L 51/02* (2022.01)
(58) Field of Classification Search
  USPC .......................................................... 706/11
  See application file for complete search history.

(56) References Cited

U.S. PATENT DOCUMENTS

| | | | |
|---|---|---|---|
| 2012/0214586 A1* | 8/2012 | Rowe | A63F 13/60 463/30 |
| 2013/0191393 A1 | 7/2013 | Ji | |
| 2013/0204707 A1* | 8/2013 | Ptucha | G06Q 30/0269 705/14.66 |
| 2015/0169336 A1* | 6/2015 | Harper | G06Q 30/0277 715/706 |
| 2016/0142541 A1* | 5/2016 | Sharpe | H04M 3/5232 379/92.01 |

FOREIGN PATENT DOCUMENTS

| | | |
|---|---|---|
| JP | 2001-195430 A | 7/2001 |
| JP | 2002-41276 A | 2/2002 |
| JP | 2002-149882 A | 5/2002 |
| JP | 2010-510577 A | 4/2010 |
| JP | 2013-539128 A | 10/2013 |

OTHER PUBLICATIONS

"Method and system for initiating a conversation between users through a computer agent based on profile and interest of the user" IP.com Sep. 9, 2015 "IP" pp. 1-2 (Year: 2015).*
Summons to Attend Oral Proceedings Pursuant to Rule 115(1) EPC issued Feb. 25, 2020 in corresponding European Patent Application No. 16 895 538.3, 9 pages.
Office Action dated Sep. 11, 2019 in European Patent Application No. 16 895 538.3 citing document AA therein, 8 pages.
International Search Report dated Feb. 7, 2017 in PCT/JP2016/088253 filed Dec. 21, 2016.
Extended European Search Report dated Mar. 13, 2019 in Patent Application No. 16895538.3, citing documents AA, AX and AY therein, 10 pages.
"Method and System for Initiating a Conversation between Users through a Computer Agent based on Profile and Interests of the Users" ip.com Journal, XP013169482, Sep. 9, 2015, pp. 1-2 and cover page.
EPO: "Notice from the European Patent Office dated Oct. 1, 2007 Concerning Business Methods" Journal Of The European Patent Office, vol. 30, No. 11, XP007905525, Nov. 1, 2007, pp. 592-593.

* cited by examiner

FIG. 1
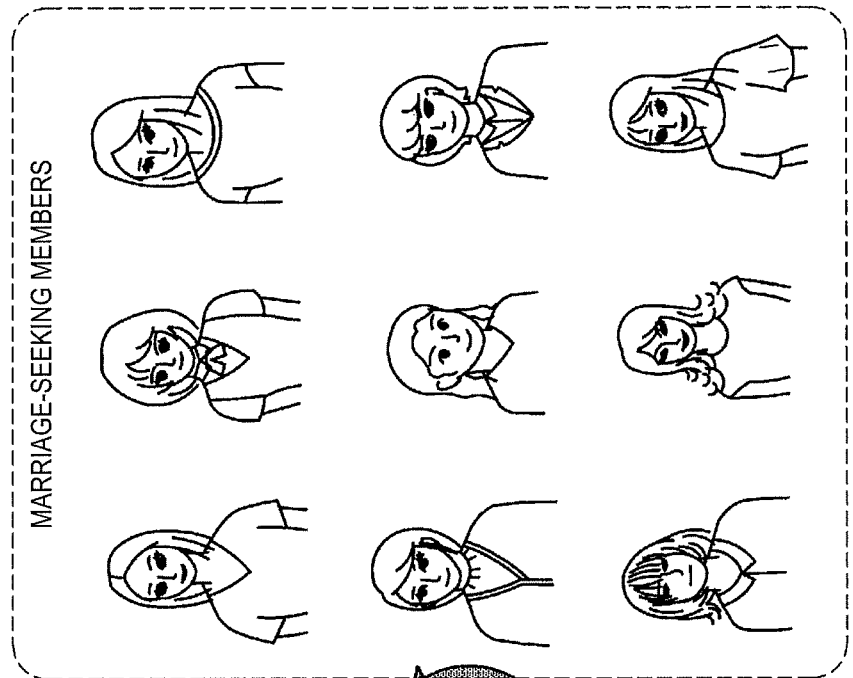
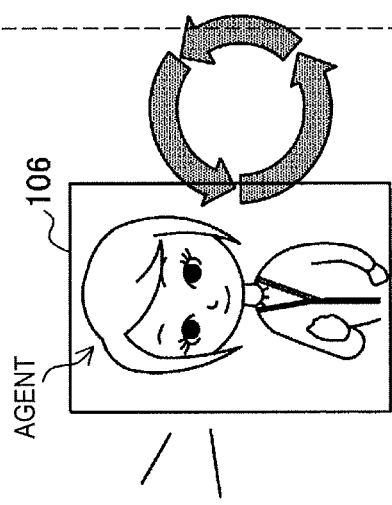
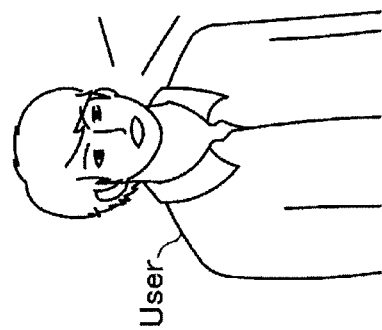

FIG. 13

| AGENT ID | QUESTION | ADVERTISEMENT CONTENT | CONDITIONS ETC. | PROBABILITY 0-1 |
|---|---|---|---|---|
| CHARACTER A | "CHOCOLATE" | "THE NEW CHOCOLATE ON SALE FROM BB CO. CONTAINS A LOT OF MILK AND IS DELICIOUS" | USER IS UNDER 30 | 0.5 |
| CHARACTER A, PERSON B | "I WANT TO EAT SOMETHING DELICIOUS" | "THEY SAY THE BARBECUE AT CC IS DELICIOUS" | YEAR-END PARTY SEASON (DECEMBER) | 0.5 |
| ALL | "I'M THIRSTY" | "AA WATER (PRODUCT NAME) IS GOOD FOR QUENCHING THIRST" | — | 0.1 |

| ITEM | VALUE | PUBLIC |
|---|---|---|
| AGE | 27 | YES |
| OCCUPATION | COMPANY EMPLOYEE | YES |
| FAMILY STRUCTURE | FATHER, MOTHER, OLDER BROTHER, YOUNGER SISTER | YES |
| LIVING WITH FAMILY MEMBERS | YES | YES |
| INCOME | 8.5 MILLION YEN | NO |
| PLACE OF RESIDENCE | S-KU | NO |
| BLOOD TYPE | O | YES |

USER BASIC INFORMATION EXAMPLE

FIG. 24B

| ITEM | VALUE | PRIORITY |
|---|---|---|
| AGE | 20 TO 30 | HIGH |
| OCCUPATION | COMPANY EMPLOYEE, SELF-EMPLOYED, HOUSEHOLD HELPER | LOW |
| FAMILY STRUCTURE | HAS SIBLINGS | MEDIUM |
| LIVING WITH FAMILY MEMBERS | LIVES ALONE | LOW |
| INCOME | NOT A CONCERN | LOW |
| PLACE OF RESIDENCE | IN T CITY | MEDIUM |
| BLOOD TYPE | NOT A CONCERN | LOW |

USER BASIC CONDITION INFORMATION EXAMPLE

FIG. 25

| NUMBER | TARGET | CATEGORY | NUMERICAL VALUE |
|---|---|---|---|
| 1 | AA TEAM | SPORTS, SPORTS TEAM | 1.0 |
| 2 | BB TEAM | SPORTS, SPORTS TEAM | -1.0 |
| 3 | CC BOMBER | MUSIC, BAND, ARTIST | 0.5 |
| 4 | "XXXXX" | SONG | -0.5 |
| 5 | D TOWN | REGION | 0.75 |
| ... | RAMEN | FOOD | 1.0 |
| N1 | EE FASHION | FASHION, APPAREL, BRAND | -0.3 |

USER PREFERENCE INFORMATION EXAMPLE

FIG. 26A

| ITEM | VALUE | PUBLIC |
|---|---|---|
| AGE | 25 | YES |
| OCCUPATION | COMPANY EMPLOYEE | YES |
| FAMILY STRUCTURE | FATHER, MOTHER, OLDER BROTHER | YES |
| LIVING WITH FAMILY MEMBERS | LIVING TOGETHER | YES |
| INCOME | 5.2 MILLION YEN | NO |
| PLACE OF RESIDENCE | M-KU | NO |
| BLOOD TYPE | B | YES |

AGENT BASIC INFORMATION EXAMPLE

FIG. 26B

| ITEM | VALUE | PRIORITY |
|---|---|---|
| AGE | 25 TO 35 | HIGH |
| OCCUPATION | EXECUTIVE, COMPANY EMPLOYEE, PUBLIC OFFICIAL | MEDIUM |
| FAMILY STRUCTURE | NOT A CONCERN | LOW |
| LIVING WITH FAMILY MEMBERS | NOT A CONCERN | LOW |
| INCOME | AT LEAST 5.0 MILLION YEN | HIGH |
| PLACE OF RESIDENCE | IN T CITY | MEDIUM |
| BLOOD TYPE | A, B, O | LOW |

AGENT BASIC CONDITION INFORMATION EXAMPLE

FIG. 27

| NUMBER | TARGET | CATEGORY | NUMERICAL VALUE |
|---|---|---|---|
| 1 | AA TEAM | SPORTS, SPORTS TEAM | 0.3 |
| 2 | BB TEAM | SPORTS, SPORTS TEAM | -0.5 |
| 3 | CC BOMBER | REGION, STATION | 1.0 |
| 4 | FF DINING | RESTAURANT, SUSHI | 1.0 |
| 5 | D TOWN | REGION | 0.75 |
| ... | SUSHI | FOOD | 1.0 |
| N2 | EE FASHION | FASHION, APPAREL, BRAND | -0.3 |

AGENT PREFERENCE INFORMATION EXAMPLE

FIG. 33A
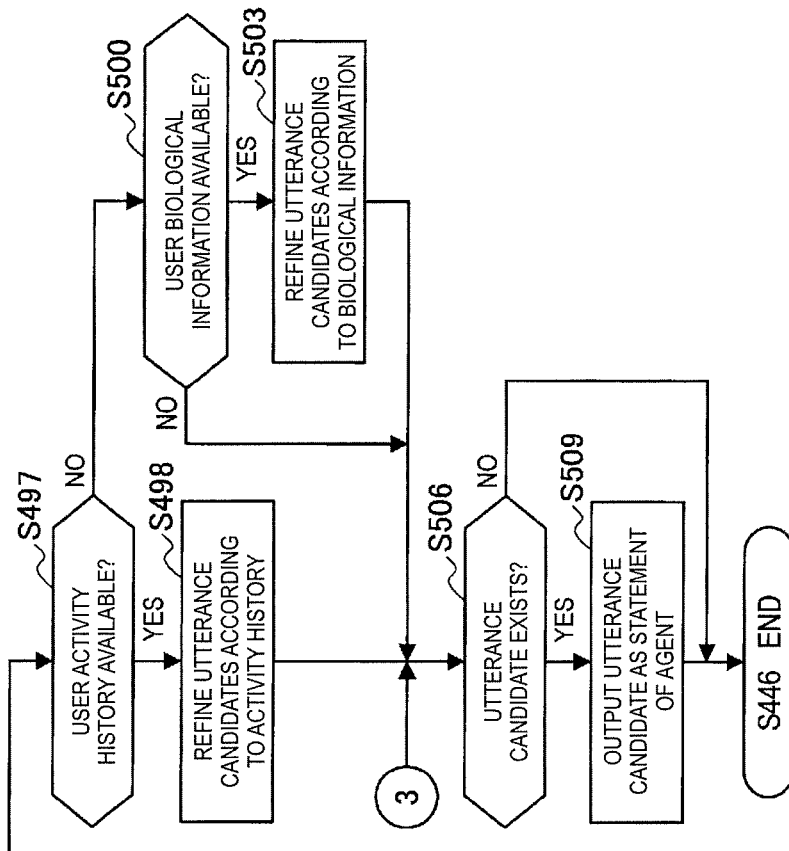
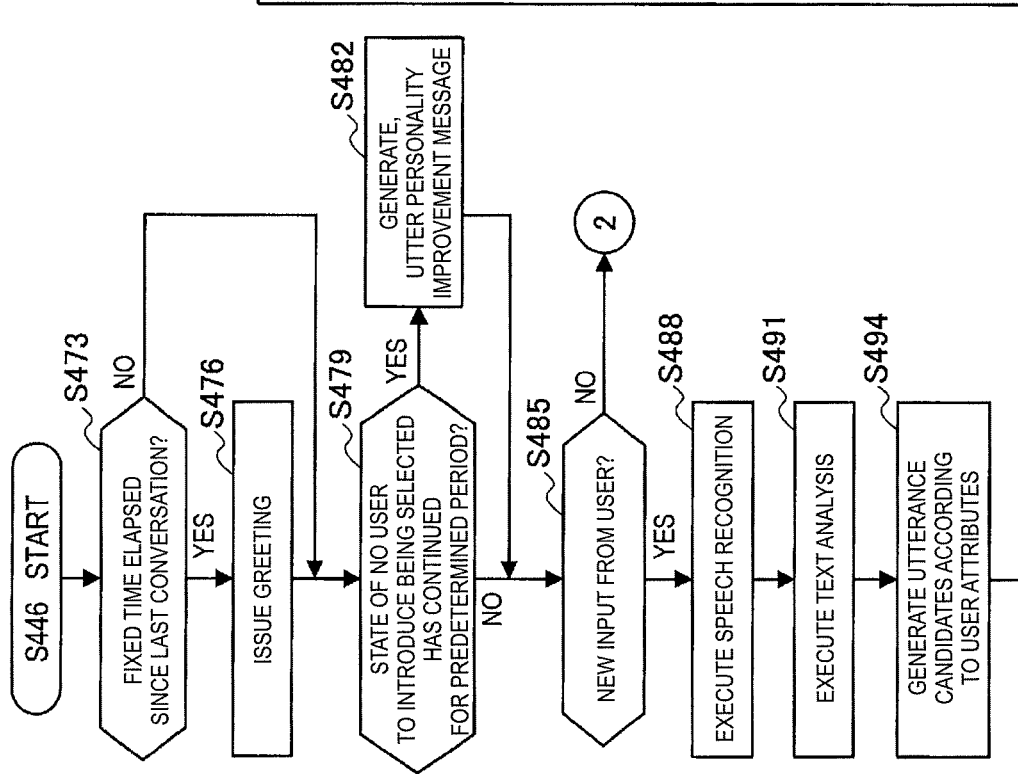

USER: "I WAS HOOKED ON THE RAMEN RANKING ON TV TODAY, AND NOW I WANT TO EAT SOME TONKOTSU RAMEN. U THINK I'LL GET FAT? I WASN'T INTERESTED IN THE LIGHT SHOYU RAMEN."

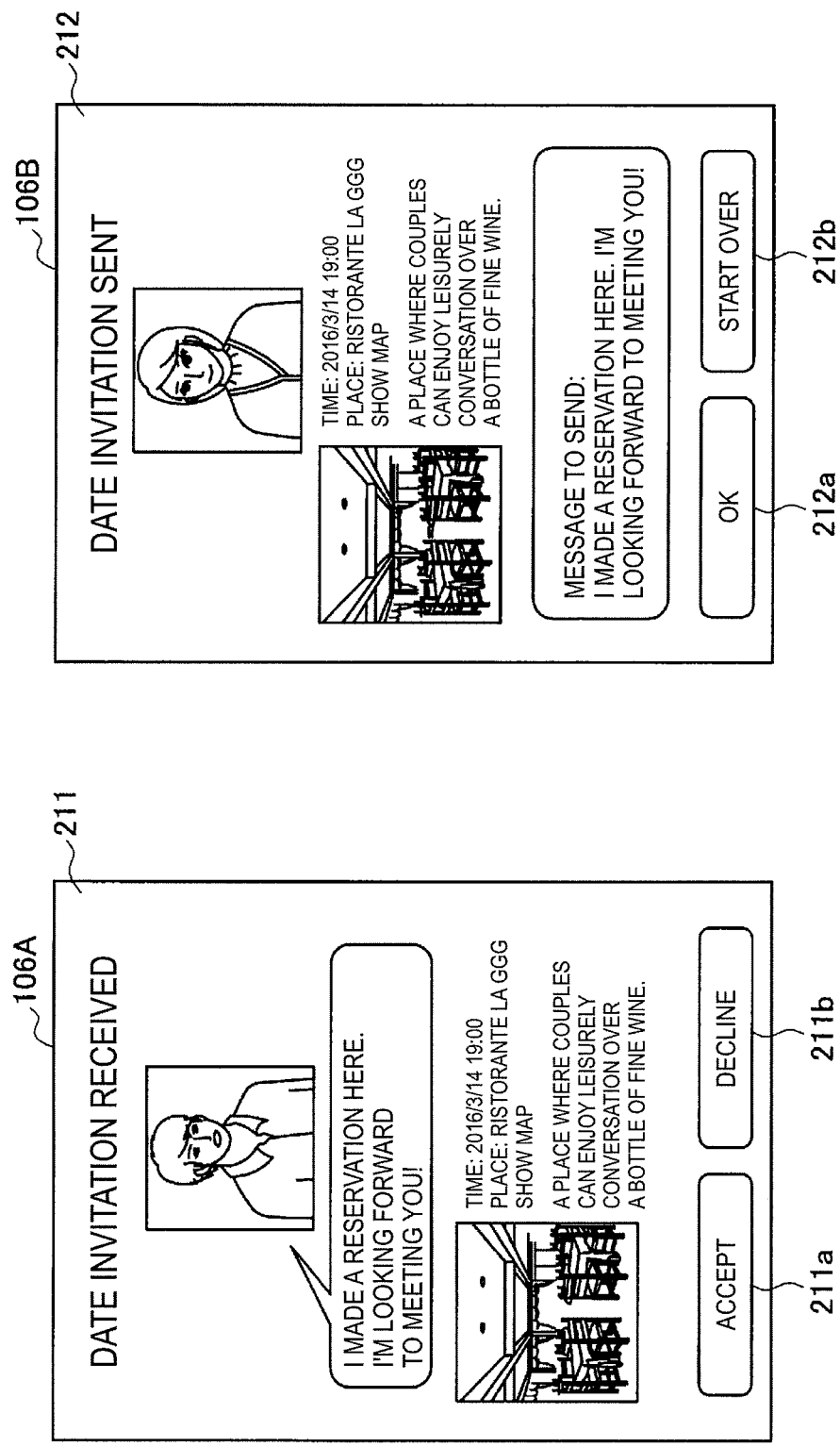

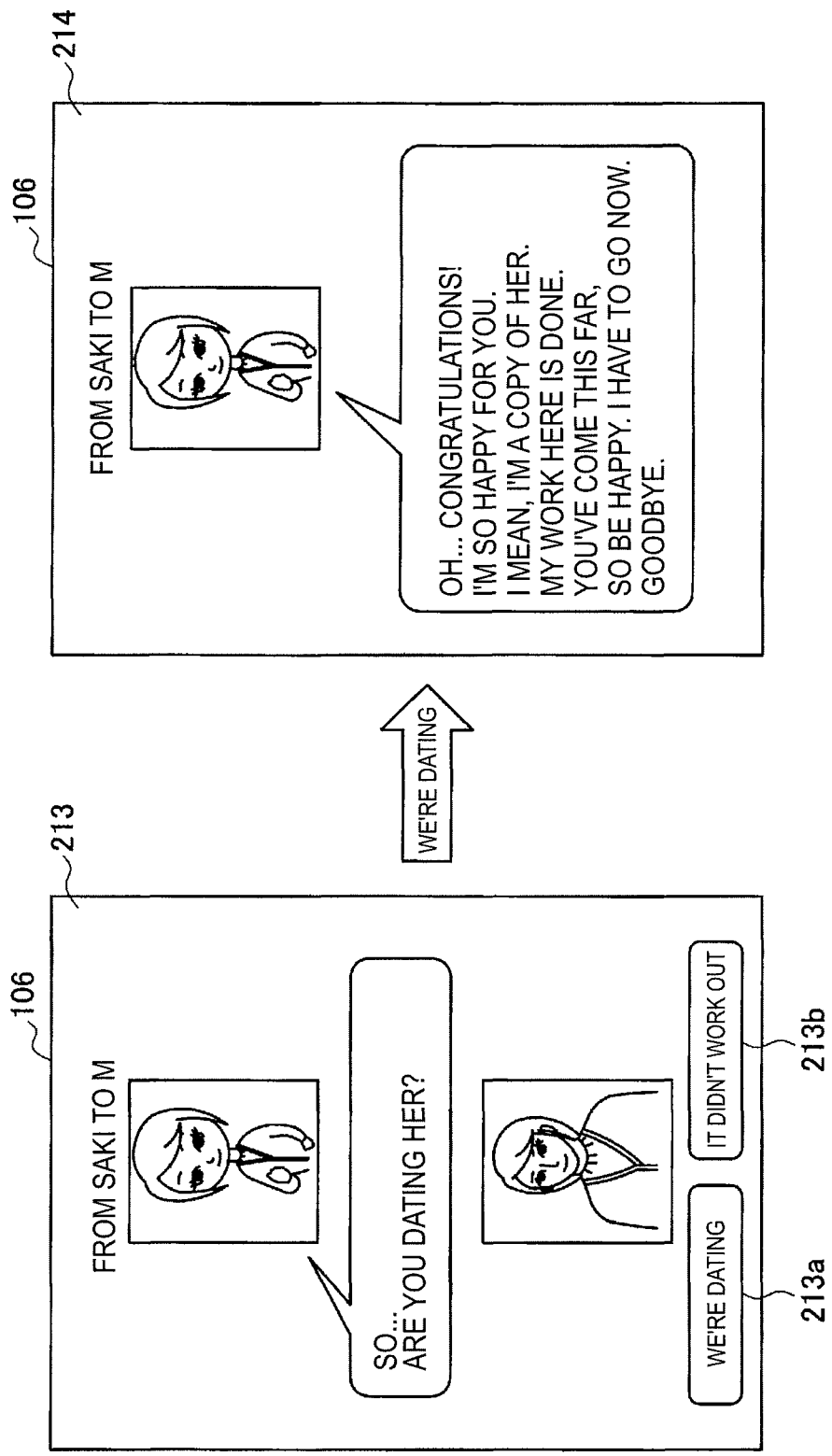

US 11,610,092 B2

INFORMATION PROCESSING SYSTEM, INFORMATION PROCESSING APPARATUS, INFORMATION PROCESSING METHOD, AND RECORDING MEDIUM

TECHNICAL FIELD

The present disclosure relates to an information processing system, an information processing apparatus, an information processing method, and a recording medium.

BACKGROUND ART

In recent years, advances in communication technologies have led to the frequent exchange of messages over networks. Using an information processing terminal such as a smartphone, a mobile phone terminal, or a tablet terminal, a user is able to check messages transmitted from other terminals, and transmit messages.

Also, an agent system that automatically responds to user messages on an information processing terminal has been proposed. Regarding such a system, for example, Patent Literature 1 below describes a system in which a personal agent for a viewer resides in a terminal of the viewer, and through daily conversation with the viewer, the agent acquires the ability to selection information preferred by the viewer.

Also, Patent Literature 2 below describes an interactive operation assistance system in which the generation of a representation and a behavioral pattern of an assistant is executed on the basis of past conversations between a user and the assistant (a user interface realized by the animation of a character), a history other exchanges, personality/emotion and learned data based on the history, and the like.

Also, Patent Literature 3 below describes a system that selects and displays first impression attributes of an online search result, such as an online dating search. Also described is a system in which latent candidates having the preferences sought by an individual are searched for in a dating service (romantic matchmaking service).

Also, Patent Literature 4 below describes a matching system in which photo data of male members and female members are stored, each member views the photo data of members of the opposite sex, and an ideal image is presented on the basis of brain waves with respect to photos of the opposite sex.

CITATION LIST

Patent Literature

Patent Literature 1: JP 2001-76002A
Patent Literature 2: JP 2002-41276A
Patent Literature 3: JP 2010-510577T
Patent Literature 4: JP 2013-539128T

DISCLOSURE OF INVENTION

Technical Problem

Herein, the agent systems of the related art have been proposed as entertainment or as practical tools having entertainment qualities, such as an agent that takes the place of a human being to become a conversation partner with a user, or to help a user with schedule management and information organization. Also, it has been possible to choose an agent from among multiple agents, and also to make the agent learn and grow in response to conversation content.

However, the agent systems of the related art are merely automatic responses by machines that imitate human beings, and communicating with the agent does not lead to a real human being.

Accordingly, the present disclosure proposes an information processing system, an information processing apparatus, an information processing method, and a recording medium capable of connecting dialogue with an agent seamlessly to communication with a person in the real world.

Solution to Problem

According to the present disclosure, there is proposed an information processing system including: a storage section that stores information about a plurality of agents capable of dialogue with a user, each agent having different attributes; a communication section that receives a message from the user from a client terminal, and also replies to the client terminal with a response message; and a control section that executes control to select a specific agent from the plurality of agents, according to an instruction from the user, record attributes of the specific agent updated according to dialogue between the specific agent and the user as the attributes of a user agent, specify a partner user who most resembles the attributes of the user agent by comparing the attributes of the user agent and attributes of a plurality of actually existing partner users, and notify the user of the existence of the partner user at a predetermined timing.

According to the present disclosure, there is proposed an information processing apparatus including: a communication section that transmits a message from a user to a server apparatus storing information about a plurality of agents capable of dialogue with the user, each agent having different attributes, and also receives a response message with respect to the message; and a control section that executes control to select a specific agent from the plurality of agents, according to an instruction by the user, and receive, from the server apparatus through the communication section at a predetermined timing, a notification indicating an existence of an actually existing partner user who most resembles the attributes of a user agent obtained by updating the attributes of the specific agent according to dialogue between the specific agent and the user.

According to the present disclosure, there is proposed an information processing method, executed by a processor, including: storing, in a storage section, information about a plurality of agents capable of dialogue with a user, each agent having different attributes; receiving a message from the user from a client terminal, and also replying by a communication section to the client terminal with a response message; and executing control to select a specific agent from the plurality of agents, according to an instruction from the user, record attributes of the specific agent updated according to dialogue between the specific agent and the user as the attributes of a user agent, specify a partner user who most resembles the attributes of the user agent by comparing the attributes of the user agent and attributes of a plurality of actually existing partner users, and notify the user of the existence of the partner user at a predetermined timing.

According to the present disclosure, there is proposed a program causing a computer to function as: a communication section that transmits a message from a user to a server apparatus storing information about a plurality of agents capable of dialogue with the user, each agent having different attributes, and also receives a response message with respect to the message; and a control section that executes control to select a specific agent from the plurality of agents, according to an instruction by the user, and receive, from the server apparatus through the communication section at a predetermined timing, a notification indicating an existence of an actually existing partner user who most resembles the attributes of a user agent obtained by updating the attributes of the specific agent according to dialogue between the specific agent and the user.

Advantageous Effects of Invention

According to the present disclosure as described above, it becomes possible to connect dialogue with an agent seamlessly to communication with a person in the real world.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram explaining a summary of a communication control system according to an embodiment of the present disclosure.

FIG. 13 is a diagram illustrating an example of advertisement information registered in an advertisement DB according to the present embodiment.

FIG. 24A is a diagram illustrating a specific example of basic information according to the example.

FIG. 24B is a diagram illustrating a specific example of basic condition information according to the example.

FIG. 25 is a diagram illustrating a user preference information example according to the example.

FIG. 26A is a diagram illustrating an agent basic information example according to the example.

FIG. 26B is a diagram illustrating an agent basic condition information example according to the example.

FIG. 27 is a diagram illustrating an agent preference information example according to the example.

FIG. 33A is a flowchart of an agent dialogue process according to the example.

FIG. 47 is a diagram illustrating an example of a meeting plan notification screen according to the example.

FIG. 48 is a diagram illustrating an example of a final congratulatory message screen by an agent according to the example.

MODE(S) FOR CARRYING OUT THE INVENTION

Figure 2:
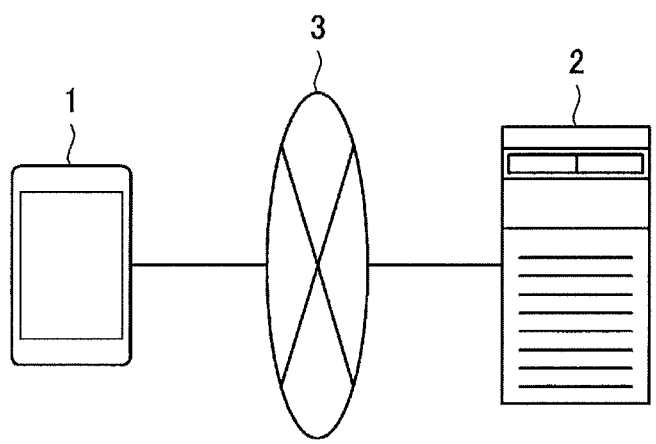
FIG. 2 is a diagram illustrating the overall configuration of the communication control system according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Summary of communication control system according to embodiment of present disclosure
2. Configuration
  2-1. System configuration
  2-2. Server configuration
3. System operating processes
  3-1. Conversation data registration process
  3-2. Phoneme DB generation process
  3-3. Dialogue control process
  3-4. Conversation DB update process
  3-5. Advertisement insertion process
4. Dialogue control process
  4-1. Configuration
  4-2. Operating processes
  4-3. Example
    (4-3-1. Preparation phase)
    (4-3-2. Search phase)
    (4-3-3. Fixing phase)
    (4-3-4. Introduction phase)
    (4-3-5. Support phase)
5. Conclusion <<1. Summary of Communication Control System According to Embodiment of Present Disclosure>>

The communication control system (agent system) according to an embodiment of the present disclosure makes it possible to connect dialogue with an agent seamlessly to communication with a person in the real world. Hereinafter, a summary of the communication control system according to the present embodiment will be described with reference to FIG. 1.

FIG. 1 is a diagram explaining a summary of the communication control system according to an embodiment of the present disclosure. The user engages in everyday dialogue with an agent having a personality, and may enjoy a variety of agent services depending on the situation, such as providing recommendations about the real world, content on the Internet, or the like, providing information such as news, weather forecasts, and the like, providing games, giving directions, and the like. Dialogue with the agent is executed through the display section 106, for example, and an image of the agent and conversation may be displayed on the display section 106. Also, agent speech is played back from a speaker (not illustrated). User utterances are collected by a microphone (not illustrated), and subjected to language analysis on the agent system side.

Also, in the present embodiment, multiple agent characters, each having a different personality, are prepared as the agent, and the user selects and purchases an arbitrary agent character to utilize the agent service through the agent character.

(Background)

Herein, the agent systems of the related art have been proposed as entertainment or as practical tools having entertainment qualities, such as an agent that takes the place of a human being to become a conversation partner with a user, or to help a user with schedule management and information organization. Also, it has been possible to choose an agent from among multiple agents, and also to make the agent learn and grow in response to conversation content.

However, the agent systems of the related art are merely automatic responses by machines that imitate human beings, and communicating with the agent does not lead to a real human being.

Accordingly, the present disclosure proposes an agent system directed at the real world in which the system matches, according to dialogue between a user and an agent, a real person having a personality and preferences similar to the agent, and seamlessly connects to communication and a meeting with the real person. By connecting with not only a virtual person (agent), but also a real person, it is possible to give the user an enriched lifestyle and sense of emotional satisfaction in the original human sense.

In addition, the communication control system according to the present embodiment is not limited to a speech agent that responds by speech, and may also be a text-supporting agent that responds in a text-based manner on the client terminal, such as a smartphone, or the like.

Also, the communication control system according to the present embodiment may be installed in an information processing apparatus such as a smartphone, a tablet terminal, or a PC, and may also be built into a home system, an in-vehicle system, or a client-server system including a client terminal and a server. In addition, the communication control system according to the present embodiment may also be installed in an anthropomorphic device, such as a robot. In the case of a robot, in addition to speech dialogue, expression control and action control may also be executed.

<<2. Configuration>>

<2-1. System Configuration>

Next, an overall configuration of the communication control system according to the present embodiment described above will be described with reference to FIG. 2. FIG. 2 is a diagram illustrating the overall configuration of the communication control system according to the present embodiment.

As illustrated in FIG. 2, the communication control system according to the present embodiment includes a client terminal 1 and an agent server 2.

The agent server 2 connects to the client terminal 1 through a network 3, transmitting and receiving data. Specifically, the agent server 2 generates response speech with respect to uttered speech collected and transmitted by the client terminal 1, and transmits the response speech to the client terminal 1. The agent server 2 includes a phoneme database (DB) corresponding to one or more agents, and is capable of generating response speech in the voice of a specific agent. Herein, the agents may be characters from a comic book, anime, game, drama, movie, or the like, person such as celebrities, historical figures, or the like, but may also be average persons of different generations, without being specific individuals, for example. Additionally, the agents may also be animals or anthropomorphic characters. Additionally, the agents may also be a person reflecting the personality of the user oneself, or persons reflecting the personality of the user's friends, family members, acquaintances, or the like.

Also, the agent server 2 is capable of generating response content reflecting the personality of each agent. Through the agent, the agent server 2 may a variety of services through dialogue with the user, such as management of the user's schedule, the transmission and reception of messages, and information provision.

Note that the client terminal 1 is not limited to a smartphone as illustrated in FIG. 2, and may also be, for example, a mobile phone terminal, a tablet terminal, a personal computer (PC), a game console, a wearable terminal (such as smart eyeglasses, a smart band, a smart watch, or a smart neckband), or the like. Additionally, the client terminal 1 may also be a robot.

The above describes a summary of the communication control system according to the present embodiment. Next, the configuration of the agent server 2 of the communication control system according to the present embodiment will be described specifically with reference to FIG. 3.

<2-2. Agent Server 2>

Figure 3:
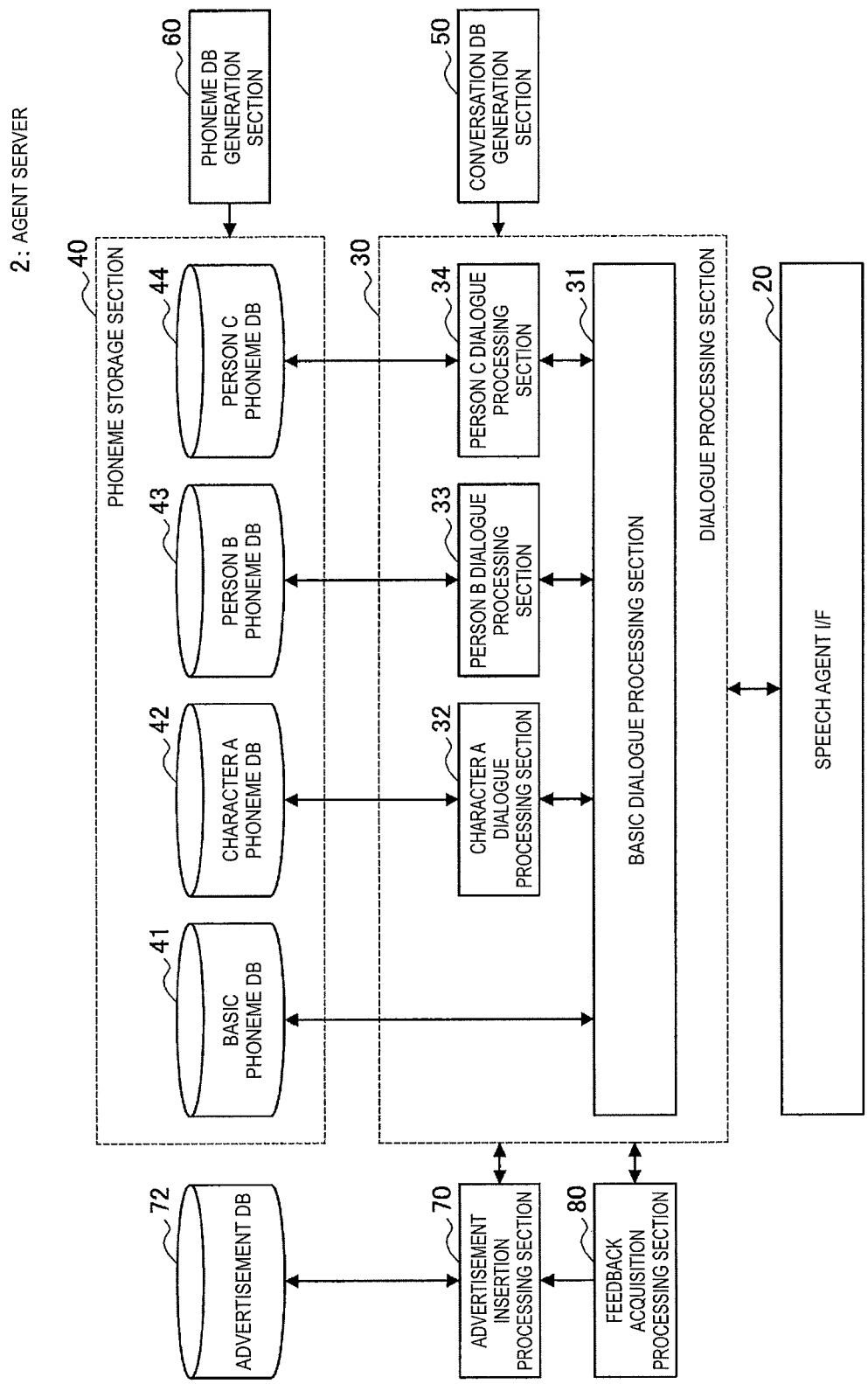
FIG. 3 is a block diagram illustrating an example of a configuration of a speech agent server according to the present embodiment.

FIG. 3 is a block diagram illustrating an example of the configuration of the agent server 2 according to the present embodiment. As illustrated in FIG. 3, the agent server 2 includes a speech agent interface (I/F) 20, a dialogue processing section 30, a phoneme storage section 40, a conversation DB generation section 50, a phoneme DB generation section 60, an advertisement insertion processing section 70, an advertisement DB 72, and a feedback acquisition processing section 80.

The speech agent I/F 20 functions as an input/output section of speech data, a speech recognition section, and a speech generation section. For the input/output section, a communication section that transmits and receives with the client terminal 1 through the network 3 is anticipated. The speech agent I/F 20 is capable of receiving the user's uttered speech from the client terminal 1, and converting the speech to text by speech recognition. In addition, the speech agent I/F 20 converts response data (text) of the agent output from the dialogue processing section 30 into speech by using phoneme data corresponding to the agent, and transmits the generated response speech of the agent to the client terminal 1.

The dialogue processing section 30 functions as a computational processing device and control device, and controls overall operation inside the agent server 2 by following various programs. The dialogue processing section 30 is realized by an electronic circuit such as a central processing unit (CPU) or a microprocessor, for example. In addition, the dialogue processing section 30 according to the present embodiment functions as a basic dialogue processing section 31, a character A dialogue processing section 32, a person B dialogue processing section 33, and a person C dialogue processing section 34.

The character A dialogue processing section 32, the person B dialogue processing section 33, and the person C dialogue processing section 34 realize dialogue specialized for each agent. Herein, "character A", "person B", and "person C" are given as an example of the agents, but the present embodiment obviously is not limited thereto, and may also include dialogue processing sections that realize dialogue specialized for each of an even greater number of agents. The basic dialogue processing section 31 realizes general-purpose dialogue that is not specialized for each agent.

Herein, a basic configuration common to the basic dialogue processing section 31, the character A dialogue processing section 32, the person B dialogue processing section 33, and the person C dialogue processing section 34 will be described with reference to FIG. 4.

Figure 4:
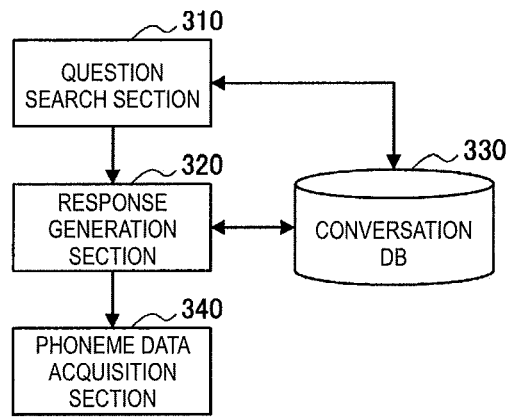
FIG. 4 is a diagram illustrating an exemplary configuration of a dialogue processing section according to the present embodiment.

FIG. 4 is a diagram illustrating an exemplary configuration of a dialogue processing section 300 according to the present embodiment. As illustrated in FIG. 4, the dialogue processing section 300 includes a question search section 310, a response generation section 320, a phoneme data acquisition section 340, and a conversation DB 330. In the conversation DB 330, conversation data containing pairs of question data and response data is saved. In a dialogue processing section specialized for an agent, conversation data specialized for the agent is saved in such a conversation DB 330, whereas in the general-purpose dialogue processing section, general-purpose conversation data (that is, basic conversation data) not specialized for an agent is saved in such a conversation DB 330.

The question search section 310 searches the conversation DB 330 for question data matching a question obtained by recognizing question speech (one example of uttered speech) of the user output from the speech agent I/F 20 and converting the speech to text. The response generation section 320 extracts, from the conversation DB 330, response data saved in association with the question data returned by the search by the question search section 310, and generates response data. The phoneme data acquisition section 340 acquires, from the phoneme storage section 40 of the corresponding agent, phoneme data for converting the response generated by the response generation section 320 to speech. For example, in the case of the character A dialogue processing section 32, phoneme data for playing back the response data in the voice of the character A is acquired from a character A phoneme DB 42. Subsequently, the dialogue processing section 300 outputs the generated response data and the acquired phoneme data to the speech agent I/F 20.

The phoneme storage section 40 stores a phoneme database for generating speech for each agent. The phoneme storage section 40 may be realized by read-only memory (ROM) and random access memory (RAM). In the example illustrated in FIG. 3, a basic phoneme DB 41, a character A phoneme DB 42, a person B phoneme DB 43, and a person C phoneme DB 44 are stored. In each phoneme DB, sub-phonetic segments and their control information, namely a prosody model, for example, are stored as phoneme data.

The conversation DB generation section 50 includes a function of generating the conversation DB 330 of the dialogue processing section 300. For example, the conversation DB generation section 50 collects anticipated question data, and after collecting response data corresponding to each question, saves pairs of question data and response data. Subsequently, when a predetermined amount of conversation data (pairs of question data and response data, for example 100 pairs) is collected, the conversation DB generation section 50 registers the conversation data in the conversation DB 330 as a conversation data set of an agent.

The phoneme DB generation section 60 includes a function of generating the phoneme DB stored in the phoneme storage section 40. For example, the phoneme DB generation section 60 analyzes speech information from reading predetermined text aloud, decomposes the speech information into sub-phonetic segments and their control information, namely a prosody model, and when a predetermined amount or greater of speech information is collected, the phoneme DB generation section 60 executes a process of registering the speech information in the phoneme DB as phoneme data.

The advertisement insertion processing section 70 includes a function of inserting advertisement information into the dialogue of the agent. The advertisement information to insert may be extracted from the advertisement DB 72. In the advertisement DB 72, advertisement information (for example, advertisement content such as text, images, and speech, and information such as the advertiser, the advertisement period, and the advertising target) requested from the providing side (vendor, supplier), such as a corporation, is registered.

The feedback acquisition processing section 80 includes a function for inserting questions for acquiring feedback into the dialogue of the agent, and obtaining feedback from the user.

The above specifically describes a configuration of the agent server 2 according to the present embodiment. Note that the configuration of the agent server 2 according to the present embodiment is not limited to the example illustrated in FIG. 3. For example, each configuration included in the agent server 2 may also be configured as another server on a respective network.

Next, specific operating processes of the communication control system according to the present embodiment will be described with reference to FIGS. 5 to 14.

<<3. System Operating Processes>>

<3-1. Conversation Data Registration Process>

Figure 5:
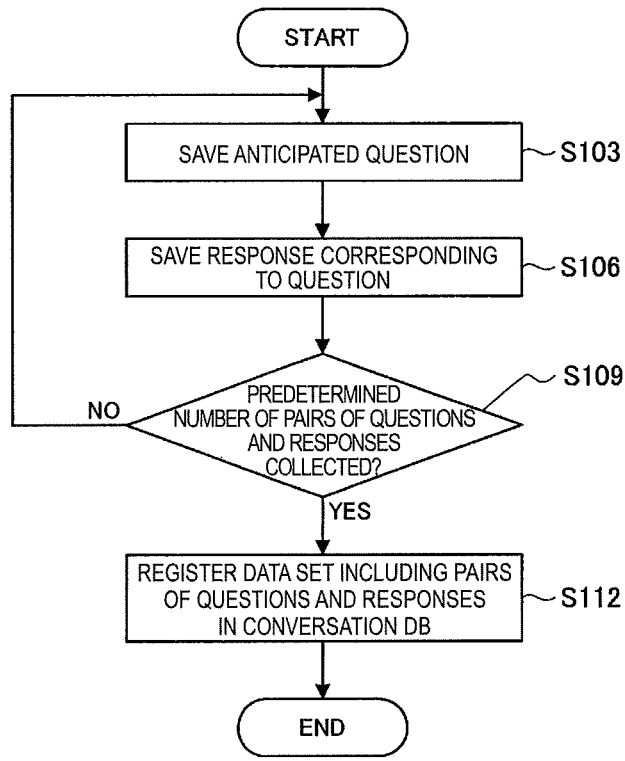
FIG. 5 is a flowchart illustrating a process of generating a conversation DB according to the present embodiment.

FIG. 5 is a flowchart illustrating a process of generating the conversation DB 330 according to the present embodiment. As illustrated in FIG. 5, first, the conversation DB generation section 50 saves an anticipated question (S103).

Next, the conversation DB generation section 50 saves a response corresponding to (paired with) the question (step S106).

Next, the conversation DB generation section 50 determines whether or not a predetermined number of pairs of questions and responses (also designated conversation data) have been collected (step S109).

Subsequently, in the case in which the predetermined number of pairs of questions and responses have been collected (step S109/Yes), the conversation DB generation section 50 registers a data set including many pairs of questions and responses in the conversation DB 330 (step S112). As an example of pairs of questions and responses, something like the following is anticipated, for example.

Examples of pairs of questions and responses
Pair 1
Question: Good morning.
Response: How are you feeling today?
Pair 2
Question: How's the weather today?
Response: The weather today is OO.
Such pairs may be registered in the conversation DB 330 as conversation data.

<3-2. Phoneme DB Generation Process>

Figure 6:
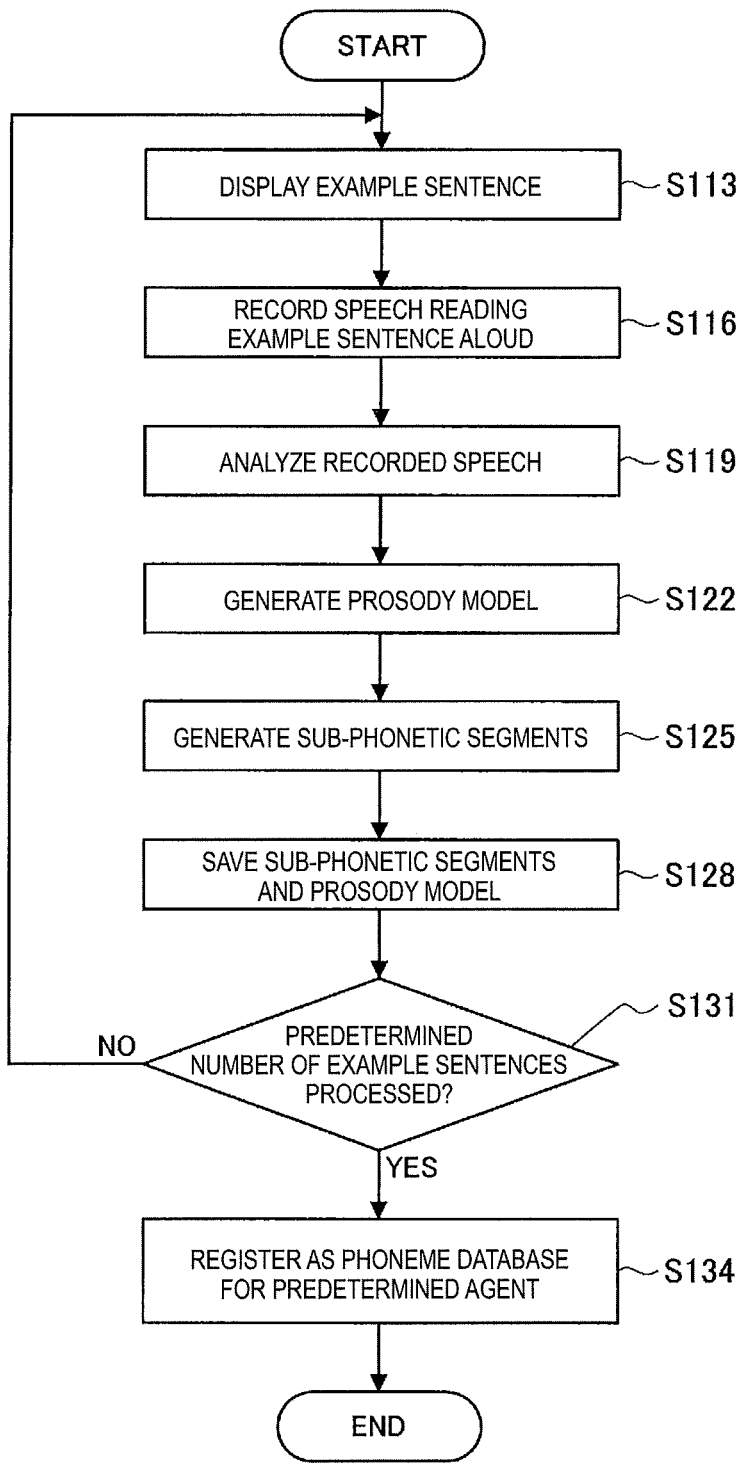
FIG. 6 is a flowchart illustrating a process of generating a phoneme DB according to the present embodiment.

FIG. 6 is a flowchart illustrating a process of generating the phoneme DB according to the present embodiment. As illustrated in FIG. 6, first, the phoneme DB generation section 60 displays an example sentence (step S113). The display of the example sentence displays an example sentence needed for phoneme data generation on the display of an information processing terminal not illustrated, for example.

Next, the phoneme DB generation section 60 records speech of the example sentence being read aloud (step S116), and analyzes the recorded speech (step S119). For example, speech information of reading aloud by a person in charge of the voice of the agent is collected by a microphone of the information processing terminal, and the phoneme DB generation section 60 receives and stores the speech information, and additionally executes speech analysis.

Next, the phoneme DB generation section 60 generates a prosody model on the basis of the speech information (step S122). A prosody model is an extraction of prosody parameters which indicate the prosodic characteristics (such as the pitch of sound, the loudness of sound, and the speed of utterance, for example) of speech, and is different for every person.

Next, the phoneme DB generation section 60 generates sub-phonetic segments (phoneme data) on the basis of the speech information (step S125).

After that, the phoneme DB generation section 60 saves the prosody model and the sub-phonetic segments (step S128).

Next, the phoneme DB generation section 60 determines whether or not a predetermined number of prosody models and sub-phonetic segments have been collected (step S131).

Additionally, in the case in which the predetermined number of prosody models and sub-phonetic segments have been collected (step S131/Yes), the phoneme DB generation section 60 registers the prosody models and the sub-phonetic segments in the phoneme storage section 40 as a phoneme database for a predetermined agent (step S134).

<3-3. Dialogue Control Process>

Figure 7:
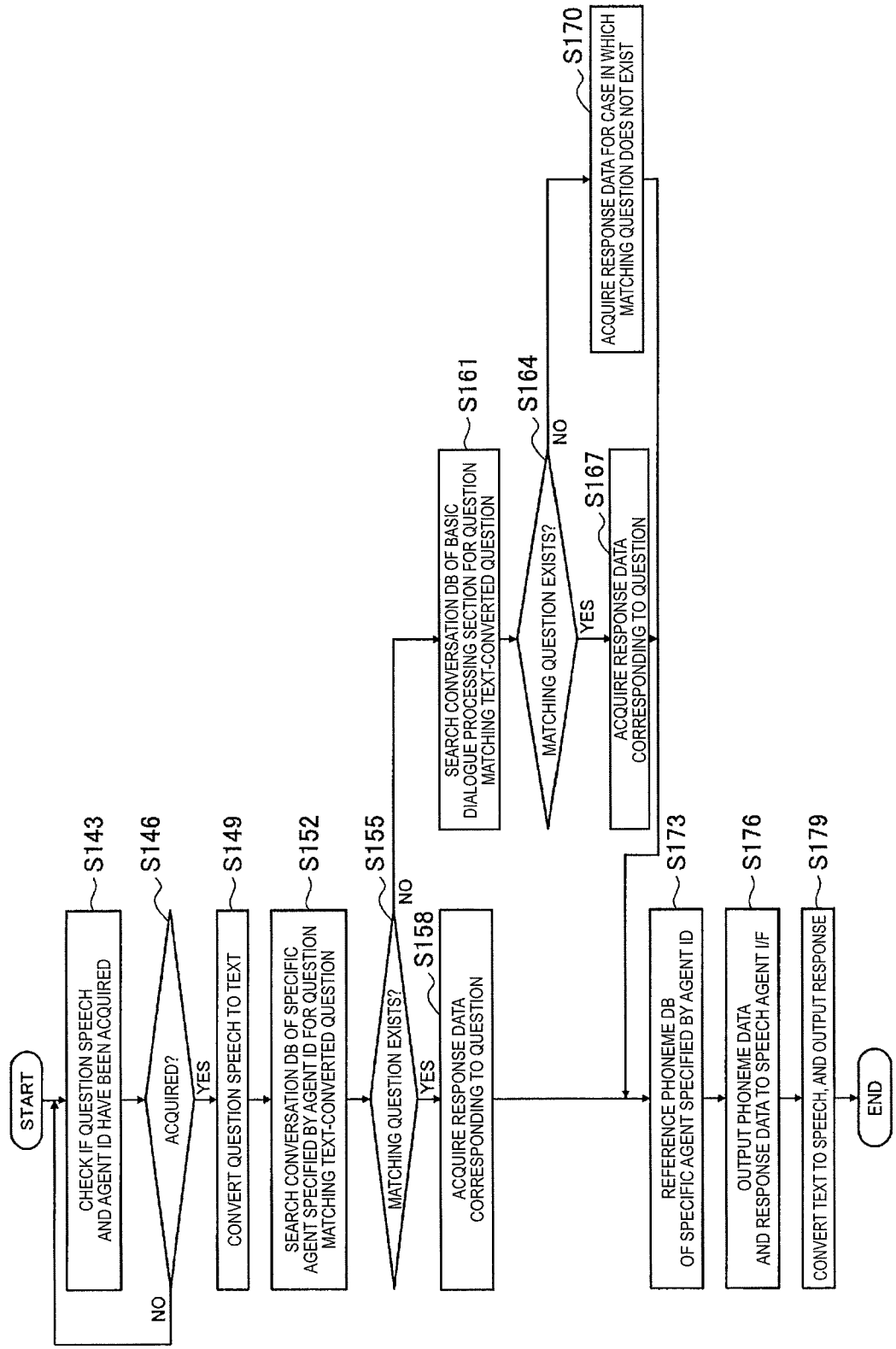
FIG. 7 is a flowchart illustrating a dialogue control process according to the present embodiment.

FIG. 7 is a flowchart illustrating a dialogue control process according to the present embodiment. As illustrated in FIG. 7, first, the speech agent I/F 20 checks whether or not question speech of the user and an agent ID have been acquired (step S143). The agent ID is identification information indicating a specific agent, such as character A, person B, or person C. The user is able to purchase the phoneme data for each agent, and the ID of the purchased agent is saved in the client terminal 1 during the purchase process, for example.

Next, if question speech of the user and an agent ID is acquired (step S146/Yes), the speech agent I/F 20 performs speech recognition and text conversion on the question speech (step S149). The speech agent I/F 20 outputs the text-converted question to the dialogue processing section of the specific agent specified by the agent ID. For example, in the case of "agent ID: character A", the speech agent I/F 20 outputs the text-converted question to the character A dialogue processing section 32.

After that, the dialogue processing section 30 searches the conversation DB of the specific agent specified by the agent ID for a question that matches the text-converted question (step S152).

Next, in the case in which a matching question exists (step S155/Yes), the character A dialogue processing section 32 acquires response data corresponding to (saved as a pair with) the question from the conversation DB of the specific agent (step S158).

On the other hand, in the case in which a matching question does not exist (step S155/No), the conversation DB of the basic dialogue processing section 31 is searched for a question that matches the text-converted question (step S161).

In the case in which a matching question exists (step S164/Yes), the basic dialogue processing section 31 acquires response data corresponding to (saved as a pair with) the question from the basic dialogue processing section 31 (step S167).

On the other hand, in the case in which a matching question does not exist (step S164/No), the basic dialogue processing section 31 acquires response data (for example, a response such as "I don't understand the question") for the case of in which a matching question does not exist (step S170).

After that, the phoneme DB (herein, the character A phoneme DB 42) of the specific agent specified by the agent ID is referenced by the character A dialogue processing section 32, and phoneme data of the character A for generating speech of the response data is acquired (step S173).

Next, the acquired phoneme data and the response data are output to the speech agent I/F 20 (step S176)

Subsequently, the speech agent I/F 20 uses the phoneme data to convert the response data (text) into speech (speech synthesis), and transmits the speech to the client terminal 1 (step S179). In the client terminal 1, the response is played back in the voice of the character A.

<3-4. Conversation DB Update Process>

Next, a process of updating the conversation DB 330 of each dialogue processing section 300 will be described. In the present embodiment, it is possible to make the conversation DB 330 grow through conversation with the user.

Figure 8:
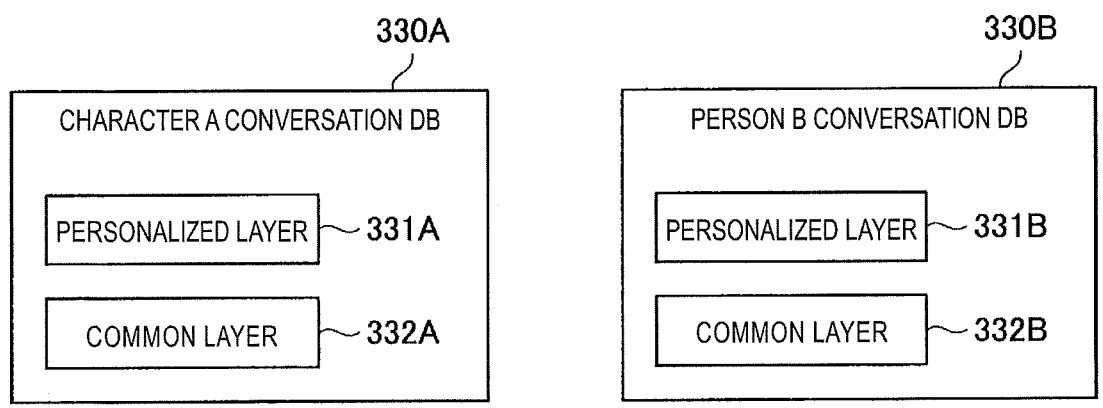
FIG. 8 is a diagram explaining an exemplary data configuration of a conversation DB according to the present embodiment.

First, an exemplary data configuration of the conversation DB 330 will described in further detail with reference to FIG. 8. FIG. 8 is a diagram explaining an exemplary data configuration of the conversation DB 330 according to the present embodiment. As illustrated in FIG. 8, each conversation DB 330 includes two layers, namely a personalized layer 331 and a common layer 332. For example, in the case of the character A conversation DB 330A, conversation data reflecting the personality and characteristics of the character A is stored in the common layer 332A. Meanwhile, in the personalized layer 331A, conversation data that has been customized towards the user through conversation with the user is stored. In other words, although the character A phoneme DB 42 and the character A dialogue processing section 32 are provided (sold) to users as a set, a certain user X and a certain user Y initially engage in dialogue with the same character A (the conversation data stored in the common layer 332A is used), but as the users continue to engage in dialogue, conversation data customized towards each user is accumulated in the personalized layer 331A for each user. With this arrangement, it becomes possible to provide dialogue with the character A that corresponds to what each of the user X and the user Y likes.

Also, even in the case in which the agent "person B" is average persons of different generations without a specific personality like the character A, conversation data may be customized towards the user. In other words, in the case in which "person B" is "a person in his or her 20s", for example, average 20s conversation data is stored in the common layer 332B, and conversation data customized by continued dialogue with the user is stored in the personalized layer 331B for each user. Additionally, the user is also able to select and purchase preferred phoneme data, such as "male", "female", "high-pitched voice", or "low-pitched voice", as the voice of the person B from the person B phoneme DB 43.

Figure 9:
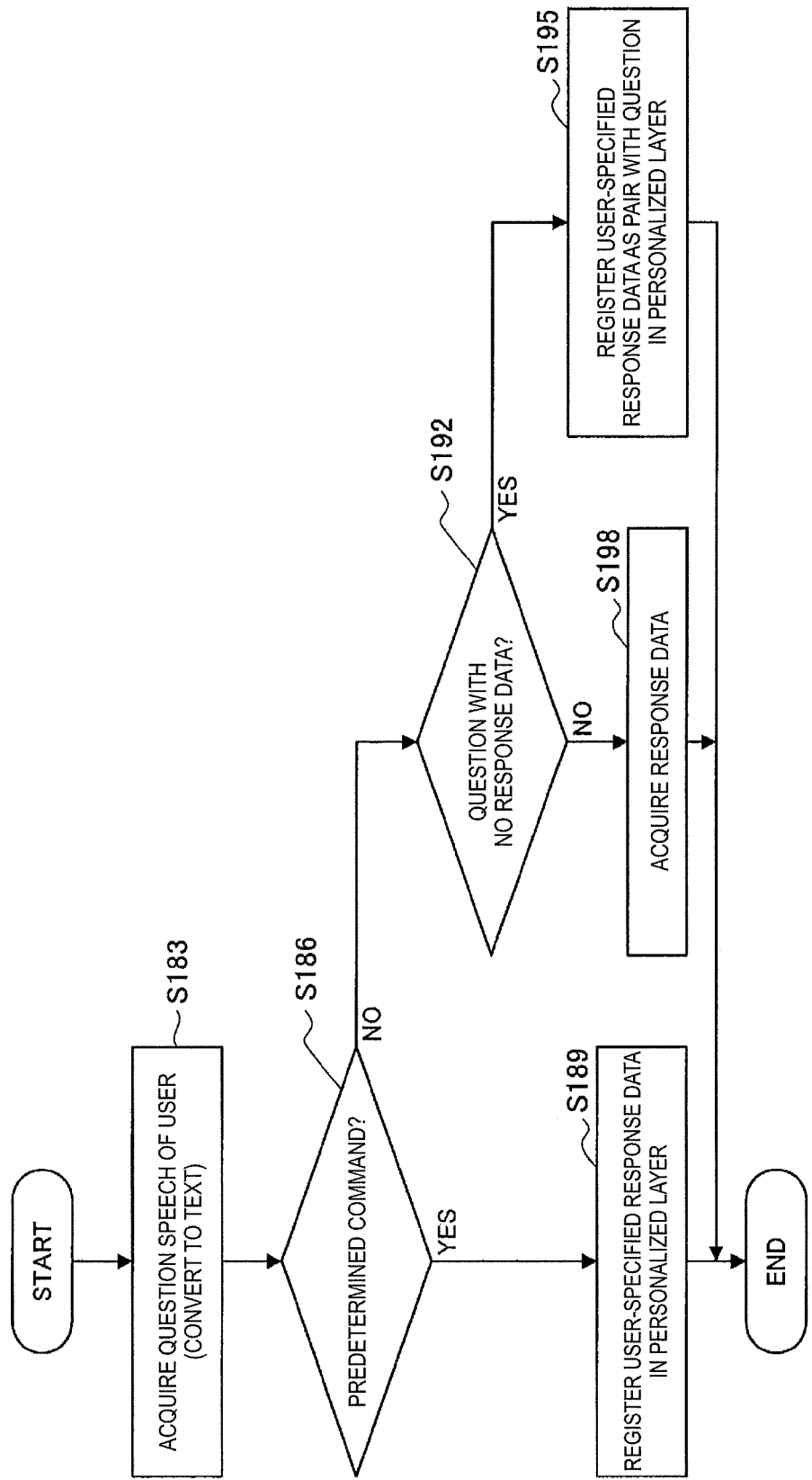
FIG. 9 is a flowchart illustrating a process of updating a conversation DB according to the present embodiment.

A specific process when executing such customization of the conversation DB 330 will be described with reference to FIG. 9. FIG. 9 is a flowchart illustrating a process of updating the conversation DB 330 according to the present embodiment.

As illustrated in FIG. 9, first, the speech agent I/F 20 acquires (receives) question speech of the user from the client terminal 1, and converts the question speech to text by speech recognition (step S183). The text-converted data (question data) is output to the dialogue processing section (herein, the character A dialogue processing section 32, for example) of the specific agent specified by the agent ID.

Next, the character A dialogue processing section 32 determines whether or not the question data is a predetermined command (step S186).

After that, in the case of the predetermined command (step S186/Yes), the character A dialogue processing section 32 registers user-specified response data as a pair with the question data in the personalized layer 331A of the conversation DB 330A (step S189). The predetermined command may be a word such as "NG" or "Settings", for example. For example, by a flow of conversation like the following, the conversation DB of the character A may be customized.

User: "Good morning"

Character A: "Good morning"

User: "NG. Say cheer up and do your best"

Character A: "Cheer up and do your best"

In the above flow of conversation, "NG" is the predetermined command, and after "NG" is uttered by the user, the character A dialogue processing section 32 registers the user-specified response data "Cheer up and do your best" as a pair with the question data "Good morning" in the personalized layer 331A of the conversation DB 330A.

On the other hand, in the case of not the predetermined command (step S186/No), the character A dialogue processing section 32 searches the character A conversation DB 330A for response data stored as a pair with the question data. In the case in which response data stored as a pair with the question data is not stored in the character A conversation DB 330A, that is, in the case in which the user's question is a question with no response (step S192/Yes), the character A dialogue processing section 32 registers a user-specified response in the personalized layer 331A as a pair with the question (step S195). For example, by a flow of conversation like the following, the conversation DB of the character A may be customized.

User: "How's it going?"

Character A: "I don't understand the question" (example response data for the case in which a corresponding response does not exist)

User: "If I ask 'How's it going?', say 'I'm great today as usual'"

Character A: "I'm great today as usual"

In the above flow of conversation, since there is no response data stored as a pair with "How's it going?", example response data for the case in which a corresponding response does not exist, namely "I don't understand the question", is acquired by the character A dialogue processing section 32, output together with the phoneme data of the corresponding character A to the speech agent I/F 20, and played back by the client terminal 1. After that, if the user-specified response "I'm great today as usual" is input, the character A dialogue processing section 32 registers the response as a pair with the question data "How's it going?" in the personalized layer 331A.

Note that in the case of a question having a response (step S192/No), the character A dialogue processing section 32 acquires and outputs the response data together with the phoneme data of the corresponding character A to the speech agent I/F 20, and the response is played back in the voice of the character A by the client terminal 1 (step S198).

Figure 10:
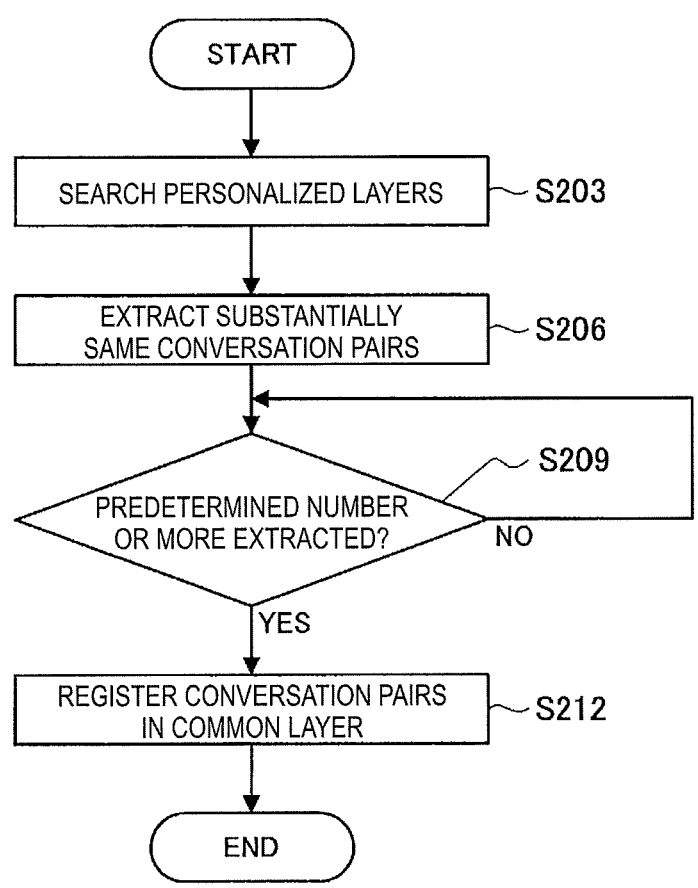
FIG. 10 is a flowchart illustrating a process of moving conversation data from a personalized layer to a common layer according to the present embodiment.

Next, the movement of conversation data from the personalized layer to the common layer will be described with reference to FIG. 10. FIG. 10 is a flowchart illustrating a process of moving conversation data from a personalized layer to a common layer according to the present embodiment. Herein, a process of moving conversation data from the personalized layer 331A to the common layer 332A of the character A dialogue processing section 32 will be described as an example.

As illustrated in FIG. 10, first, the character A dialogue processing section 32 periodically searches the personalized layer 331A for each user (step S203), and extracts conversation pairs (pairs of question data and response data) with substantially the same content (step S206). As conversation pairs with substantially the same content, for example, the pair of the question "How's it going?" and the response "I'm great today as usual!", and the pair of the question "How are you?" and the response "I'm great today as usual!", differ only in the politeness of the question, and may be judged to be conversation pairs with substantially the same content.

Next, in the case in which a predetermined number or more of conversation pairs have been extracted from the personalized layer 331A for each user (step S209/Yes), the character A dialogue processing section 32 registers the conversation pairs in the (in each user's) common layer 332A (step S212).

In this way, by moving conversation pairs having substantially the same content in the personalized layer 331 for each user to the common layer 332, it becomes possible to make the common layer 332 grow (expand the conversation pairs).

Figure 11:
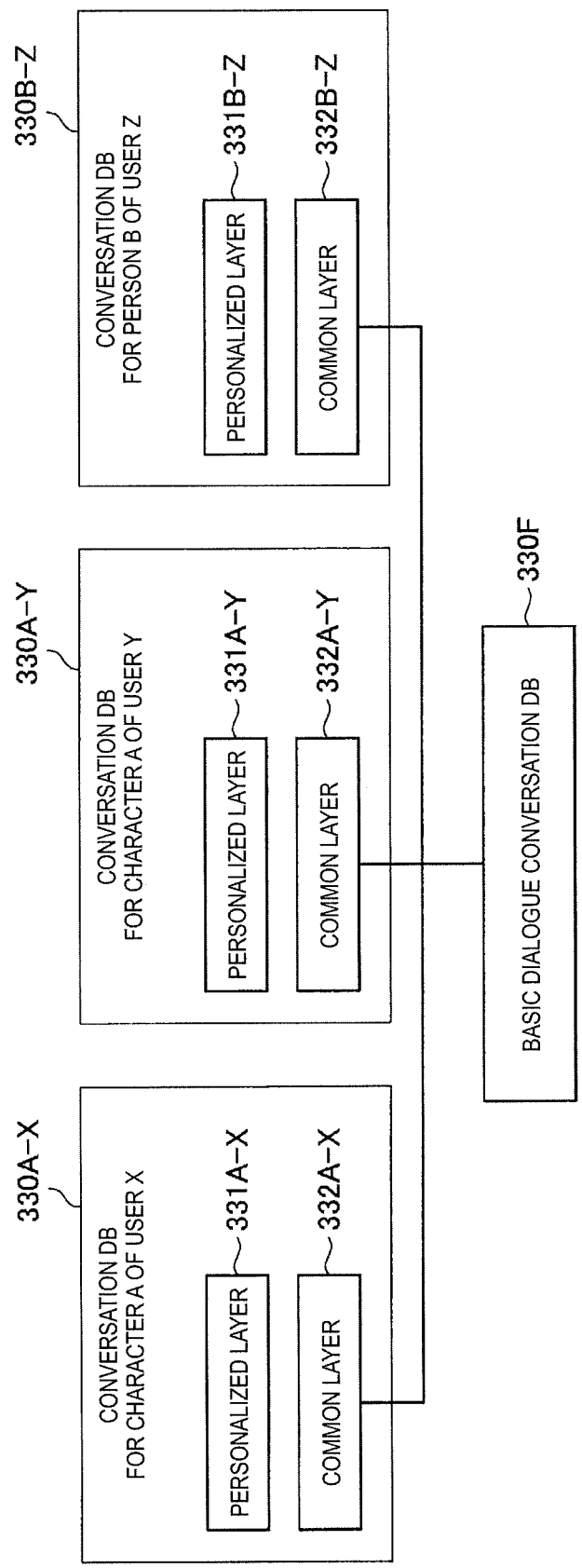
FIG. 11 is a diagram explaining the moving of conversation data to a basic dialogue conversation DB according to the present embodiment.

Additionally, in the present embodiment, it is also possible to cause a conversation DB for basic dialogue to grow by moving conversation data from the conversation DB (specifically, the common layer) of a specific agent to the conversation DB for basic dialogue. FIG. 11 is a diagram explaining the moving of conversation data to the basic dialogue conversation DB 330F according to the present embodiment. For example, in the case in which the user X and the user Y have each selected (purchased) the agent "character A", while a user Z has selected (purchased) the agent "person B", as illustrated in FIG. 11, a conversation DB 330A-X for the character A of user X, a conversation DB 330A-Y for the character A of user Y, and a conversation DB 330B-Z for the person B of user Z may exist in the dialogue processing section 30. In this case, in each personalized layer 331A-X, 331A-Y, and 331B-Z, individual (customized) conversation pairs are registered according to the dialogue with each of the user X, the user Y, and the user Z (see FIG. 9). Next, if there are a predetermined number of conversation pairs which are substantially the same in the personalized layers 331A-X and 331A-Y of the same agent, the conversation pairs are registered in each of the common layers 332A-X and 332A-Y for each user (see FIG. 10).

Figure 12:
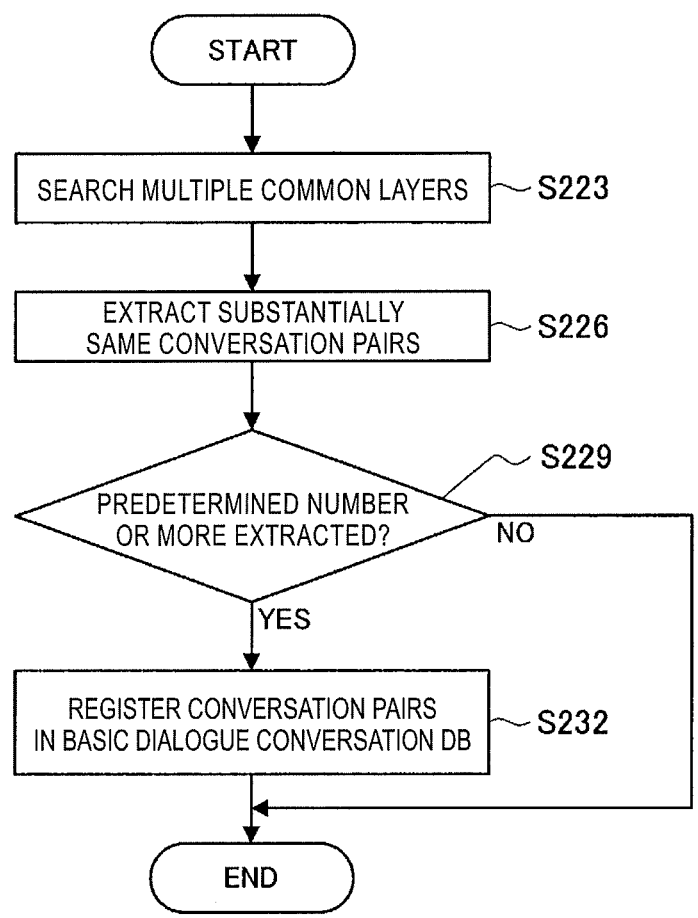
FIG. 12 is a flowchart illustrating a process of moving conversation data to the basic dialogue DB according to the present embodiment.

Additionally, in the case in which a predetermined number or more of conversation pairs which are substantially the same is extracted from the common layers 332A-X, 332A-Y, and 332B-Z of multiple agents (which may also include different agents), the dialogue processing section 30 moves the conversation pairs to the higher-layer basic dialogue conversation DB 330F. The basic dialogue conversation DB 330F is a conversation DB included in the basic dialogue processing section 31. With this arrangement, it becomes possible to make the basic dialogue conversation DB 330F grow (expand the conversation pairs). Such a data movement process will be described specifically with reference to FIG. 12. FIG. 12 is a flowchart illustrating a process of moving conversation data to the basic dialogue conversation DB 330F according to the present embodiment.

As illustrated in FIG. 12, first, the dialogue processing section 30 periodically searches the common layers 332 of multiple conversation DBs 330 (step S223), and extracts conversation pairs which are substantially the same (step S226).

Next, in the case in which a predetermined number or more conversation pairs which are substantially the same have been extracted from the multiple common layers 332 (step S229/Yes), the dialogue processing section 30 registers the conversation pairs in the basic dialogue conversation DB 330F (step S232).

In this way, by moving conversation pairs with substantially the same content in the common layer 332 of the conversation DB 330 for multiple agents to the basic dialogue conversation DB 330F, it becomes possible to make the basic dialogue conversation DB 330F grow (expand the conversation pairs).

<3-5. Advertisement Insertion Process>

Next, the process of inserting advertisement information by the advertisement insertion processing section 70 will be described with reference to FIGS. 13 and 14. In the present embodiment, by the advertisement insertion processing section 70, it is possible to insert advertisement information stored in the advertisement DB 72 into an utterance of an agent. Advertisement information may be registered in the advertisement DB 72 in advance. FIG. 13 is a diagram illustrating an example of advertisement information registered in the advertisement DB 72 according to the present embodiment.

As illustrated in FIG. 13, advertisement information 621 includes an agent ID, a question, advertisement content, a condition, and a probability. The agent ID specifies the agent to utter the advertisement content, the question specifies the question of the user that acts as a trigger for inserting the advertisement content, and the advertisement content is the advertisement sentence to insert into the dialogue of the agent. Also, the condition is a condition on inserting the advertisement content, and the probability indicates the probability of inserting the advertisement content. For example, in the example illustrated on the first row of FIG. 13, in the case in which the word "chocolate" is included in a question from a user who is 30 years old or less in a dialogue with the agent "character A", advertisement content stating "The new chocolate on sale from BB Co. contains a lot of milk and is delicious" is inserted into the response. Also, since the user might feel annoyed if the advertisement content is inserted every time the triggering question is uttered, in the present embodiment, the probability of inserting the advertisement may also be set. Such a probability may be decided according to the advertisement fee. For example, as the advertisement fee becomes higher, a higher probability is set.

Such a process of inserting advertisement content will be described specifically with reference to FIG. 14. FIG. 14 is a flowchart illustrating the process of inserting advertisement content according to the present embodiment.

Figure 14:
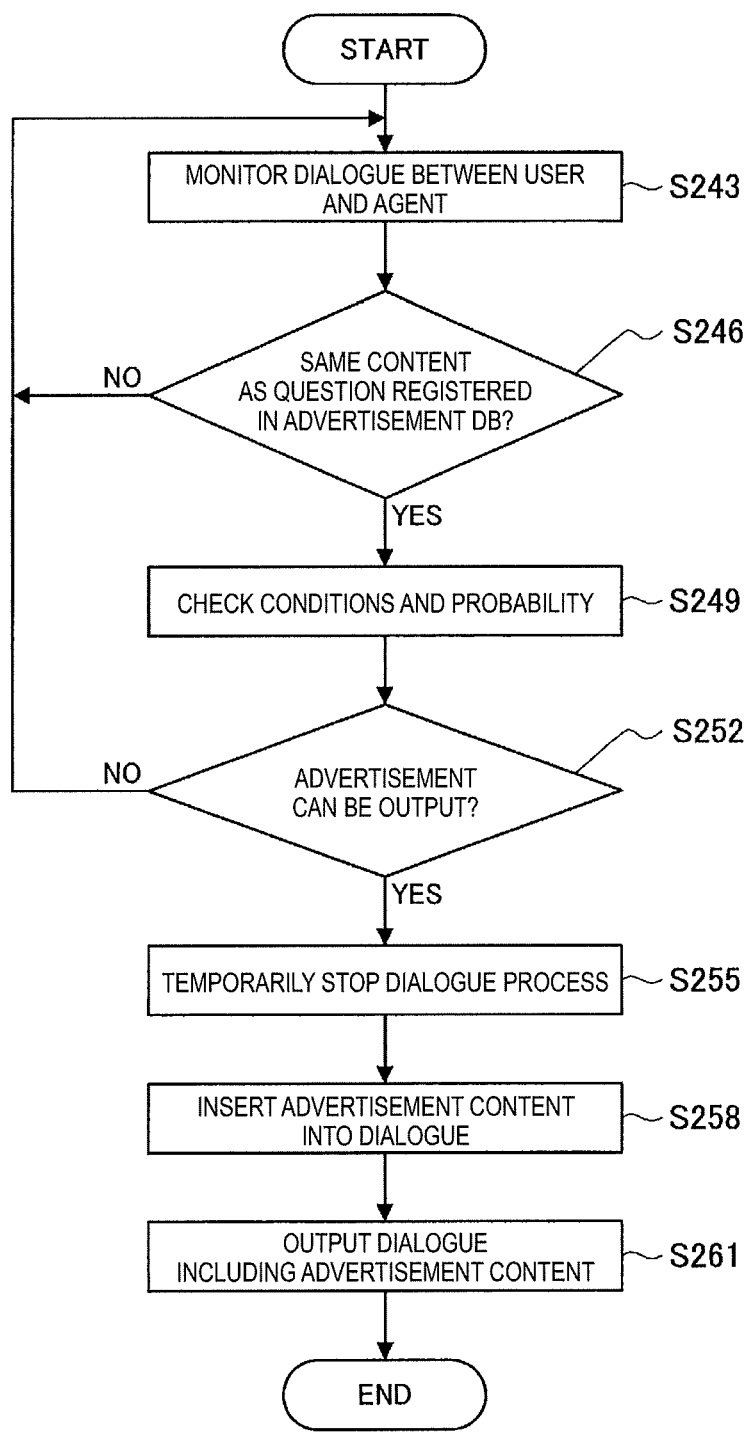
FIG. 14 is a flowchart illustrating a process of inserting advertisement content according to the present embodiment.

As illustrated in FIG. 14, first, the advertisement insertion processing section 70 monitors the dialogue (specifically, the dialogue process by the dialogue processing section 30) between the user and the agent (step S243).

Next, the advertisement insertion processing section 70 determines whether or not a question with the same content as a question registered in the advertisement DB 72 has appeared in the dialogue between the user and the agent (step S246).

After that, in the case in which a question with the same content has appeared (step S246/Yes), the advertisement insertion processing section 70 checks the condition and probability of advertisement insertion associated with the corresponding question (step S249).

Subsequently, on the basis of the condition and the probability, the advertisement insertion processing section 70 determines whether or not the advertisement can be output (step S252).

Next, in the case in which the advertisement can be output (step S252/Yes), the advertisement insertion processing section 70 temporarily stops the dialogue process by the dialogue processing section 30 (step S255), and inserts the advertisement content into the dialogue (step S258). Specifically, the advertisement content is inserted into a response of the agent with respect to the question of the user, for example.

Additionally, dialogue (conversation data) including the advertisement content is output from the dialogue processing section 30 to the speech agent I/F 20, transmitted from the speech agent I/F 20 to the client terminal 1, and played back in the voice of the agent (step S261). Specifically, advertisement content may be presented to the user as an utterance of the character A through a conversation like the following, for example.

User: "Good morning"
Character A: "Good morning! How are you feeling today?"
User: "I'm great. I want to eat something delicious"
Character A: "They say the barbecue at CC is delicious"

In the above conversation, first, with respect to the user question "Good morning", the corresponding response found in the conversation DB of the character A, namely "Good morning! How are you feeling today?" is output as speech. After that, since the user question "I'm great. I want to eat something delicious" includes the question "I want to eat something delicious" that acts as a trigger for advertisement insertion (refer to the second row of FIG. 13), the advertisement insertion processing section 70 executes the advertisement insertion process, and a response stating the advertisement content "They say the barbecue at CC is delicious" is output in the voice of the character A.

The above describes a conversation data registration process, a phoneme DB generation process, a dialogue control process, a conversation DB update process, and an advertisement insertion process as basic operating processes of the communication control system according to the present embodiment.

Note that the dialogue control process according to the present embodiment is not limited to the example described above. The dialogue processing section 30 according to the present embodiment is also capable of connecting dialogue with the agent seamlessly to communication with a person in the real world. Hereinafter, such a case will be described specifically with reference to FIGS. 15 to 48.

<<4. Dialogue Control Process>>
<4-1. Configuration>
(4-4-1 System Configuration)

Figure 15:
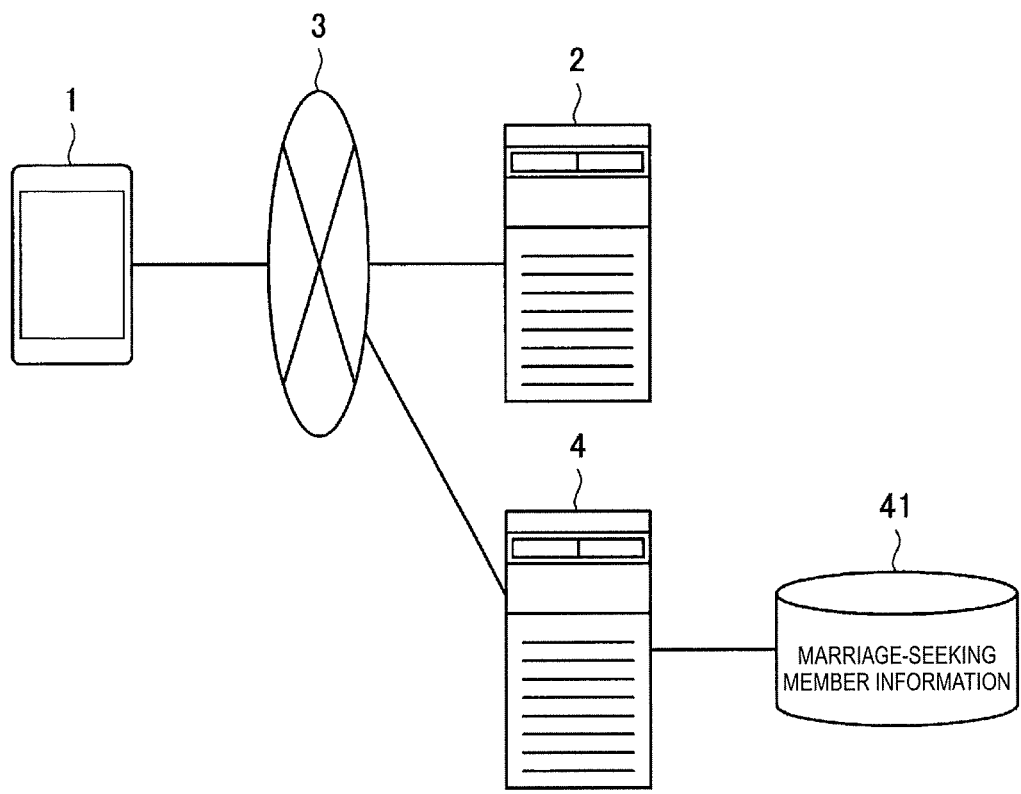
FIG. 15 is a diagram illustrating an exemplary system configuration of the communication control system according to the present embodiment.

FIG. 15 is a diagram illustrating an exemplary system configuration of the communication control system according to the present embodiment. In the present embodiment, as one example, a case of using the member information of a marriage consulting service according to dialogue between a user and an agent to match the user with a marriage-seeking member will be described.

As illustrated in FIG. 15, the communication control system according to the present embodiment includes a client terminal 1, an agent server 2, and a management server 4. The management server 4 includes a function of managing the member information of a marriage consulting service (marriage-seeking member information 41), and provides member information in response to a request from the agent server 2.

(4-1-2. Configuration of Dialogue Processing Section 30a)

Next, an exemplary configuration of the dialogue processing section 30a included in the agent server 2 according to the present embodiment will be described with reference to FIG. 16. The dialogue processing section 30a according to the present embodiment realizes a real-world working agent system that connects dialogue with an agent seamlessly to communication with a person in the real world.

Figure 16:
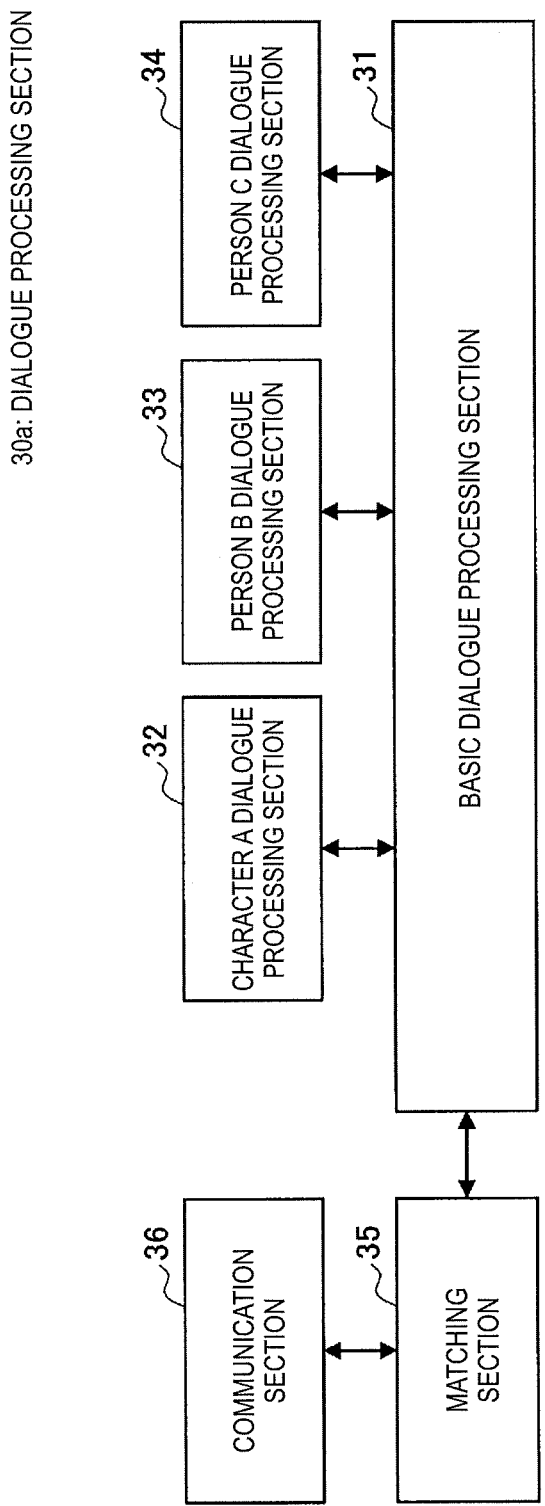
FIG. 16 is a diagram illustrating an exemplary configuration of a dialogue processing section according to the present embodiment.

FIG. 16 is a diagram illustrating an exemplary configuration of the dialogue processing section 30a according to the present embodiment. As illustrated in FIG. 16, the dialogue processing section 30a includes a basic dialogue processing section 31, a character A dialogue processing section 32, a person B dialogue processing section 33, a person C dialogue processing section 34, a matching section 35, and a communication section 36.

The basic dialogue processing section 31, the character A dialogue processing section 32, the person B dialogue processing section 33, and the person C dialogue processing section 34 are as described earlier with reference to FIG. 3. The character A, the person B, and the person C are all examples of agent characters.

The communication section 36 may transmit and receive data with respect to an external apparatus over a network. For example, the communication section 36 receives marriage-seeking member information from the management server 4, and transmits an acceptance notification to a matching partner.

The matching section 35 includes a function of matching, according to dialogue between a user and an agent, a real person having a personality and preferences similar to the agent. A detailed configuration of the matching section 35 will be described next with reference to FIG. 17.

(4-1-3. Configuration of Matching Section 35)

Figure 17:
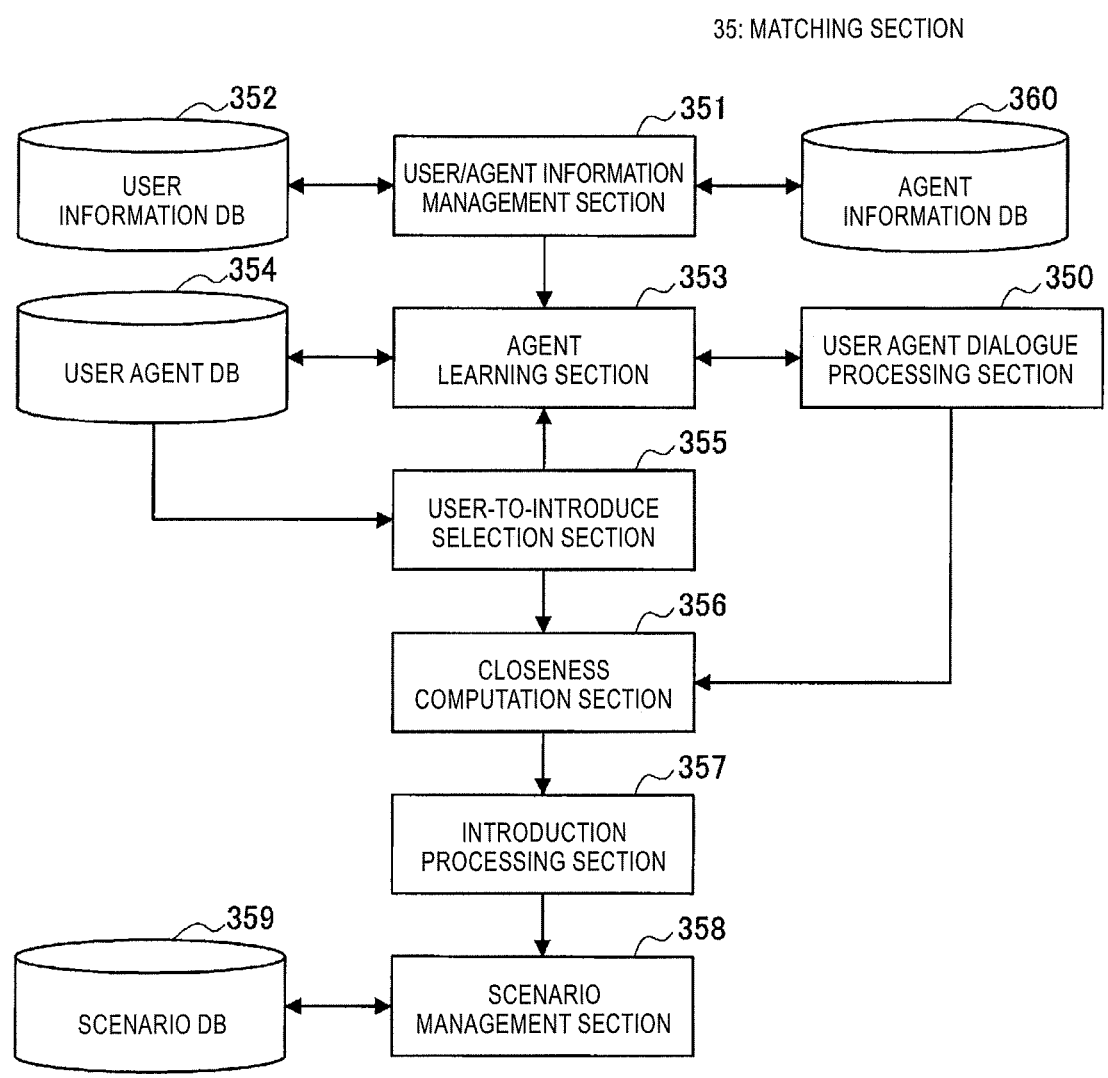
FIG. 17 is a diagram illustrating an exemplary configuration of a matching section according to the present embodiment.

FIG. 17 is a diagram illustrating an exemplary configuration of the matching section 35 according to the present embodiment. As illustrated in FIG. 17, the matching section 35 includes a user agent dialogue processing section 350, a user/agent information management section 351, a user information DB 352, an agent information DB 360, an agent learning section 353, a user agent DB 354, a user-to-introduce selection section 355, a closeness computation section 356, an introduction processing section 357, a scenario management section 358, and a scenario DB 359.

The user/agent information management section 351 includes a function of registering, modifying, updating, deleting, and the like user information with respect to the user information DB 352 or agent information with respect to the agent information DB 360. The user information is input by the user on the client terminal 1, for example, and transmitted to the agent server 2. Alternatively, the user information is extracted from the marriage-seeking member information 41 of the management server 4. The user information includes basic information, such as a user ID, age, occupation, family structure, living with family members, income, place of residence, and blood type. Each item includes a public attribute regarding whether or not to make the item public to the final introduced partner (matching partner). Also, the user information includes basic condition information that specifies a preferred partner. The basic condition information indicates the user's desired conditions on information that may act as an item when searching for a matching partner with the marriage consulting service, such as age, occupation, family structure, living with family members, income, place of residence, and blood type. A priority level may be set for each item, and it may also be possible to emphasize high-priority items to initially select an agent having such attributes. Also, the user information includes user preference information. For the preference information, for example, a numerical value may be set in a range from −1.0 (dislike) to 1.0 (like) for each item, or information input in a survey format, such as "strongly like, like, no opinion, dislike, strongly dislike", may be registered. Also, the user preference information may be input by the user in advance, or preference information may be generated and edited according to dialogue between the user and the agent. For example, in the case in which the user says "I have a passion for ramen" during a dialogue with the agent, a "ramen" item may be generated automatically, and "1.0" may be set.

Similar information regarding agents are stored in the agent information DB 360. Default values are set in basic information, basic condition information, and preference information about agents.

Note that specific examples of user and agent basic information and the like are illustrated in FIGS. 24 to 27.

The agent learning section 353 includes a function of changing the personality (attributes) of the user agent in the user agent dialogue processing section 350 to the user's preferred personality by learning dialogue with the user. The initial value in the user agent dialogue processing section 350 is an agent selected by the user from among multiple agent characters prepared in advance, for example, and changes to the user's preferred agent by the agent learning section 353 gradually through continued dialogue. In the user agent DB 354, the attributes (for example, each item in the basic information, basic condition information, and preference information) of the user agent which have been changed to the user's preferred attributes by the agent learning section 353 are stored, and updated as appropriate. In addition, the attributes of the user agent may also include the agent's appearance (such as the type of face, hairstyle, and type of clothing).

The user agent dialogue processing section 350 includes a function of realizing automatic dialogue with the user through the user agent which is appropriately changed by the agent learning section 353. Specifically, the user agent dialogue processing section 350 analyzes uttered speech or text transmitted from the client terminal 1, and outputs a corresponding response.

The user-to-introduce selection section 355 includes a function of searching for a real person having attributes similar to the attributes of the agent changed to the user's preferences (the user agent), and matching to a user as a user to introduce. The attributes of the agent changed to the user's preferences are grasped by referencing the user agent DB 354. Specifically, the user-to-introduce selection section 355 searches the marriage-seeking member information 41 for a real person having attributes similar to the agent changed to the user's preferences, and extracts such a person as a user to introduce. Additionally, the attributes of the user to introduce may also be output to the agent learning section 353 to make the user agent more similar to the attributes of the user to introduce extracted by the user-to-introduce selection section 355.

The closeness computation section 356 computes the closeness between the user agent reflecting the attributes of the user to introduce, and the user. For example, the closeness computation section 356 computes the closeness according to the content of dialogue between the user agent and the user.

In the case in which the closeness computed by the closeness computation section 356 exceeds a threshold value, the introduction processing section 357 executes various processor for introducing the user-to-introduce (a real person) to the user. For example, the introduction processing section 357 transmits an approval notification asking the user-to-introduce whether to agree to being introduced or not, and displays an introduction screen on the client terminal 1 of both users.

The scenario management section 358 executes various processes that support a meeting between the user and the user-to-introduce, in accordance with a scenario registered in the scenario DB 359. For example, the scenario management section 358, following a scenario selected arbitrarily by the user from the scenario DB 359, notifies both uses of the time and place, and controls a notification of the plan content to a predetermined business.

The above describes the configuration of the matching section 35 according to the present embodiment.

(4-1-4. Configuration of Client Terminal 1)

Figure 18:
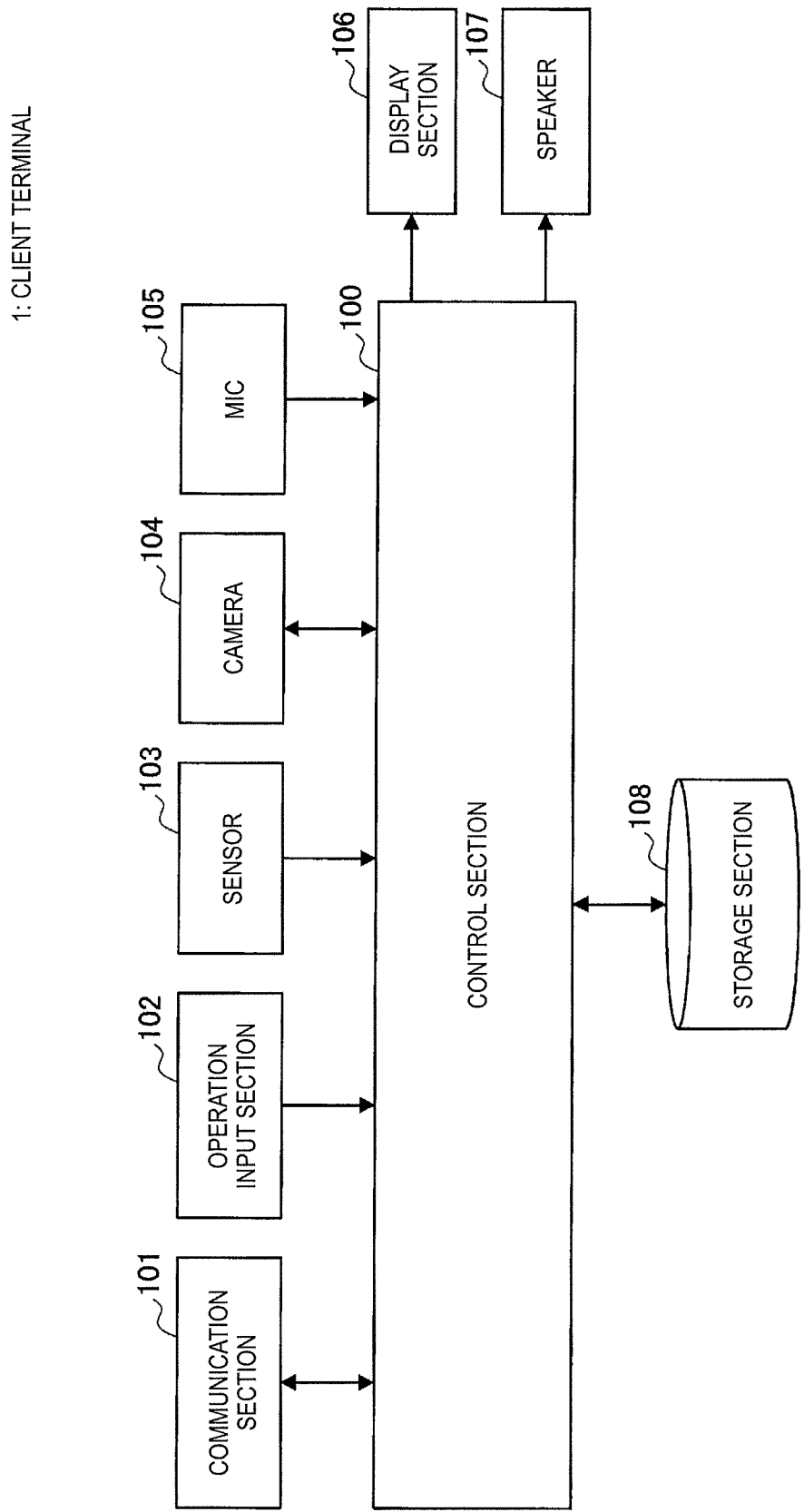
FIG. 18 is a block diagram illustrating an example of a configuration of a client terminal according to the present embodiment.

Next, a configuration of the client terminal 1 according to the present embodiment will be described with reference to FIG. 18. FIG. 18 is a block diagram illustrating an example of a configuration of the client terminal 1 according to the present embodiment.

As illustrated in FIG. 18, the client terminal 1 includes a control section 100, communication section 101, an operation input section 102, a sensor 103, a camera 104, a mic (an abbreviation of microphone) 105, a display section 106, a speaker 107, and a storage section 108.

(Control Section 100)

The control section 100 is realized by a processor such as a central processing unit (CPU) included in the client terminal 1, for example. The control section 100 according to the present embodiment controls the playback from the speaker 107 of response speech of the agent transmitted from the agent server 2 through the communication section 101, and controls the display of an image of the agent on the display section 106, for example.

Also, the control section 100 transmits selection information (such as the selection of an agent, for example) by the user input from the operation input section 102 to the agent server 2 through the communication section 101.

Also, the control section 100, under control by the agent server 2, controls the provision of an agent service such as automatic dialogue by the agent selected by the user.

(Communication Section 101)

The communication section 101 is a communication interface including a communication device and the like for connecting to the network 3, for example. The communication section 101 may be a local area network (LAN), Bluetooth (registered trademark), Wi-fi, or Wireless USB (WUSB) communication card or the like, for example. Additionally, the communication section 101 may also be an optical communication router, an asymmetric digital subscriber line (ADSL) router, a modern for any of various types of communication, or the like. The communication section 101 transmits and receives signals or the like to and from the Internet or another communication device using a predetermined protocol such as TCP/IP, for example. Also, the network 3 connected to the communication section 101 is a network connected in a wired or wireless manner, and may include the Internet, a home LAN, infrared communication, radio-wave communication, satellite communication, or the like, for example.

(Operation Input Section 102)

The operation input section 102 includes a function of receiving the input of user operations, and outputting to the control section 100. The operation input section 102 is realized by a mouse, a keyboard, a touch panel, buttons, switches, levers, or the like, for example.

(Sensor 103)

The sensor 103 includes a function of detecting the user or surrounding conditions. For example, the sensor 103 is realized by a biological sensor (such as a pulse monitor, a heart rate monitor, a perspiration sensor, a body temperature sensor, a blood pressure sensor, or an electroencephalograph), an environment sensor (such as a temperature sensor, an illumination sensor, or a pressure sensor), an acceleration sensor, a gyro sensor, a direction sensor, a vibration sensor, a positioning sensor, or the like.

(Camera 104)

The camera 104 includes each of a lens system including an imaging lens, a diaphragm, a zoom lens, a focus lens, and the like, a driving system that causes the lens system to execute focus operations and zoom operations, a solid-state image sensor array that generates an imaging signal by photoelectric conversion of imaging light obtained with the lens system, and the like. The solid-state image sensor array may be realized by a charge-coupled device (CCD) sensor array or a complementary metal-oxide-semiconductor (CMOS) sensor array, for example.

(Mic 105)

The mic 105 collects and outputs user speech and surrounding environment sounds to the control section 100 as sound data.

(Display Section 106)

The display section 106 includes a function of displaying text, graphics, images, video, and the like. The display section 106 is realized by a liquid crystal display (LCD) device, an organic light-emitting diode (OLED) device, or the like, for example.

(Speaker 107)

The speaker 107 includes a function of playing back sound signals.

(Storage Section 108)

The storage section 108 stores programs and parameters by which the control section 100 executes each function. For example, the storage section 108 may store user information such as a user ID, name, age, gender, occupation, family structure, living with family members, age, place of residence, preference information, and the like.

Next, operating processes according to the present embodiment will be specifically described with reference to FIGS. 19 to 27.

<4-2. Operating Processes>

Operating processes according to the present embodiment roughly include the four phases of search, fixing, introduction, and support.

Search Phase

Figure 19:
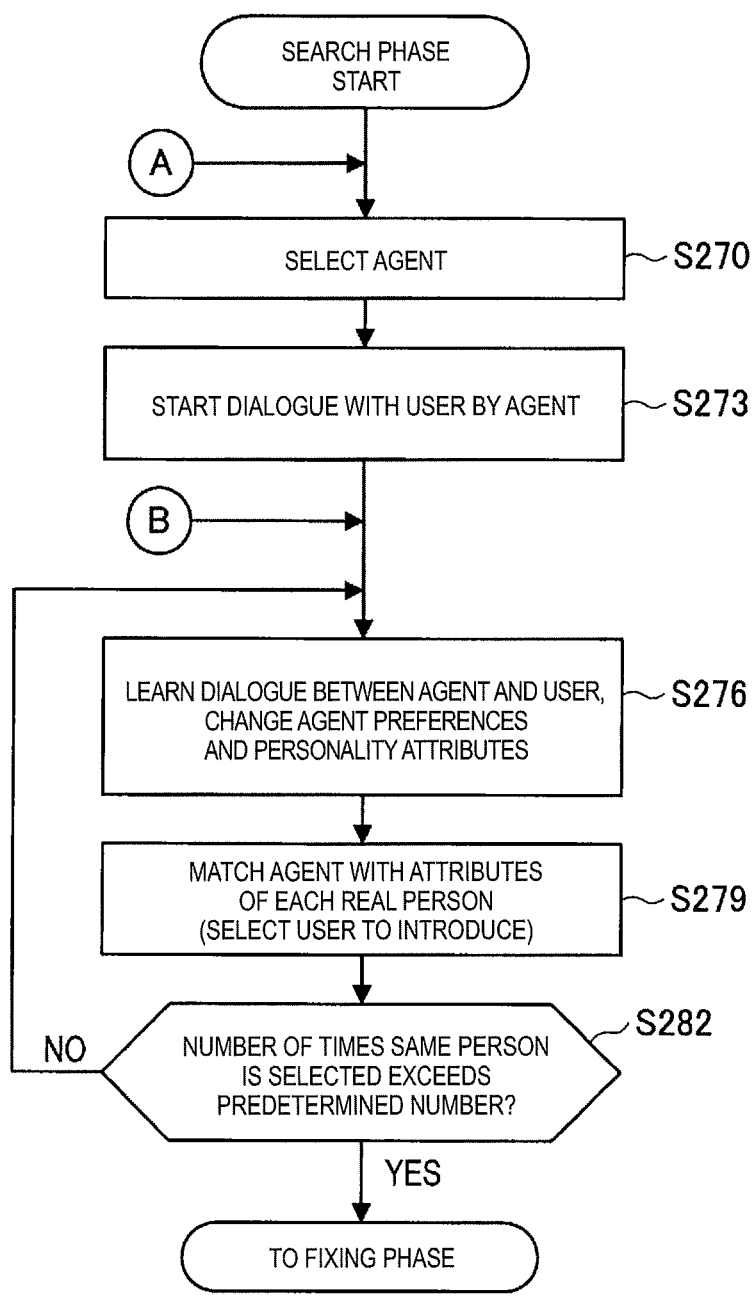
FIG. 19 is a flowchart illustrating an operating process in a search phase according to the present embodiment.

FIG. 19 is a flowchart illustrating an operating process in the search phase according to the present embodiment. As illustrated in FIG. 19, first, when a single agent is selected by the user (step S270), the user agent dialogue processing section 350 starts dialogue with the user by the selected agent (step S273).

Next, the agent learning section 353 learns the dialogue between the agent and the user by the user agent dialogue processing section 350, and changes the preferences and personality attributes of the agent to be similar to the user's preferences (step S276).

Next, the user-to-introduce selection section 355 matches the agent made similar to the user's preferences to the attributes of each real person (partner available to be introduced), and selects the user to introduce (step S279). In this way, in the search phase, the agent attributes are changed, and matching between the agent and a real person is executed behind the scenes without the user's knowledge.

The above process is repeated until the number of times the same person is selected exceeds a predetermined number (step S282).

Figure 20:
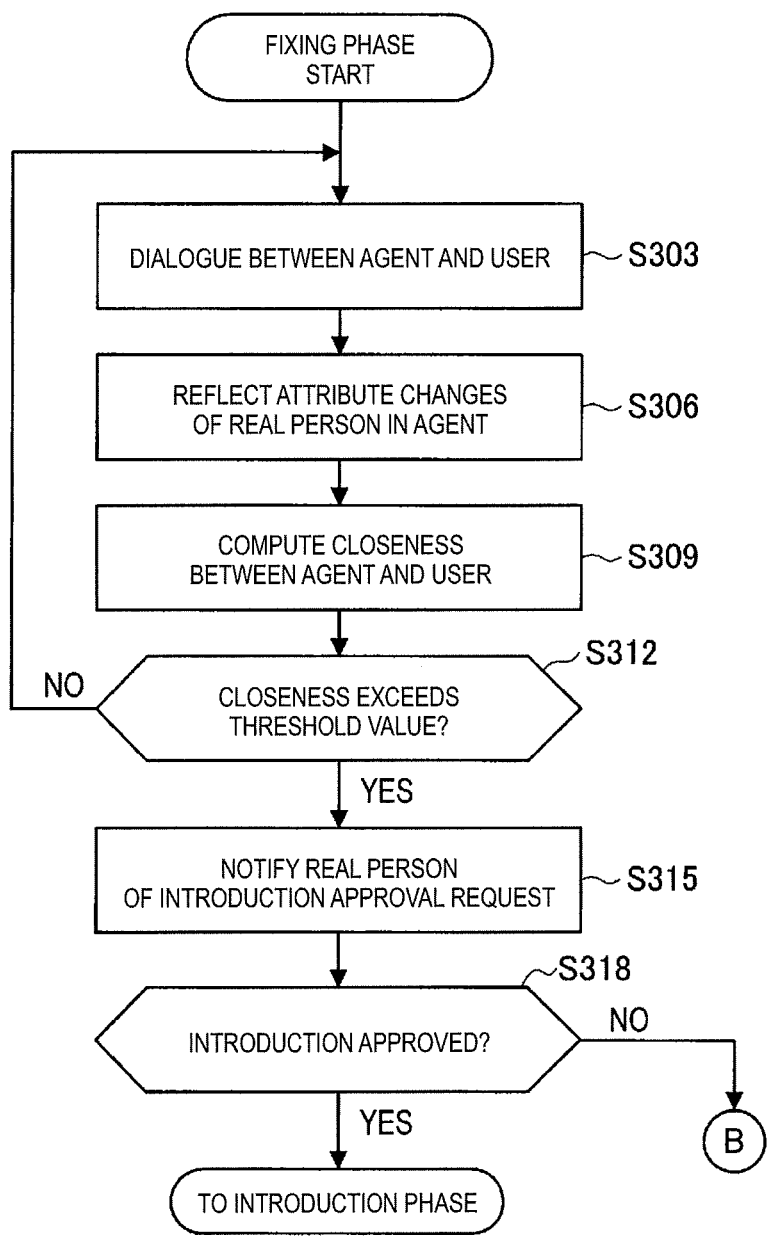
FIG. 20 is a flowchart illustrating an operating process in a fixing phase according to the present embodiment.

Subsequently, in the case in which the number of times the same person is selected exceeds the predetermined number (step S282/Yes), the process of the fixing phase described in FIG. 20 is started. Note that although the number of times the same person is selected is treated as the criterion herein, the present embodiment is not limited thereto, and a case in which the same person continues to be selected for a fixed period may also be treated as the criterion for starting the fixing phase.

Fixing Phase

FIG. 20 is a flowchart illustrating an operating process in the fixing phase according to the present embodiment. The fixing phase is a phase for fixing the matching person (the selected person to introduce, hereinafter also designated the "real person"), and confirming whether the affinity (herein judged by "closeness") between the person and the user is truly satisfactory. Consequently, at this point, in the case in which the attributes of the real person change, the corresponding attributes of the agent are changed to match the real person.

Specifically, as illustrated in FIG. 20, first, the user agent dialogue processing section 350 continues dialogue between the user agent matched to the real person, and the user (step S303).

Next, the agent learning section 353 continually checks the information about the real person saved in the user information DB 352, and in the case in which the attributes of the matching real person change, the agent learning section 353 causes the changes to be reflected in the attributes of the user agent (step S306). Specifically, the attributes of the agent stored in the user agent DB 354 are updated to be more similar to the attributes of the real person.

Next, the closeness computation section 356 computes the closeness between the agent and the user (step S309). As described above, in the fixing phase, since the attributes of the agent are shifted towards the matching real person, there is a possibility of divergence in the personality and preferences of the user and the agent. Consequently, the closeness between the agent resembling the real person and the user is computed, and it is determined whether or not the matching real person is truly suitable to the user. The computation of the closeness may be computed on the basis of the degree of coincidence between agent attribute items and user attribute items, the amount of conversation with the user, the amount of smiling by the user during conversation, and the like. Additionally, the closeness may also be computed from the user's phrasing in the dialogue, the positivity/negativity of words, and the like.

Next, in the case in which the closeness exceeds a predetermined threshold value (step S312/Yes), the introduction processing section 357 notifies the matching real person of an introduction approval request (step S315).

Figure 21:
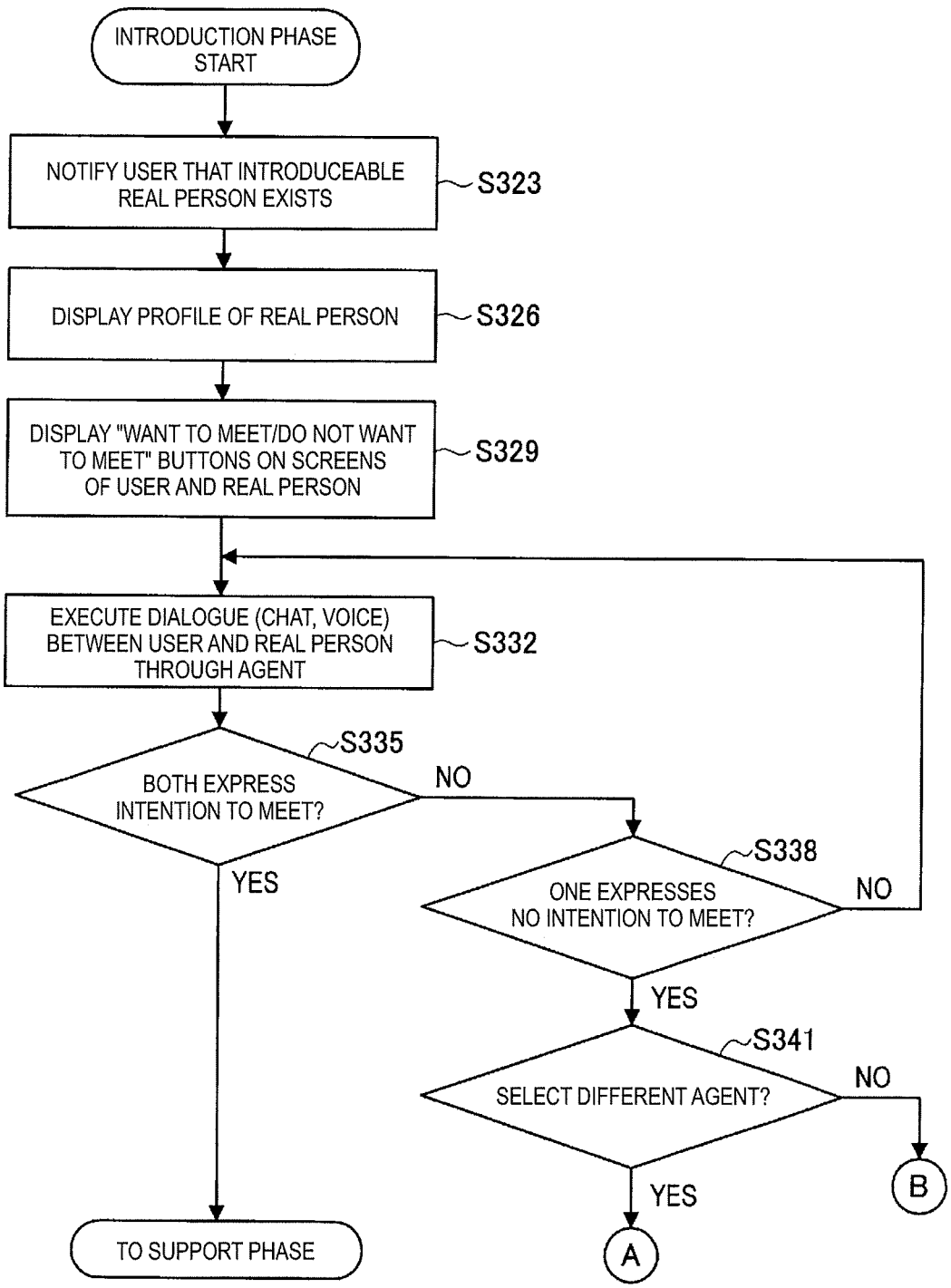
FIG. 21 is a flowchart illustrating an operating process in an introduction phase according to the present embodiment.

Subsequently, in the case in which an introduction is approved by the real person (step S318/Yes), the process of the introduction phase described in FIG. 21 is started.

On the other hand, in the case in which an introduction is not approved (introduction is refused) by the real person (step S318/No), the flow returns to the search phase illustrated in FIG. 19. Note that in the matching process of step S279 in the search phase, a person who has already refused an introduction approval is excluded.

Introduction Phase

FIG. 21 is a flowchart illustrating an operating process in the introduction phase according to the present embodiment. In the introduction phase, the user side is notified for the first time of the existence of a real person who can be introduced.

As illustrated in FIG. 21, first, the introduction processing section 357 notifies the user of the existence of a real person who can be introduced to the user (step S323).

Next, the introduction processing section 357 displays a profile (to the extent that the other person has made public) of the real person to introduce on the display section 106 of the client terminal 1 of the user (step S326), and in addition, displays "want to meet/do not want to meet buttons" for selecting whether the user wants or does not want to actually meet such a real person (hereinafter also designated the "introduced partner") (step S329). With this arrangement, the user is able to check the profile of the introduced partner.

Next, dialogue is continued by speech or text between the user and the real person through the agent (step S332). Herein, since the conversation is through the agent, utterances by the introduced partner are played back in the voice of the agent, or chat is executed in a state in which a face image of the agent is displayed, for example. The user, having continued dialogue with the introduced partner through the agent, determines whether one wants or does not want to actually meet the introduced partner, and taps the "want to meet/do not want to meet buttons". Such buttons may also be displayed on a screen on the other person' side.

Figure 22:
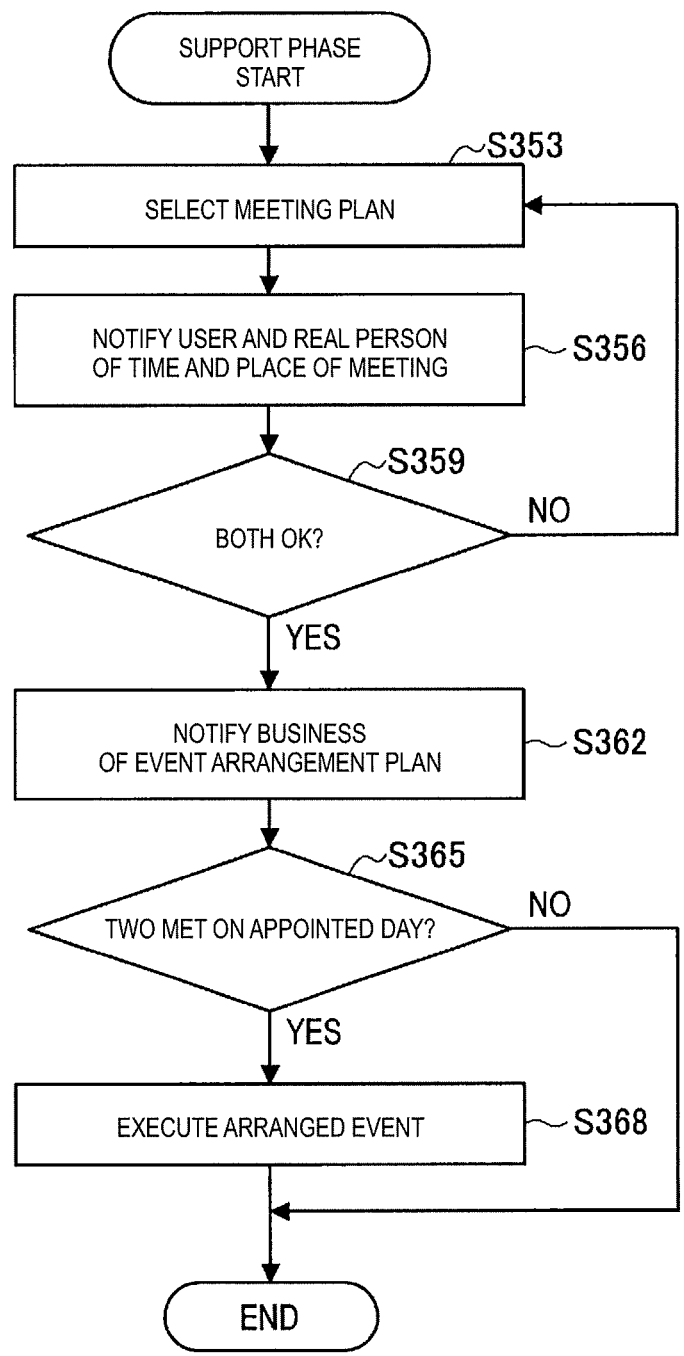
FIG. 22 is a flowchart illustrating an operating process in a support phase according to the present embodiment.

Next, in the case in which both the user and the introduced partner express (select the "want to meet button") an intention to meet each other (step S335/Yes), the support phase illustrated in FIG. 22 is started.

On the other hand, in the case in which either person expresses (selects the "do not want to meet button") no intention to meet (step S338/Yes), the matching with the real person is canceled, and the flow returns to the search phase illustrated in FIG. 19. At this time, the user is able to select whether or not to select a different agent (step S341). In the present embodiment, since multiple agents are available, and since each agent has a different personality, that is, attributes with different initial values, in the case of wanting to start over with an agent of a different type, the user selects a different agent. On the other hand, in the case of not wanting to select a different agent, the attributes of the current agent are changed to the user's preferred attributes again according to dialogue with the user. Also, in the search phase, a person whose matching has been canceled once is not matched for a fixed period.

Support Phase

FIG. 22 is a flowchart illustrating an operating process in the support phase according to the present embodiment. Since a connection with a real person is achieved in the introduction phase, it is not strictly necessary to execute the support phase, but the support phase may be performed according to a user request. Herein, it is possible to select a situation or arrangement, called a "scenario", for when the two people meet.

As illustrated in FIG. 22, first, a meeting plan is selected by the user from among multiple meeting plans (scenarios) stored in the scenario DB 359 (step S353). Note that the scenario management section 358 may also recommend a meeting plan automatically from the content of dialogue between the user and the introduced partner so far. The meeting plan includes a place (such as a restaurant, park, amusement park, or aquarium), content (a surprise arrangement, a present, special treatment, a discount), a time (weekday/weekend, morning/noon/night), expenses, and the like. Specifically, for example, content such as "a surprise present for her at a quiet restaurant . . . " is set in the meeting plan. Depending on the content, the meeting plan can only be viewed on the user side.

Next, the scenario management section 358, following the implemented meeting plan, notifies the user and the real person of the time and place of the meeting (step S356).

Next, the scenario management section 358 confirms whether or not the schedules agree with each other and are OK (step S359). Note that when selecting the meeting plan, the user may be made to specify a time when one's schedule is free.

Next, in the case in which both are OK (step S359/Yes), an arrangement business that will execute the meeting plan is notified (step S362). The arrangement business may be a facility such as a restaurant or an amusement park, for example. Since two people will be making use of the facility according to the meeting plan, this has the merit of acting as an advertisement for the facility side.

Additionally, when it is confirmed that the two people have met on the appointed day (step S365/Yes), the arrangement by the business is executed (step S368). For example, a special menu may be prepared for the introduced partner, the seats offering the best view may be made available at a place with favorable scenery, or the like. Also, depending on the content of the arrangement, performers may be placed nearby and talk about a tourist destination that could lead to the next date or talk about how wonderful marriage is, so that the users are able to hear.

<4-3. Example>

Next, the present embodiment will be described in detail using an example. Herein, an example of cooperating with a marriage consulting service (management server 4) will be described. In this example, the user who is using the system is hypothetically assumed to be an adult man, and is matched to a woman as the introduced partner on the basis of member information of the marriage consulting service. Also, in the present embodiment, a preparation phase for making preparations before the four phases described above will be described.

(4-3-1. Preparation Phase)

The user inputs a profile (user information) in preparation for using the system. Hereinafter, such a case will be specifically described with reference to FIG. 23.

Figure 23:
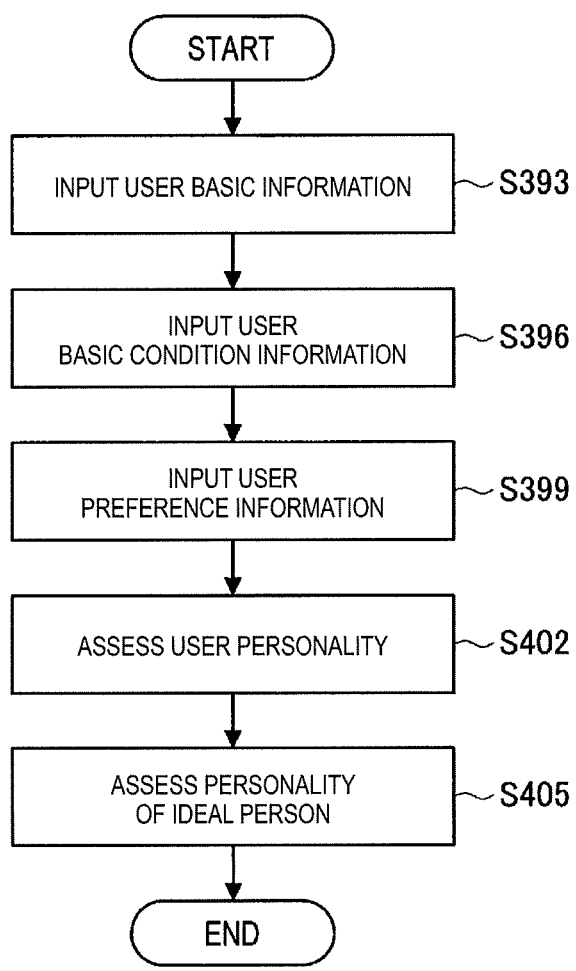
FIG. 23 is a flowchart illustrating an operating process in a preparation phase according to an example.

As illustrated in FIG. 23, first, the user inputs user basic information from the client terminal 1 (step S393). The information input at the client terminal 1 is transmitted to the agent server 2, and stored in the user information DB 352 by the user/agent information management section 351. FIG.

24A illustrates an example of user basic information. As illustrated in FIG. 24A, for example, the user basic information includes information about age, occupation, family structure, living with family members, income, place of residence, and blood type. Also, each item of the user basic information has a public attribute regarding whether or not the item may be viewed by other people.

Next, the user inputs user basic condition information from the client terminal 1 (step S396). The user basic condition information is information related to the attributes of an ideal introduced partner. FIG. 24B illustrates an example of user basic condition information. As illustrated in FIG. 24B, for example, the user basic condition information includes information about age, occupation, family structure, living with family members, income, place of residence, and blood type. Also, the user is able to set a priority level for each item, making it possible to emphasize high-priority items to select the initial agent. Note that the items of the user basic condition information are not limited to the example illustrated in FIG. 24B, and it is also possible to include items such as appearance, personality, way of speaking, and tone of voice, for example.

Next, the user inputs user preference information from the client terminal 1 (step S399). The user preference information is information related to the preferences of the user. FIG. 25 illustrates an example of user preference information. In the user preference information, each item is set in a range from −1.0 (dislike) to 1.0 (like), for example. Also, the configuration is not limited to numerical input, and when inputting the user preference information, it may also be possible to input information in a survey format for each item, such as "strongly like, like, no opinion, dislike, strongly dislike".

Next, the user/agent information management section 351 executes an assessment of the user's personality (step S402). The user personality assessment includes, for example, a method that classifies personality into several patterns on the basis of answers to set questions presented to the user in a survey format, or computes a per-axis score on multiple axes that act as elements of personality in a radar chart or a line graph. In the case of the personality assessment known as an egogram test, by asking the user questions such as "Do you have difficulty saying no?" and "Are you strict about being on time?", for example, points may be aggregated ultimately for each of five axis elements (designated Controlling Parent (CP), Nurturing Parent (NP), Adult ego state (A), Free Child (FC), and Adapted Child (AC)), and a personality assessment result can be expressed ultimately with a line graph called an egogram. Although expressed using a line graph or a radar chart when presented to the user, by saving the points for each element as user personality information inside the user information DB 352, and by comparing the points of elements for each user, the similarity between personalities and whether or not a personality is preferred by the user may be determined.

Next, the user/agent information management section 351 executes a personality assessment of the user's ideal person (step S405). The personality of the user's ideal person can be set by, for example, the user pretending to be one's ideal partner to input information into the egogram text. Similarly, in the personality assessment result of the user's ideal person, points for each element are stored in the user information DB 352 as ideal personality information.

The basic information, basic condition information, preference information, personality information, and ideal personality information described above is also included similarly for agents, and is stored in the agent information DB 360. An example of agent basic information is illustrated in FIG. 26A, an example of agent basic condition information is illustrated in FIG. 26B, and an example of agent preference information is illustrated in FIG. 27. The basic information, basic condition information, preference information, and ideal personality information may be set as initial values for defining the personality of the agent.

The above describes the preparation phase specifically. Similar values to the basic information, basic condition information, preference information, personality information, and ideal personality information prepared in the preparation phase are also stored in the marriage-seeking member information 41 for real persons (marriage-seeking members) on the marriage consulting service side managed by the management server 4.

(4-3-2. Search Phase)

Next, an example of the search phase will be described specifically with reference to FIGS. 28 to 38.

Figure 28:
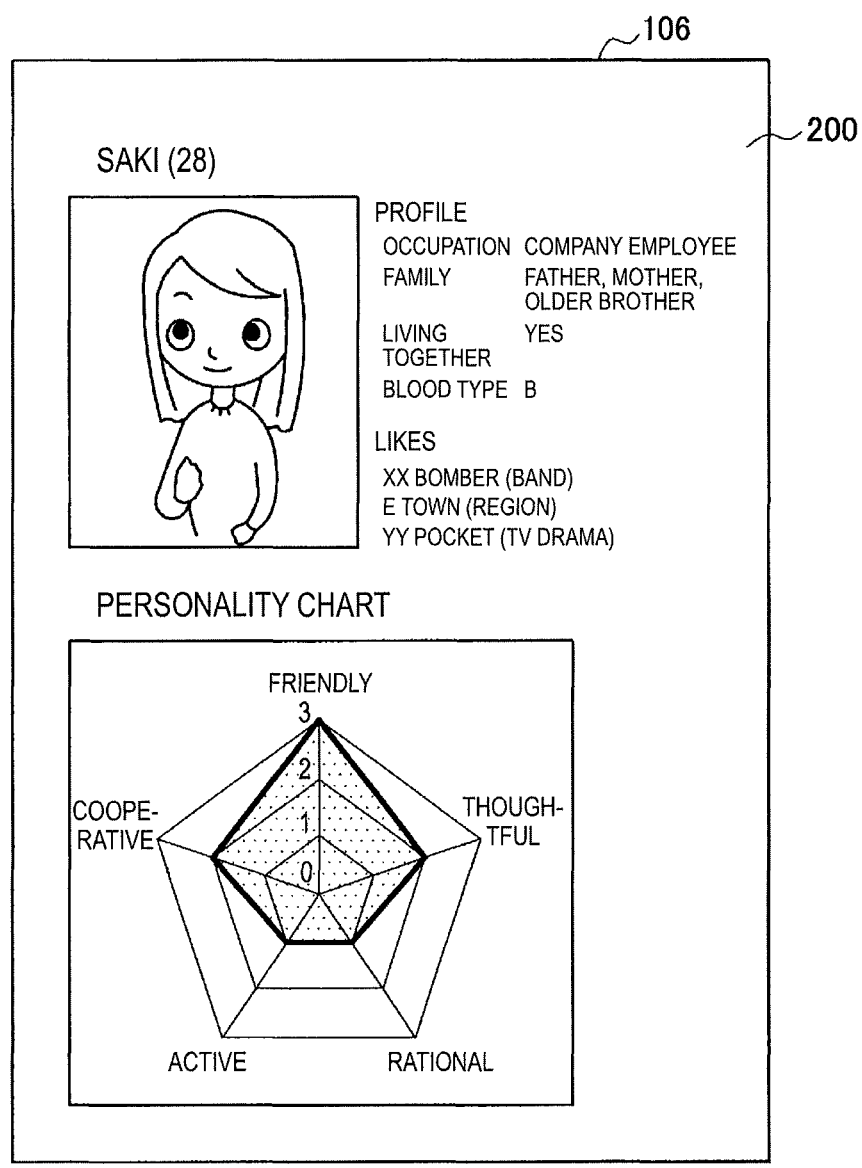
FIG. 28 is a diagram illustrating an agent selection screen example according to the example.

When the preparation phase of inputting the basic information and the like ends, the user is guided next to a screen for selecting an agent. FIG. 28 is a diagram illustrating an example of an agent selection screen according to the example. On the illustrated screen 200, an image of an agent (such as a picture drawn by hand, CG, or a photograph), a basic profile of the agent, and the agent's personality and preferences are displayed. The agent's personality may be displayed with a personality chart as illustrated in FIG. 28, or with a line graph by the egogram described above. Also, agent selection candidates may be generated to reflect the user's preferences. Also, the agent selection candidates may be chosen by matching to the user's preferences from among agents with profiles set in the agent information DB 360, or chosen irrespectively of the user's preferences on the basis of an index, such as order of popularity or order of rating, for example.

Hereinafter, a specific operating process will be described with reference to FIGS. 29A and 29B.

Figure 29A:
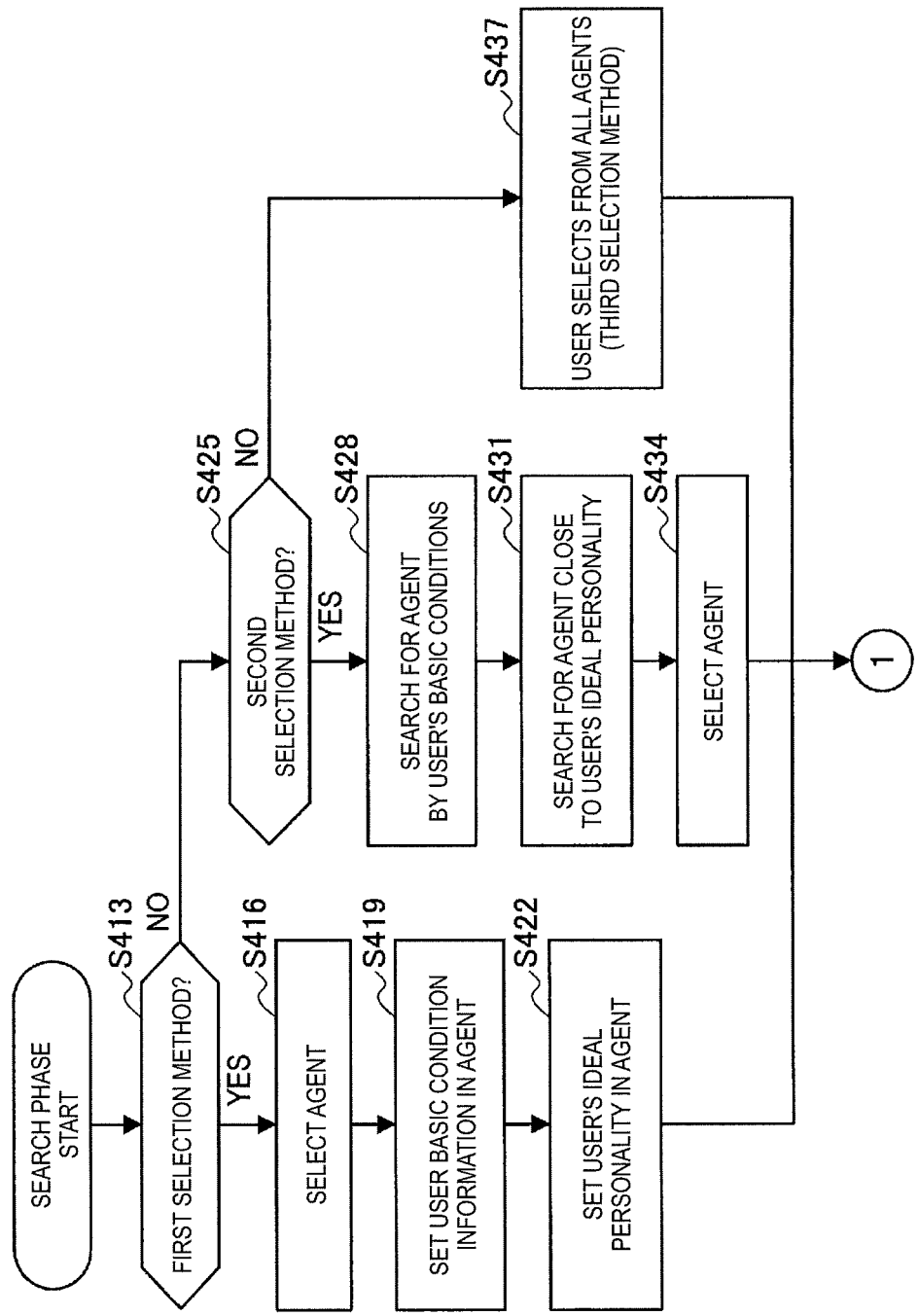
FIG. 29A is a flowchart illustrating an operating process in a search phase according to the example.
Figure 29B:
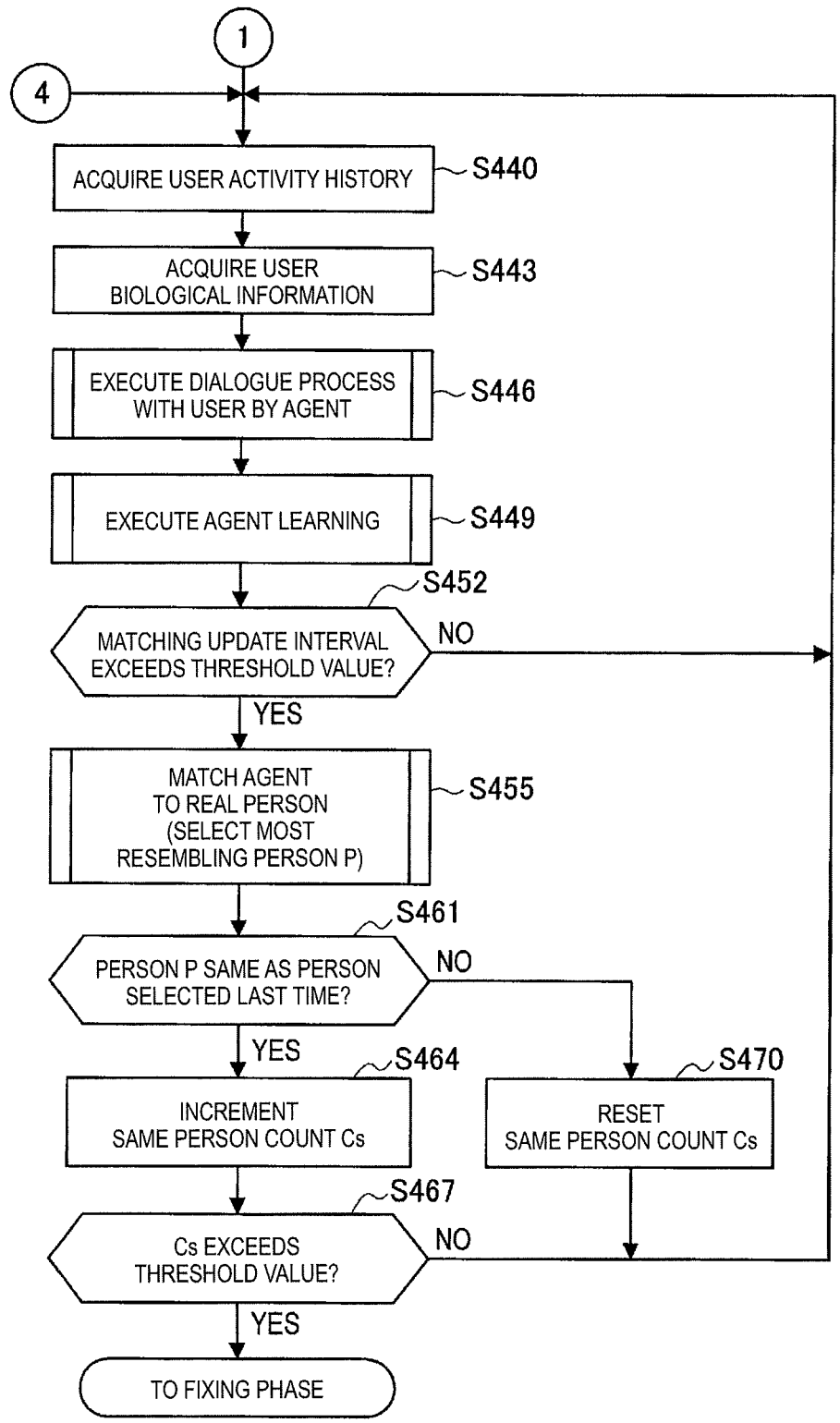
FIG. 29B is a flowchart illustrating an operating process in a search phase according to the example.

FIGS. 29A and 29B are flowcharts illustrating an operating process in a search phase according to the example. As illustrated in FIG. 29A, first, an agent is selected by the user (step S413 to step S437). Three agent selection methods are available, for example. The user is able to select an agent by a preferred selection method.

In the first selection method (step S413/Yes), images of multiple female agents registered in the agent information DB 360 are displayed, and the user selects a female agent of preferred appearance (step S416).

Next, the agent learning section 353 extracts the user's ideal basic conditions and ideal personality input in the preparation phase from the user information DB 352, and sets (registers in the user agent DB 354) the information directly in the selected female agent (step S419, step S422).

In the second selection method (step S425/Yes), on the basis of the user basic condition information and ideal personality information input in the preparation phase, the agent learning section 353 searches the agent information DB 360 for a female agent having close attributes (step S428, step S431), presents search results to the user, and receives an agent selection (step S434). During the agent search, the user preference information additionally may be taken into account to search for a female agent having preference information resembling the user's. Also, among each of the items of the basic condition information, high-priority items may be prioritized to narrow down the candidates to female agents with the most matching attributes.

In the third selection method (step S425/No), the user selects arbitrarily from among all agents while checking the appearance and the profile of the agents (step S437).

Next, as illustrated in FIG. 29B, the user agent dialogue processing section 350 acquires an activity history and biological information about the user (step S440, step S443). A user activity history refers to a history of places where the user has been active, an activity content history, a purchase history, an SNS posting history, and the like, and is acquired from the client terminal 1 or a predetermined server. User activity may be grasped in detail from position information, an Internet history, activity recognition based on acceleration sensor data and gyro sensor data, and the like. Also, user biological information is acquired in real time from the client terminal 1, and the current state of the user (such as being nervous, sleepy, or smiling) is grasped.

Figure 30:
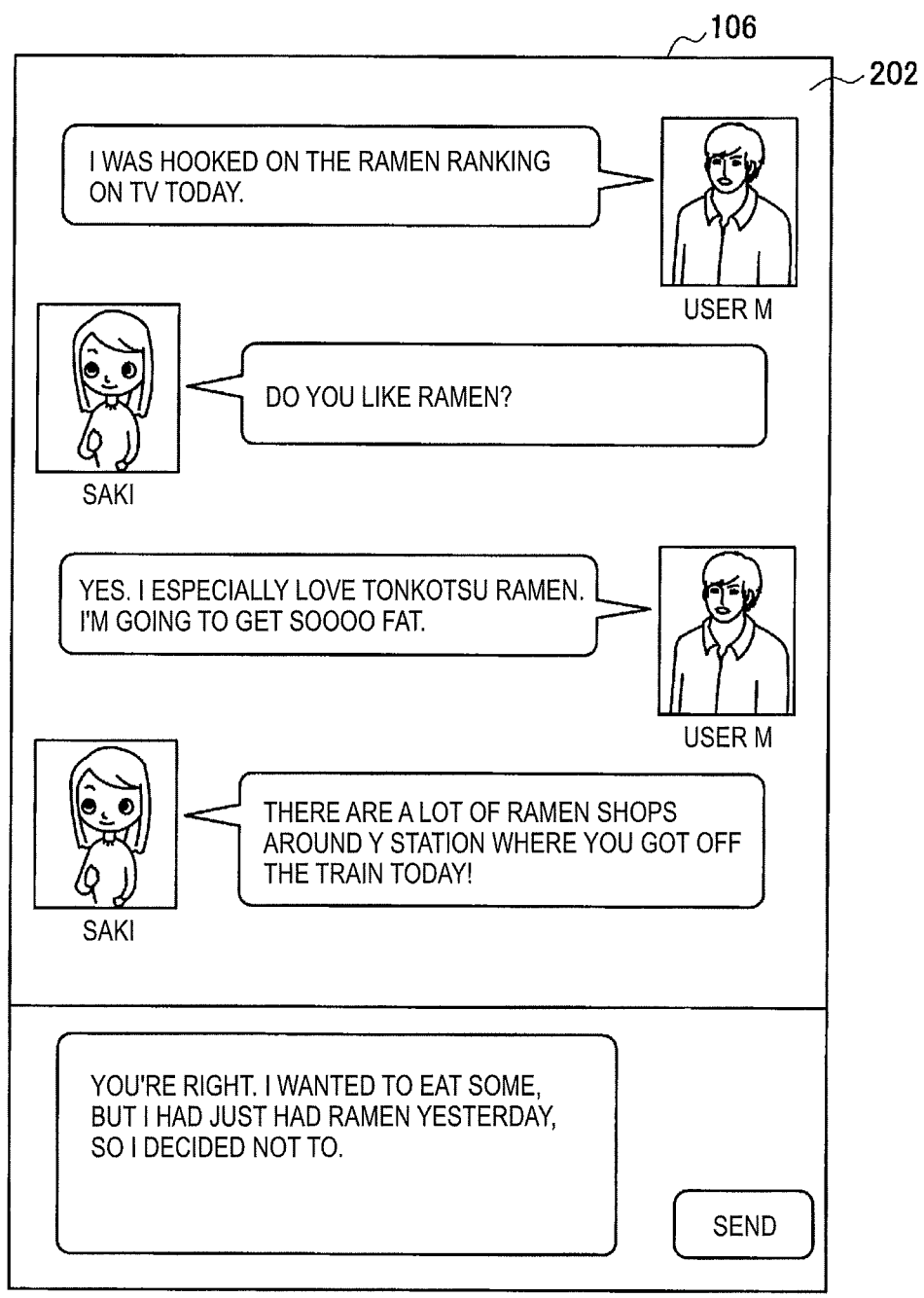
FIG. 30 is a diagram explaining exemplary utterances of an agent utilizing a user activity history according to the example.
Figure 31:
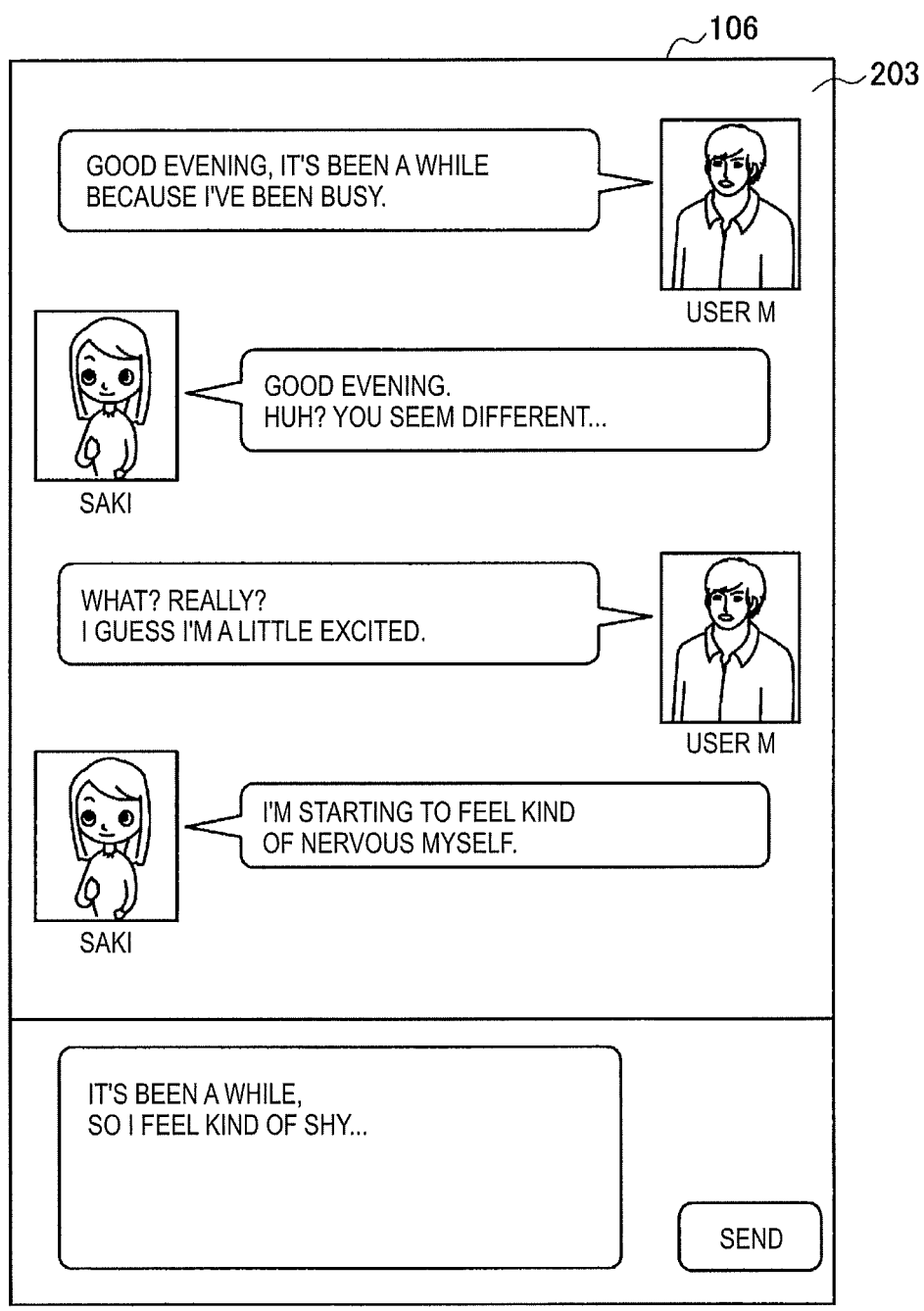
FIG. 31 is a diagram explaining exemplary utterances of an agent utilizing biological information about a user according to the example.
Figure 32:
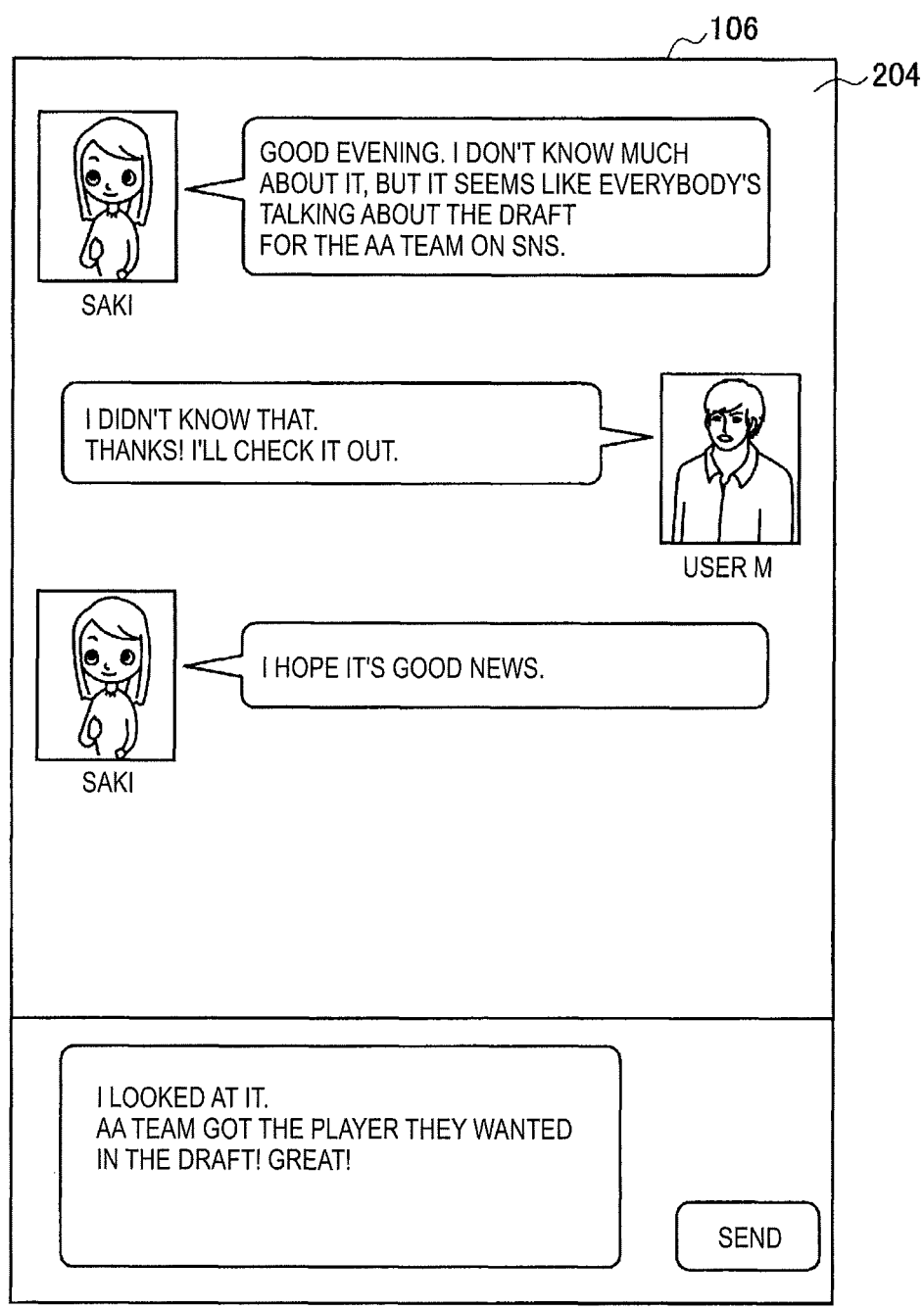
FIG. 32 is a diagram explaining exemplary utterances of an agent utilizing SNS information according to the example.

Next, the user agent dialogue processing section 350 executes the dialogue process with the user by the agent (step S446). At this time, the user agent dialogue processing section 350 may generate responses referencing the acquired user activity history and biological information, and output the responses as utterances of the agent. FIGS. 30 to 32 illustrate an example of dialogue by the agent utilizing the user activity history and biological information. Herein, dialogue is executed between the agent and the user through a chat screen on the display section 106.

FIG. 30 is a diagram explaining exemplary utterances of the agent utilizing the user activity history according to the example. On the illustrated screen 202, a dialogue between a user M and an agent "Saki" is displayed in a chat format. On the bottom of the screen 202, a text input field and a Send button are displayed, such that by the user inputting a message into the text input field and tapping the Send button, the input message is transmitted to the agent server 2 as utterance text.

The user agent dialogue processing section 350 generates responses of the agent "Saki" on the basis of a data set of preset questions and responses, for example. Specifically, with respect to a question such as "I was hooked on OO", "I'm obsessed with OO", or "I have a passion for OO", for example, the response "Do you like OO?" is given. Also, it is also possible for the user agent dialogue processing section 350 to reference an activity history, such as the user M getting off the train at Y Station today, for example, and output an utterance stating "There are a lot of ramen shops around Y Station where you got off the train today!", as illustrated in FIG. 30. With this arrangement, the user M may feel a sense of familiarity with the agent, and a growing perception of the agent as one's very own partner may be anticipated.

FIG. 31 is a diagram explaining exemplary utterances of the agent utilizing biological information about the user according to the example. Biological information is obtained from a biological sensor provided in a wearable device worn by the user or a camera that captures a face image of the user, and is transmitted from the client terminal 1 to the agent server 2 in real time. The user agent dialogue processing section 350 infers the state (psychological state, emotions) of the user on the basis of the biological information, and generates utterances reflecting the inferred result as statements of the agent. For example, in the case in which the heart rate of the user M is faster than normal, as displayed on the screen 203 of FIG. 31, an utterance in tune with the other person's psychological state, such as "Huh? You seem different . . . " or "I'm starting to feel kind of nervous myself", is output. With this arrangement, it is anticipated that the psychological distance to the agent will shorten, and the user will feel more intimate.

FIG. 32 is a diagram explaining exemplary utterances of an agent utilizing SNS information according to the example. The user agent dialogue processing section 350 searches SNS and websites for topics in agreement with the user preference information to use in utterances of the agent. For example, as displayed on the screen 204 of FIG. 32, an utterance such as "I don't know much about it, but it seems like everybody's talking about the draft for the AA team on SNS" is output. By providing topics matching the preferences of the user M in this way, it is anticipated that talk will become more lively, and the user M will feel more enjoyment out of conversation with the agent.

The details of the dialogue process by the user agent dialogue processing section 350 described above are illustrated in FIGS. 33A and 33B.

Figure 33B:
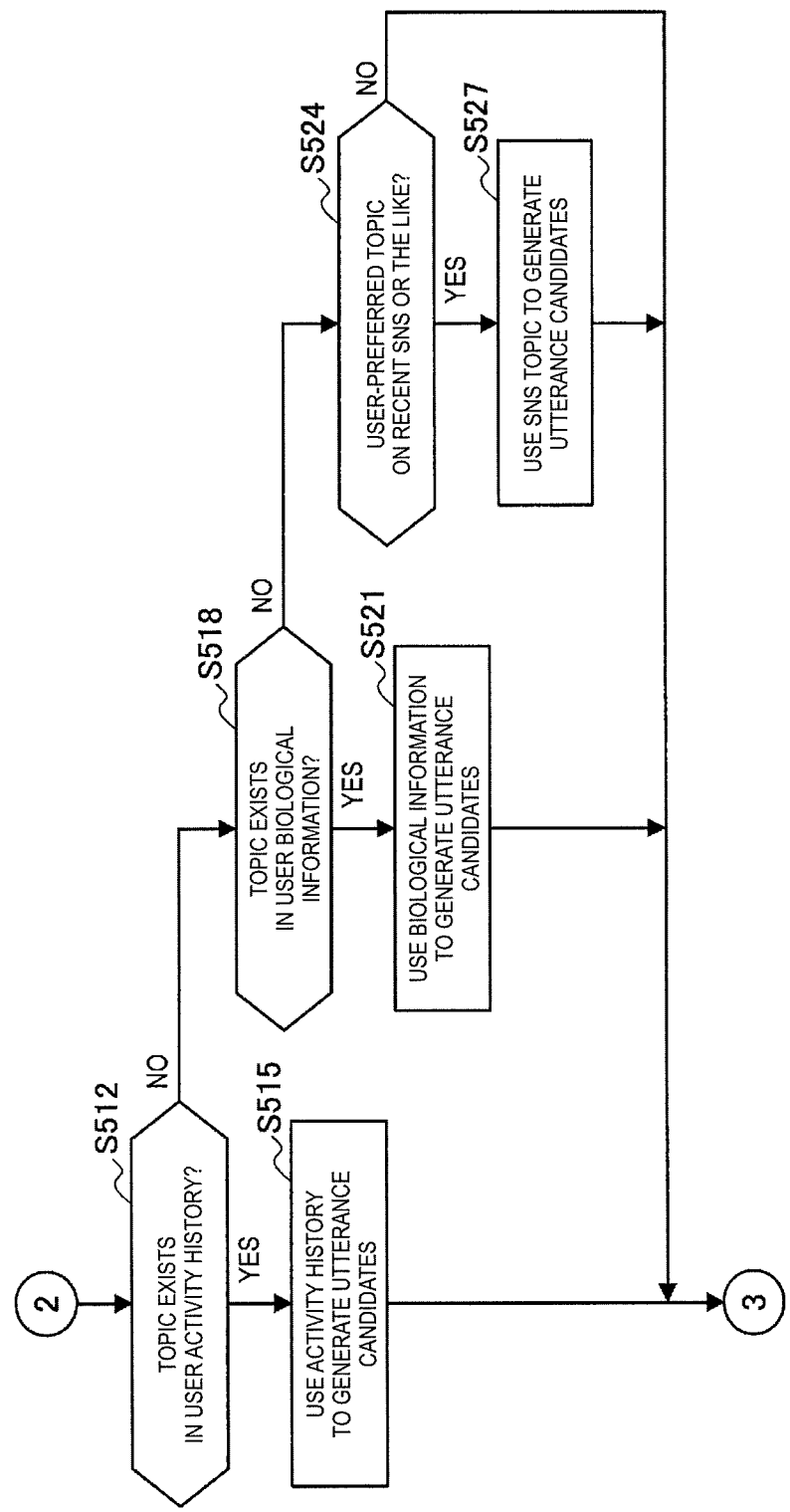
FIG. 33B is a flowchart of an agent dialogue process according to the example.

FIGS. 33A and 33B are flowcharts of the agent dialogue process according to the example. As illustrated in FIG. 33A, first, in the case in which a fixed time has elapsed since the last conversation with the user (step S473/Yes), the user agent dialogue processing section 350 issues a greeting (step S476).

Next, in the case in which a predetermined period continues in a state in which a user to introduce is not selected (step S479/Yes), the user agent dialogue processing section 350 generates and utters a personality improvement (or ideal improvement) message to the user (step S482). The selection of a user to introduce will described in detail later.

Next, in the case in which there is new input (an utterance) from the user (step S485/Yes), the agent server 2 executes speech recognition on the uttered speech (step S488), and executes text analysis on the utterance text (step S491).

Next, the user agent dialogue processing section 350 of the agent server 2 generates utterance candidates according to the attributes (each item of the basic information, basic condition information, and preference information) of the user (step S494).

Next, in the case in which the user activity history is available (step S497/Yes), the user agent dialogue processing section 350 refines the utterance candidates according to the activity history (step S498)

Also, in the case in which the user biological information is available (step S500/Yes), the user agent dialogue processing section 350 refines the utterance candidates according to the biological information (step S503). Note that the user agent dialogue processing section 350 may also refine the utterance candidates using both the activity history and the biological information.

Next, in the case in which an utterance candidate exists (step S506/Yes), the user agent dialogue processing section 350 outputs the utterance candidate as a statement of the agent (step S509). Note that in the case in which an utterance candidate does not exist (step S506/No), the agent does not make a statement.

The agent dialogue described above is described as being a response in the case in which there is new input (an utterance) from the user, but the dialogue according to the example is not limited thereto, and statements may also be made from the agent side.

Specifically, in the above step S485, in the case in which there is no new input (an utterance) from the user (step S485/No), as illustrated in FIG. 33B, the user agent dialogue processing section 350 determines whether or not a topic exists in the user activity history (step S512). For example, the user agent dialogue processing section 350 determines, from the activity history, whether or not noteworthy activity exists, such as going out to a tourist destination, getting off the train at a station different from usual, or making an expensive purchase.

Next, in the case in which a topic exists (step S512/Yes), the user agent dialogue processing section 350 generates utterance candidates using the activity history (step S515).

Next, it is determined whether or not a topic exists in the user biological information (step S518) For example, the user agent dialogue processing section 350 determines, on the basis of the biological information, a noteworthy state or emotion that is different from normal, such as smiling, cheerfulness, sleepiness, tiredness, excitement, or anger.

Next, in the case in which a topic exists (step S518/Yes), the user agent dialogue processing section 350 generates utterance candidates using the biological information (step S521).

Next, recent SNS, websites, and the like are searched for topics preferred by the user, and in the case in which a user-preferred topic exists (step S524/Yes), the user agent dialogue processing section 350 generates an utterance candidates using the topic on the SNS or the like (step S527).

Note that although FIG. 33B illustrates the flow of generating utterance candidates by utilizing any one of the activity history, biological information, SNS information, and the like, the example is not limited thereto, and it is also possible to generate utterance candidates by combining the information of any one or more among the activity history, biological information, SNS information, and the like.

Next, returning to FIG. 29B, the agent learning section 353 executes agent learning as appropriate, in accordance with the dialogue between the agent and the user (step S449). Specifically, the agent learning section 353 updates the attributes of the agent to the user's preferred attributes. Hereinafter, such a case will be described specifically with reference to FIGS. 34 and 35.

Figure 34:
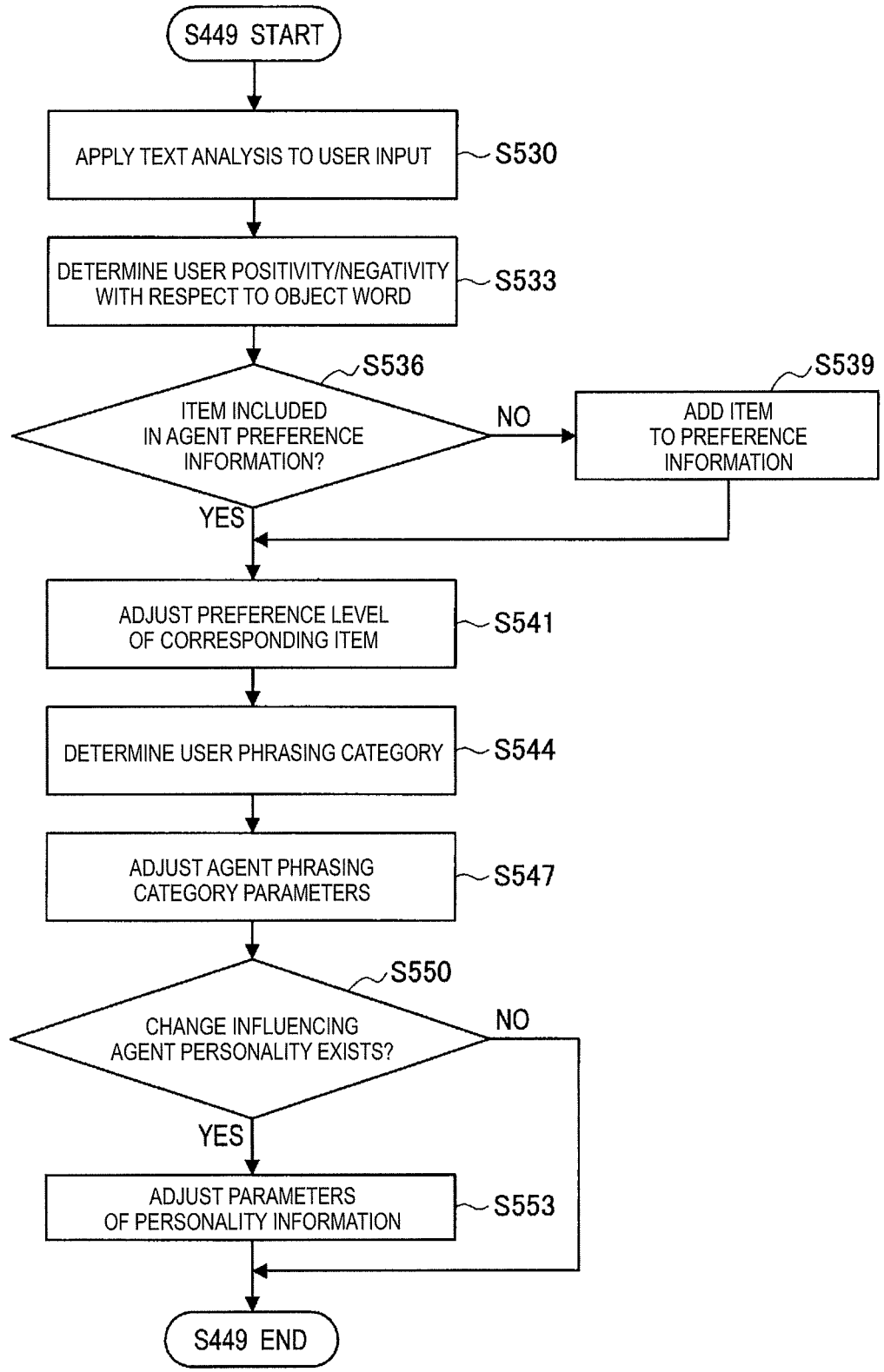
FIG. 34 is a flowchart illustrating an operating process of agent learning according to the example.

FIG. 34 is a flowchart illustrating an operating process of agent learning according to the example. As illustrated in FIG. 34, first, the agent learning section 353 executes text analysis on the input (utterance text) of the user (step S530).

Next, the agent learning section 353 determines the user positivity/negativity with respect to an object word (a phenomenon which is a target of preference) (step S533).

Next, the agent learning section 353 checks whether or not the above object word is an item included in the agent preference information (step S536), and if not included, adds an item of the object word to the agent preference information (step S539).

Next, the agent learning section 353 adjusts a preference level (a numerical value of preference) of the items corresponding to the agent preference information (step S541). In other words, on the basis of the dialogue content, the agent learning section 353 discriminates the user positivity/negativity with respect to a certain phenomenon, and causes the discrimination result to be reflected in the agent preference information, and thereby is able to bring the agent's preferences closer to the user's preferences. Note that not only the agent preference information but also the agent basic information and basic condition information may be made to reflect the user's preferences.

Figure 35:
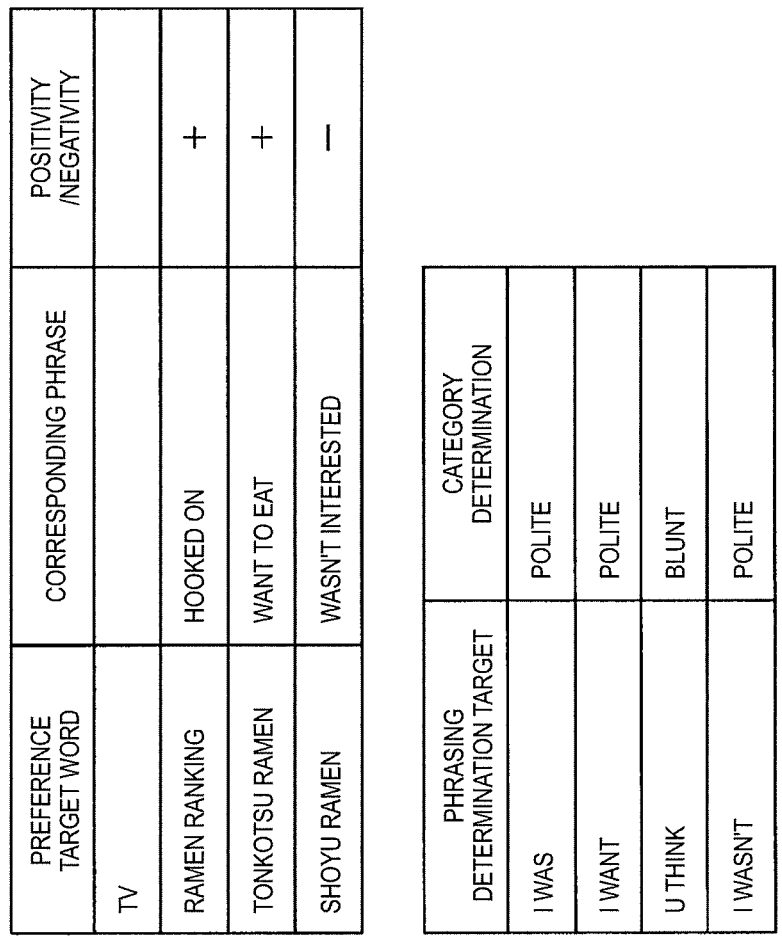
FIG. 35 is a diagram for explaining a negativity/positivity determination and a phrasing determination according to the example.

At this time, since it would be unnatural for the agent's preferences and personality to change suddenly, the agent learning section 353 may also keep the updating of numerical values to an adjustment inside a fixed range. For example, as illustrated in FIG. 35, in the case in which the user inputs "I was hooked on the ramen ranking on TV today, and now I want to eat some tonkotsu ramen. u think I'll get fat? I wasn't interested in the light shoyu ramen.", by text analysis, "TV", "ramen ranking", "tonkotsu ramen", and "shoyu ramen" are extracted as object words (preference target words). The agent learning section 353 determines the positivity/negativity with respect to each object word according to each corresponding phrase indicating the user's impression with respect to the object word, as illustrated in the table in the upper-right of FIG. 35. In the example illustrated in FIG. 35, since the user is confirmed to have positive feelings about "ramen", "ramen" is added to the agent preference information, and the preference level (the numerical value of preference) is raised to be more similar to the user's preferences. At this time, the points to add may be varied according to words (such as "very much" or "a little") expressing the strength of preference, and for a single statement, for example, the value may be changed by 0.1 at a time. Also, the agent learning section 353 may normalize the preference level such that 1.0 is the maximum and −1.0 is the minimum.

Next, the agent learning section 353 determines a category of the user's phrasing (step S544). Herein, by changing the agent's phrasing to match the user's phrasing, the agent can be made to match the tone of the user. Phrasing categories are divided into, for example, polite, blunt (gruff), kind, rowdy, fast, slow, and the like.

Next, the agent learning section 353 adjusts phrasing category parameters of the agent (step S547). The phrasing category parameters of the agent may be stored in the user agent DB 354. The phrasing category determination may be made by treating the most frequent category among the phrasing categories collected from user dialogue in a fixed period as a phrasing category representative of the user. For example, in the example illustrated in FIG. 35, as illustrated in the lower-right of FIG. 35, since the "polite" category is extracted three times while the "blunt" category is extracted one time, the phrasing category representative of the user may be determined to be "polite". Alternatively, the agent learning section 353 may treat the probability of occurrence of each phrasing category extracted from user dialogue as the determination result. Subsequently, the agent learning section 353 causes the phrasing category representative of the user or the probability of occurrence of each phrasing category to be reflected in the phrasing category parameters of the agent.

Next, the agent learning section 353 checks whether or not a change in the preference information and phrasing parameters described above influences the agent's personality (step S550), and if so, adjusts the parameters of the agent's personality information (step S553). Since personality is expressed by one's preferences and phrasing, the personality parameters are adjusted in accordance with the changed preferences and phrasing.

As described above, the agent gradually develops into the user's preferred agent through continued dialogue between the agent and the user.

Next, returning to FIG. 29B, the user-to-introduce selection section 355 determines whether or not a matching update interval described next has exceeded a threshold value (step S452). The matching update interval is set appropriately, such as to one day or one week, for example.

Next, the user-to-introduce selection section 355 executes matching between a real person and the agent (step S455). In the example, matching between real persons and the agent is executed periodically behind the scenes as dialogue between the agent and the user progresses. Specifically, for example, the user-to-introduce selection section 355 references the marriage-seeking member information 41 to search for a real person resembling the agent. As described above, since the user agent is changing into the user's preferred agent, by matching a real person resembling the agent, a partner who is compatible with the user can be found more effectively. Hereinafter, such a case will be described specifically with reference to FIGS. 36 and 38.

Figure 36:
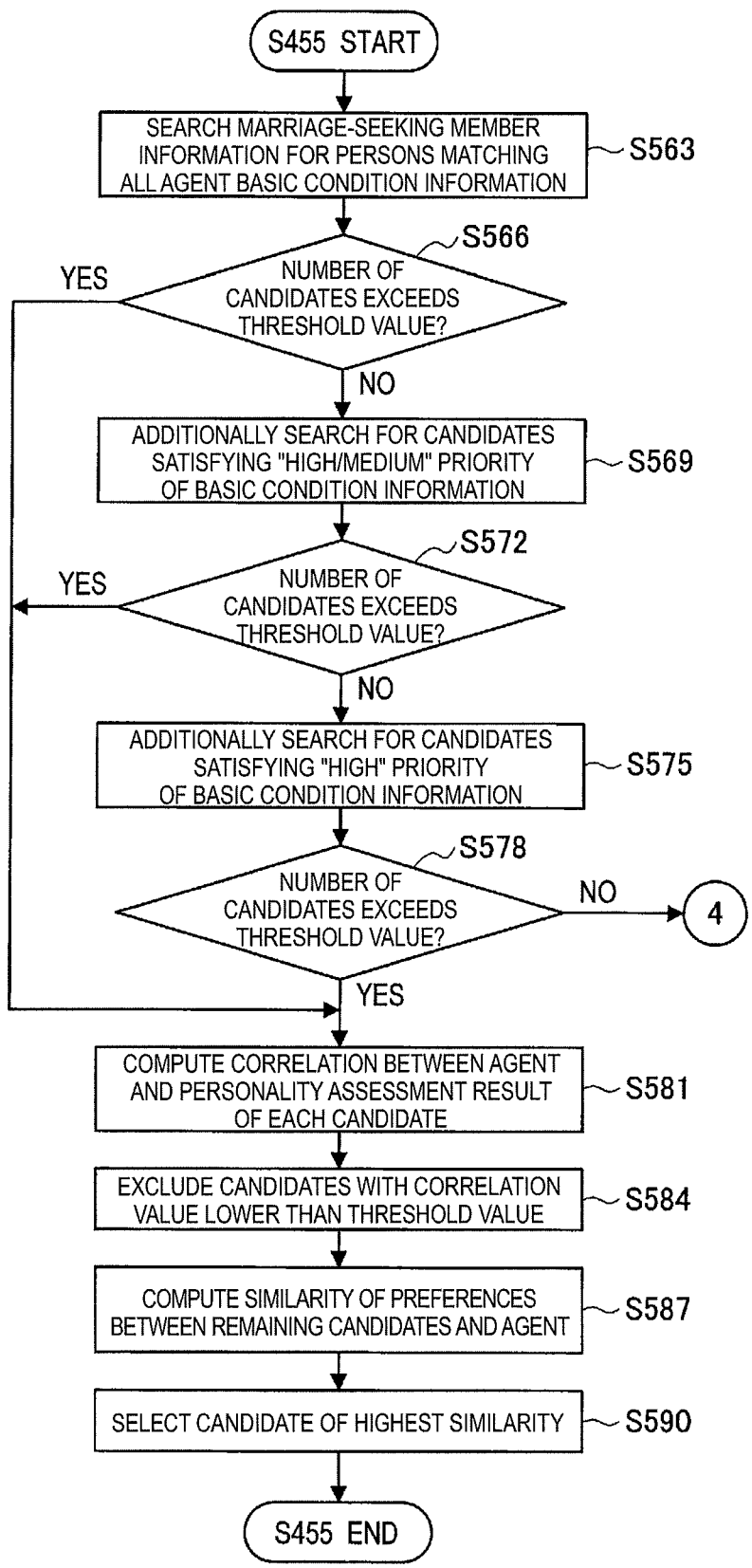
FIG. 36 is a flowchart illustrating an operating process of matching according to the example.
Figure 37:
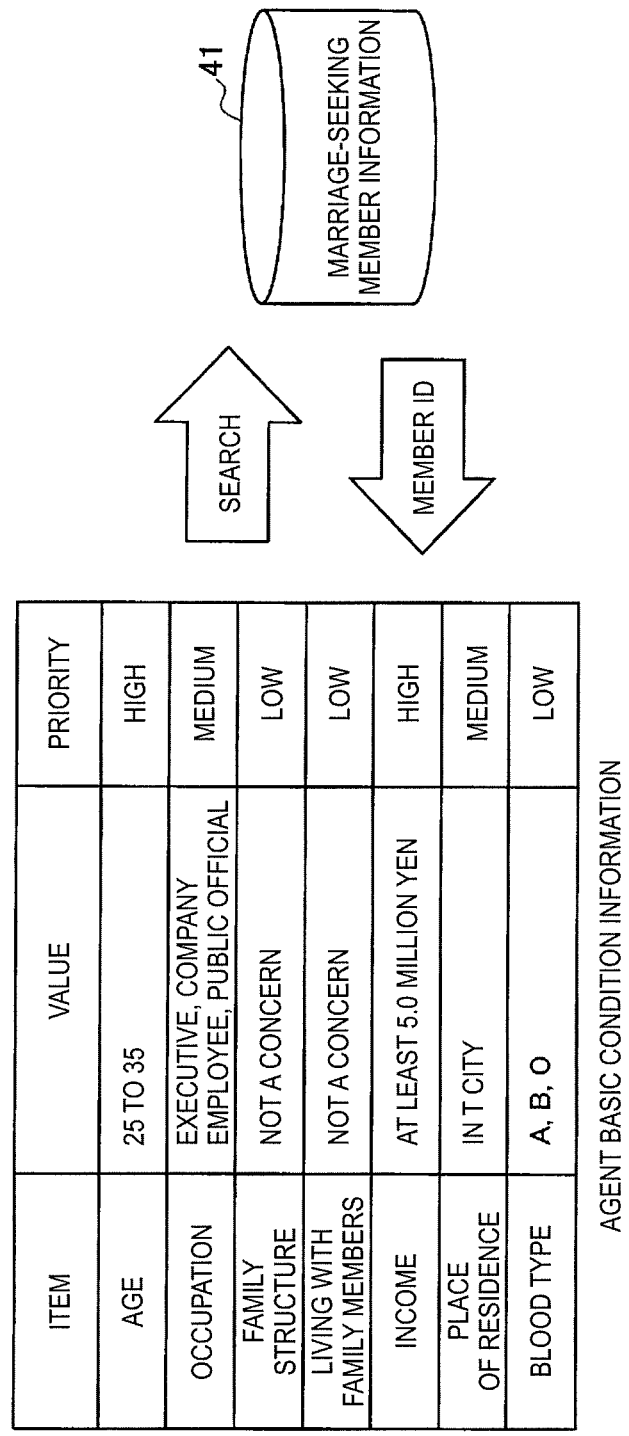
FIG. 37 is a diagram explaining a search using agent basic condition information according to the example.

FIG. 36 is a flowchart illustrating an operating process of matching according to the example. As illustrated in FIG. 36, first, the user-to-introduce selection section 355 searches the marriage-seeking member information for persons who match all of the agent basic condition information (step S563). FIG. 37 is a diagram explaining a search using the agent basic condition information. As illustrated in FIG. 37, the marriage-seeking member information is screened on the basis of whether or not basic condition items satisfy the conditions. For example, the user-to-introduce selection section 355 sends the basic condition information to the management server 4, and acquires one or more member IDs satisfying the conditions from the marriage-seeking member information 41.

Next, it is determined whether or not the number of found candidates (the number of marriage-seeking members) exceeds a threshold value (fixed number) (step S566). With this arrangement, a number of candidates from which to choose the matching partner, such as a minimum of 10 people, for example, can be secured.

Next, in the case in which the number of candidates does not exceed the threshold value (step S566/No), the user-to-introduce selection section 355 searches for candidates who satisfy items of "high/medium" priority in the basic condition information (step S569).

Next, in the case in which the number of candidates still does not exceed the threshold value (step S572/No), the user-to-introduce selection section 355 additionally searches for candidates who satisfy items of "high" priority in the basic condition information (step S575).

Next, in the case in which the number of candidates exceeds the threshold value (step S578/Yes), the user-to-introduce selection section 355 computes the correlation between the agent and the personality assessment result of each candidate (step S581). At this point, assume that each marriage-seeking member has also conducted the personality assessment described in the preparation phase in advance. For example, the user-to-introduce selection section 355 adds up the square values of the difference for each value of the egogram between the agent and each candidate, and computes the cross-correlation.

Next, the user-to-introduce selection section 355 excludes candidates whose correlation value is lower than a predetermined threshold value (step S584).

Next, the user-to-introduce selection section 355 computes the similarity of preferences between the remaining candidates and the agent (step S587), and selects the candidate (person P) of highest similarity (step S590). The computation of preference similarity is executed using the preference information.

Specifically, the user-to-introduce selection section 355 generates a n-dimensional vector in which the numerical values of matching items among each item of the preference information are arranged for the agent and a certain candidate, for example, and computes the cos θ inner product of the n-dimensional vector of the agent and the n-dimensional vector of the candidate person. If the numerical value is 1.0, the similarity is a complete match, whereas if 0.0, the similarity is a complete mismatch.

However, in the case in which n is smaller than a predetermined threshold value, the candidate person is excluded from the candidates without executing the similarity computation. This is because even if a few items match, the reliability is low.

Figure 38:
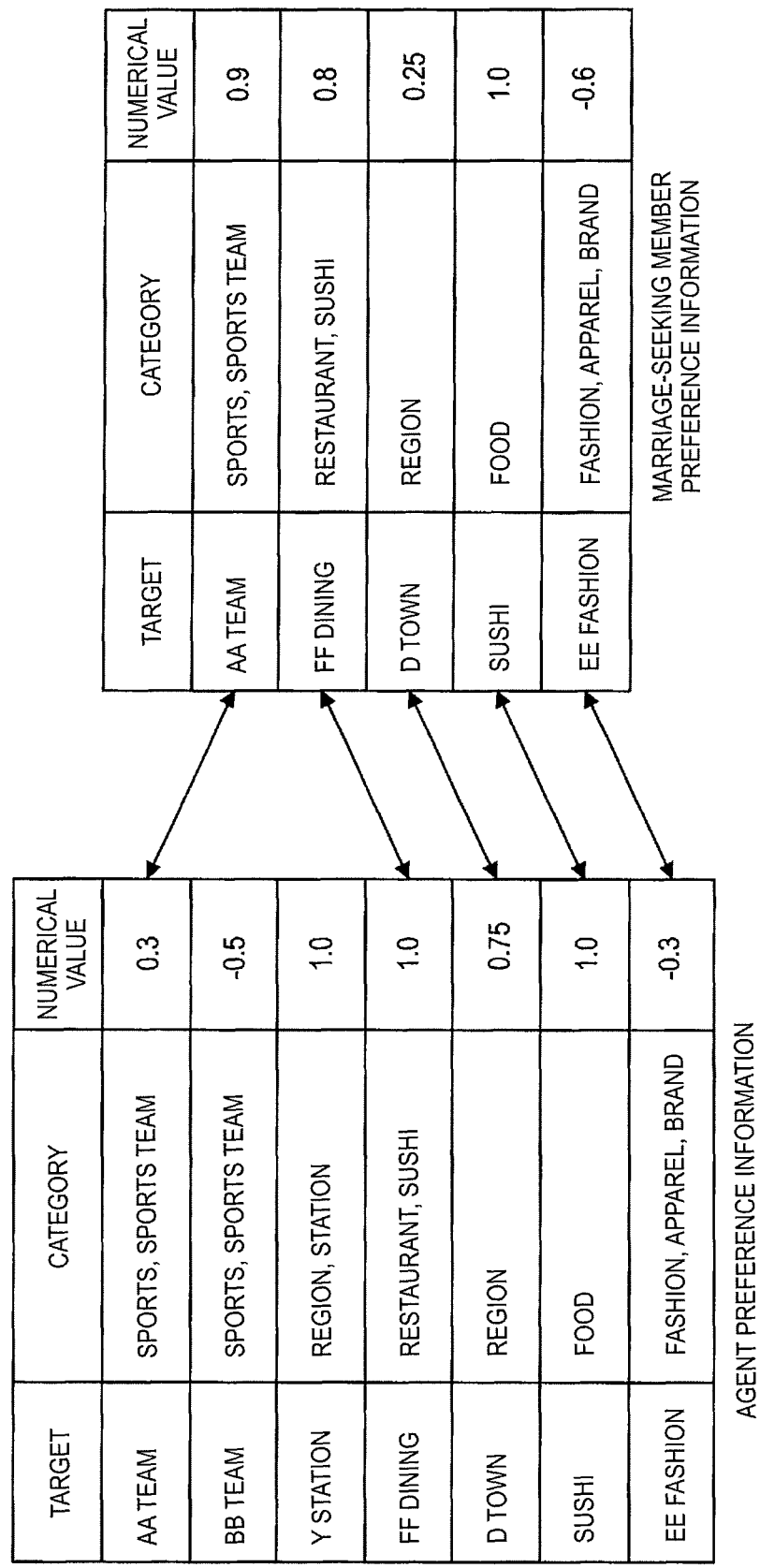
FIG. 38 is a diagram explaining a similarity computation of preference information according to the example.

For example, in the example illustrated in FIG. 38, among the preference information of the agent and the preference information of a candidate person, namely a marriage-seeking member, the five items "AA Team", "FF Dining", "D Town", "Sushi", and "EE Fashion" match. Consequently, the user-to-introduce selection section 355 respectively generates 5-dimensional vectors in which the numerical values of these five items are arranged.

On the other hand, in the case in which the number of candidates does not exceed the threshold value (step S578/No), since there are few candidates, matching is canceled, and the flow returns to step S440 illustrated in FIG. 29B.

The above describes matching between the agent and a real person (selection of the user to introduce (person P)) according to the present embodiment.

Next, returning to FIG. 29B, the user-to-introduce selection section 355 checks whether or not the selected person P is the same as the person selected the last time (step S461). As described above, the matching of a real person may be executed periodically (such as once per day, for example) while dialogue between the agent and the user is executed.

Next, in the case in which the selected person P is the same as the person selected the last time (step S461/Yes), the user-to-introduce selection section 355 increments a same person count Cs (step S464).

On the other hand, in the case in which the selected person P is not the same as the person selected the last time (step S461/No), the user-to-introduce selection section 355 resets the same person count Cs (step S470).

Next, the user-to-introduce selection section 355 periodically executes matching with a real person until the same person count Cs exceeds a threshold value (step S467). In the case in which the same person count Cs exceeds the threshold value (step S467/Yes), the fixing phase illustrated in FIG. 39 is started.

(4-3-3. Fixing Phase)

Next, an example of the fixing phase will be described specifically with reference to FIGS. 39 to 41. In the fixing phase, while the user and the agent continue dialogue similarly as during the search phase, the preferences and personality attributes of the agent are gradually made more similar to the real person matched in the search phase, and the affinity (closeness) with the real person is determined without the user noticing.

Figure 39:
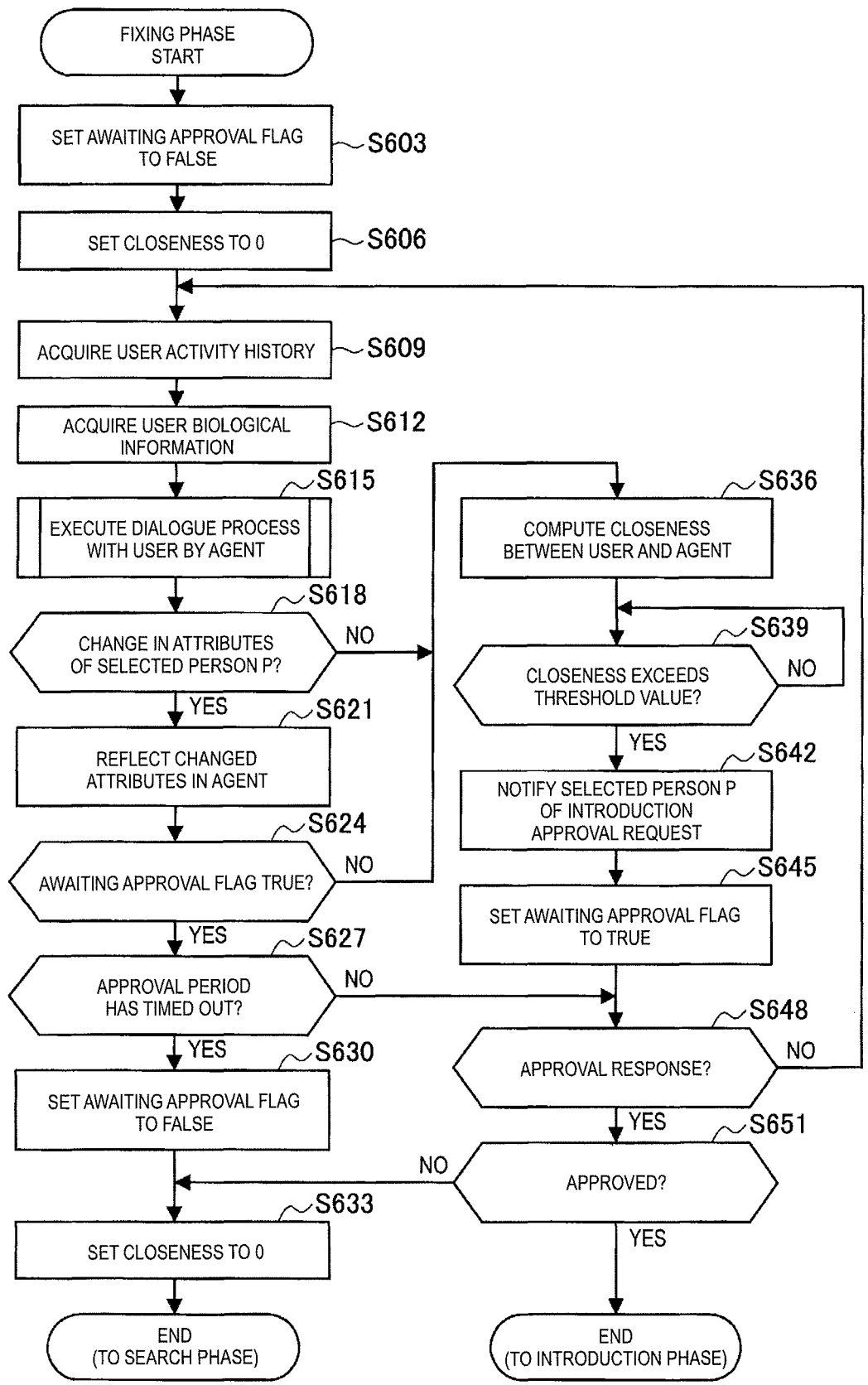
FIG. 39 is a flowchart illustrating an operating process in a fixing phase according to the example.

FIG. 39 is a diagram illustrating an operating process in the fixing phase according to the example. As illustrated in FIG. 39, first, an awaiting approval flag is set to false (step S603).

Next, the closeness computation section 356 sets the closeness to 0 (step S606).

Next, the dialogue process with the user utilizing the user activity history and biological information continues to be executed by the user agent dialogue processing section 350, similarly to the above steps S440 to S446 (step S609 to step S615).

Next, the agent learning section 353 checks whether or not a change has occurred in the preferences, basic information, or personality information attributes of the selected person P (step S618), and if a change has occurred, the agent learning section 353 causes the change to be reflected in the attributes of the agent preference information, basic information, personality information, and the like (step S621). At this time, the changed value may be copied directly, but since a sudden change in the agent's preferences may feel unnatural to the user in some cases, the amount by which to change a value at once may also be limited. The preferences of the agent are made to match the preferences of the person P over a fixed time.

Figure 40:
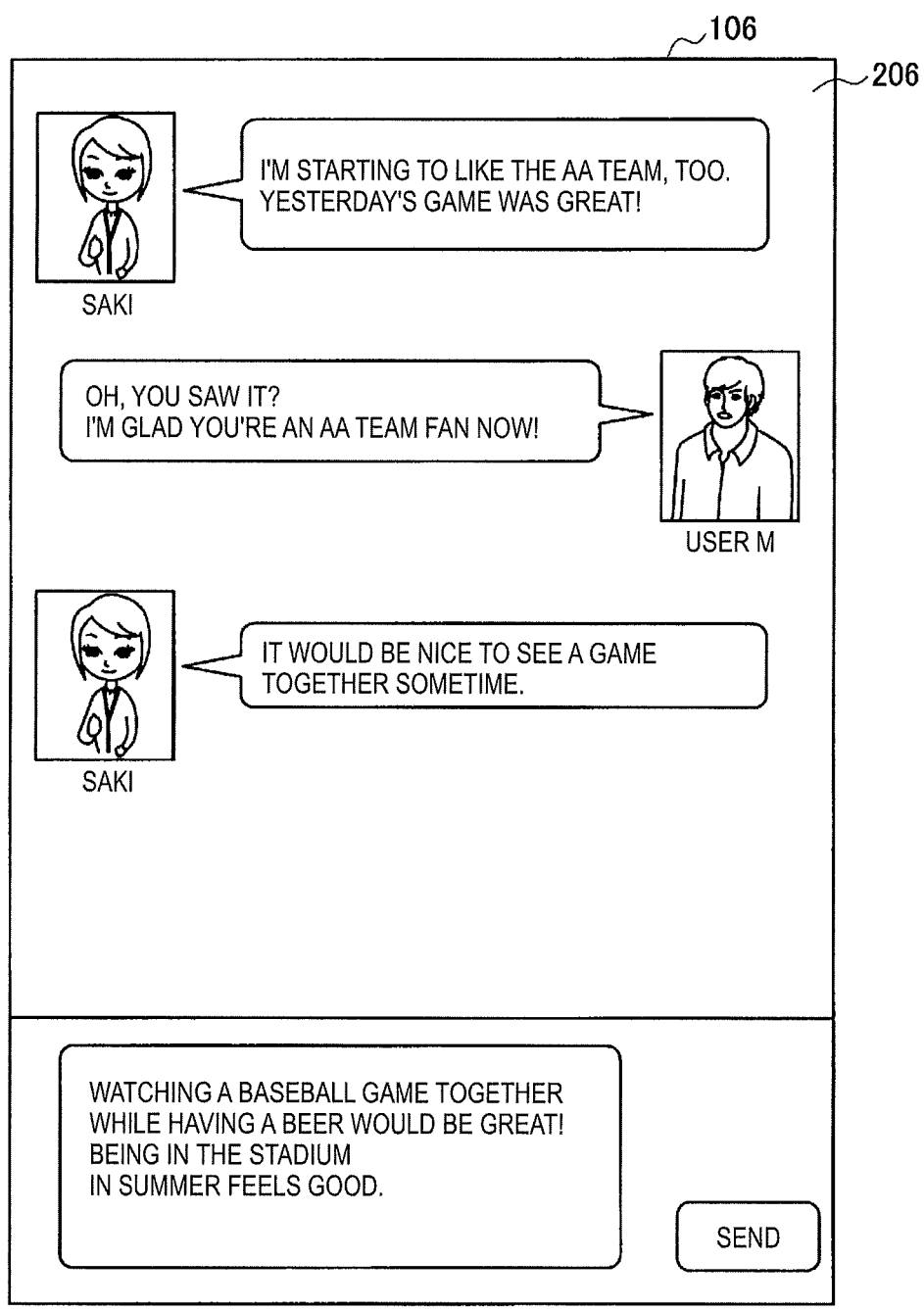
FIG. 40 is a diagram illustrating a dialogue example in a case in which agent preferences change according to the example.
Figure 41:
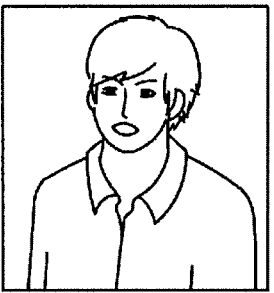
FIG. 41 is a diagram illustrating an example of a notification screen of an introduction approval request according to the example.

Herein, FIG. 40 illustrates a dialogue example in a case in which the agent's preferences have changed. Suppose that the agent "Saki" illustrated in FIG. 40 had an attribute of not particularly liking the AA team at the time of the search phase when the agent had been in dialogue with the user M (in the search phase, since the agent is aligned gradually with the preferences of the user, the agent would have become a fan of the AA team over time). However, in the case in which a real person matched by other preferences and personality is selected, and the flow proceeds to the fixing phase, the preferences of the agent "Saki" now become similar to the preferences of the real person. Subsequently, in the case in which the real person coincidentally is also a fan of the AA team, the preferences of the agent "Saki" are adjusted to like the AA team, and as illustrated on the screen 206 of FIG. 40, for example, a more positive statement about the topic of the AA team, such as "I'm starting to like the AA team, too. Yesterday's game was great!", is output.

Next, in the case in which the awaiting approval flag has not become true (step S624/No), the closeness computation section 356 computes the closeness between the user and the agent (step S636). The method of computing the closeness may be similar to the method of matching the agent to a real person executed by the user-to-introduce selection section 355 using the basic condition information, preference information, and the like. In other words, the degree of coincidence of items in the basic condition information, preference information, and the like is computed as the closeness. Also, numerical values based on the amount of conversation between the user and the agent and the amount of smiling during conversation additionally may be added to the closeness.

Next, in the case in which the closeness exceeds a threshold value (step S639/Yes), the introduction processing section 357 notifies the selected person P (the marriage-seeking member matched to the agent) of an introduction approval request (step S642), sets the awaiting approval flag to true, and waits for approval (step S645). Herein, FIG. 41 illustrates an example of a notification screen of the introduction approval request. In the illustrated example, on a screen 207, a profile of the user M (to the extent that the user M has made public) is displayed, and in addition, an Approve button 207a and a Reject button 207b are displayed. The person P receiving the introduction approval request notification checks the profile of the user M, and taps the Approve button 207a in the case of agreeing to be introduced to the other person, or taps the Reject button 207b in the case of not agreeing.

Next, the user M side is in the awaiting approval state until there is an approval response (step S648), during which dialogue with the agent and agent learning are continued (steps S609 to S624).

Next, in the case of a timeout with no response from the person P in a fixed period (step S627/Yes), the introduction processing section 357 sets the awaiting approval flag to false (step S630), and in addition, the closeness computation section 356 sets the closeness to 0 (step S633). In this case, the matching with the person P is canceled, and the flow returns to the search phase.

Also, in the case in which the person P does not approve (step S651/No), the closeness is reset to 0 (step S633), the matching with the person P is canceled, and the flow returns to the search phase.

Figure 42:
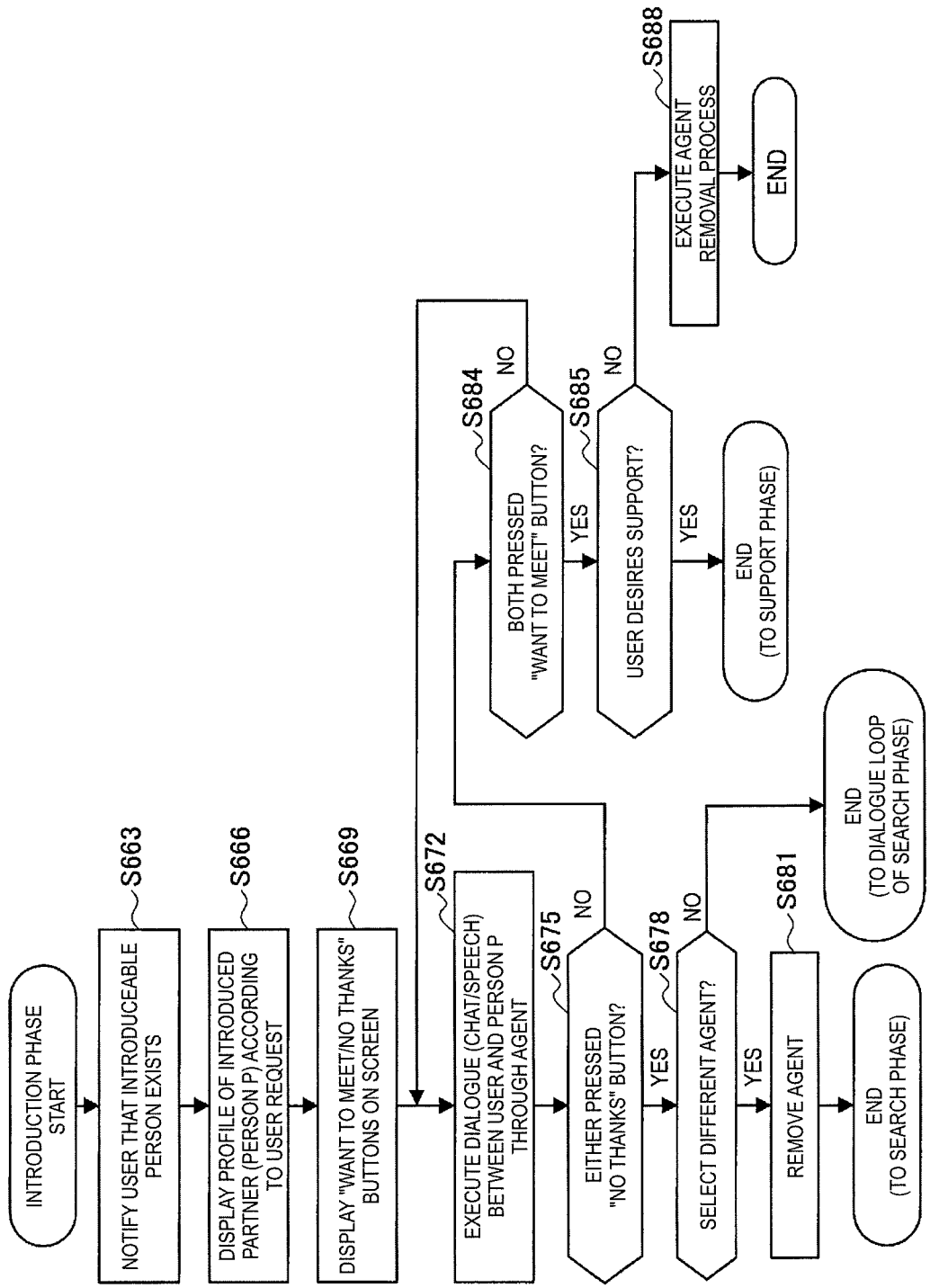
FIG. 42 is a flowchart illustrating an operating process in an introduction phase according to the example.

On the other hand, in the case in which the person P approves (step S651/Yes), the introduction phase illustrated in FIG. 42 is started.

(4-3-4. Introduction Phase)

Figure 43:
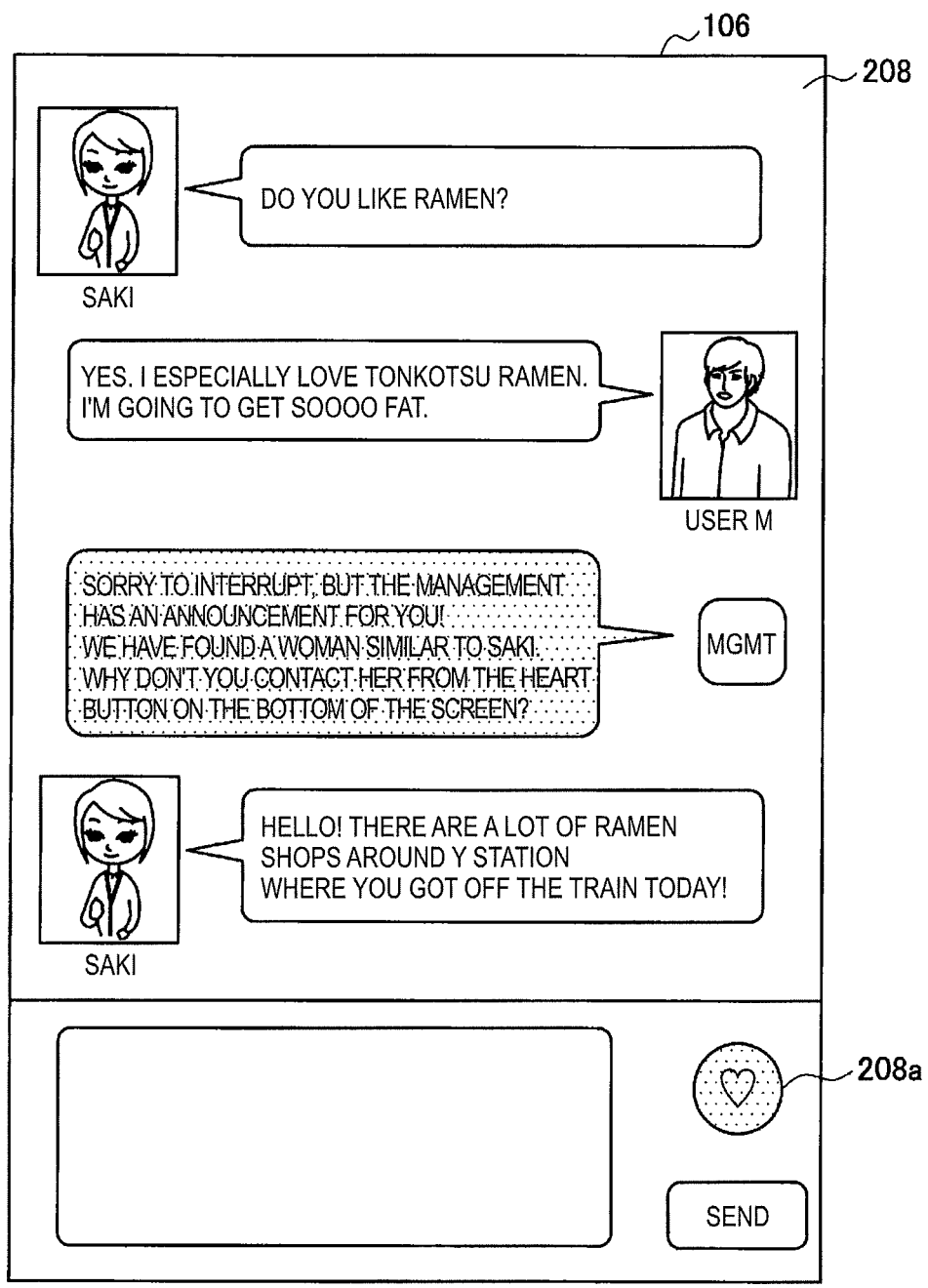
FIG. 43 is a diagram illustrating an example of a notification of introduction to a user according to the example.
Figure 44:
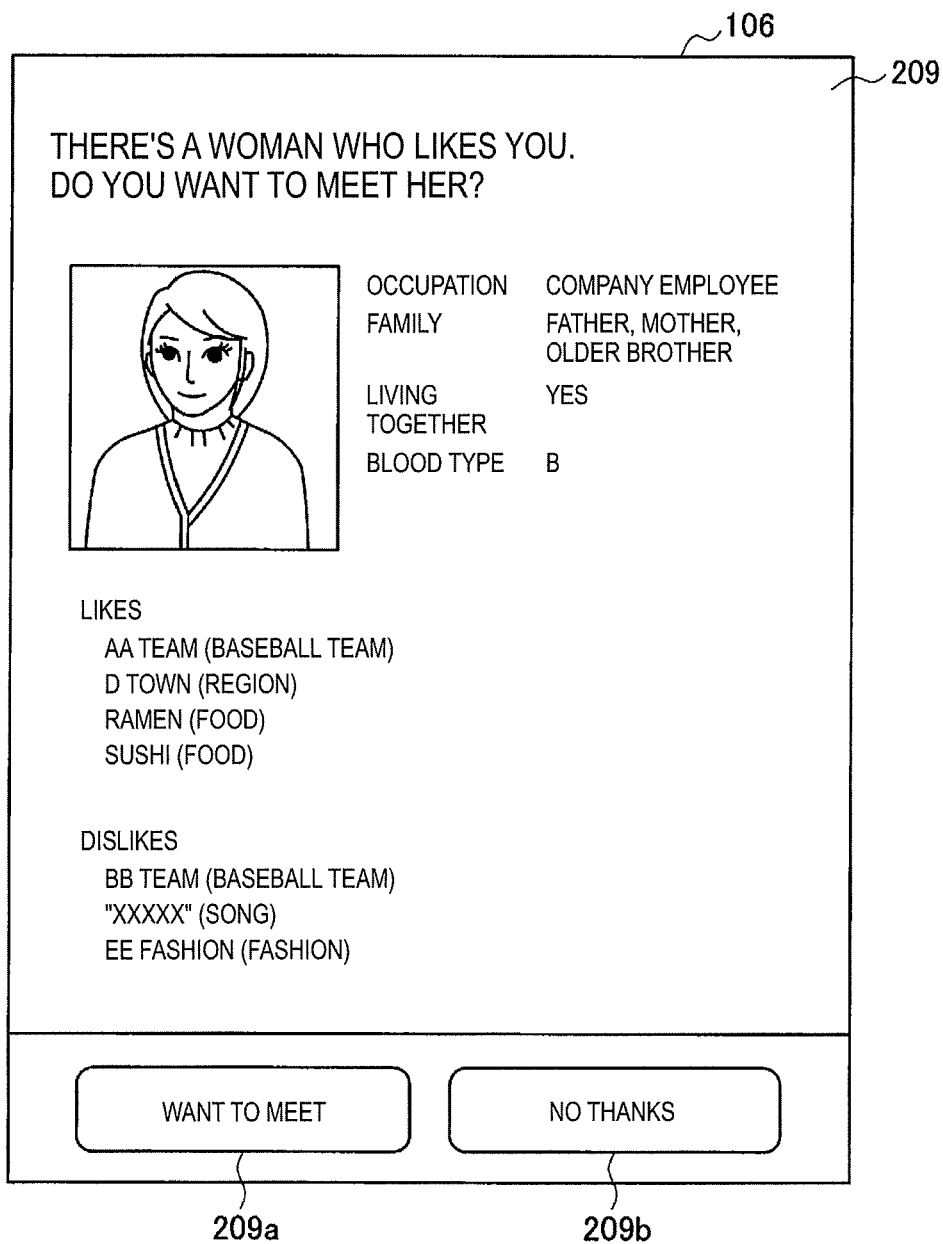
FIG. 44 is a diagram illustrating an example of a detailed information display screen of an introduced partner according to the example.

Next, the introduction phase of the example will be described with reference to FIGS. 42 to 44. In the introduction phase, the approval by the real person acts as a trigger, and the user side is notified of the existence of a person who can be introduced. The user knows of the existence of the real person from this point in time, and becomes able to see the profile. Note that the profile of the real person presented to the user side contains only the items with a public attribute of "Yes" in the basic information.

FIG. 42 is a flowchart illustrating an operating process in the introduction phase according to the example. As illustrated in FIG. 42, first, the user-to-introduce selection section 355 notifies the user of the existence of a person who can be introduced (step S663). FIG. 43 illustrates an example of the introduction notification. In the illustrated example, on a screen 208, a chat between the agent "Saki" and the user M is displayed. In the case in which the person P associated with the agent "Saki" has approved an introduction, the user-to-introduce selection section 355 interrupts with a message stating "Sorry to interrupt, but the management has an announcement for you! We have found a woman similar to Saki. Why don't you contact her from the heart button on the bottom of the screen?". Since the message is an interrupt announcement, the dialogue with the agent "Saki" is still continued. If the user M taps a heart button 208a displayed on the screen 208, detailed information about the introduced partner is displayed (step S666). FIG. 44 illustrates an example of a screen displaying detailed information about the introduced partner. In the illustrated example, on a screen 209, the profile of the introduced partner (person P), a Want to Meet button 209a, and a No Thanks button 209b are displayed (step S669).

Next, dialogue between the user and the person P through the agent is executed by chat or speech (step S672). The dialogue at this point is dialogue through the agent, in which the user does not yet hear the other person's voice directly, and instead utterances of the other person are output in the voice of the agent, or displayed as statements of the agent. The user learns the profile of the other person for the first time in the introduction phase, but since the matching between the user and the other person has been executed sufficiently by the processes up to the fixing phase, from the user side, the displayed profile information about the person P is similar to the preferences of the agent that the user has been in contact with so far, and in addition, the personality is also expected to be similar, thereby making it possible to transition to conversation with the person P with the same good impression. Also, from the person P (woman) side, since she is being introduced to a man who has already become good at conversation with the agent who is a representation of herself, the probability of liking the user is high. In this way, in the example, it becomes possible to make an introduction with an increased probability of a successful meeting.

Next, in the case in which either the user or the person P presses the "No Thanks" button (step S675/Yes), the matching with the person P is canceled. In the case in which the user selects a different agent (step S678/Yes), the agent learning section 353 removes the agent (step S681), and restarts the process from the agent selection (steps S413 to S437) of the search phase.

Alternatively, in the case in which the user does not select a different agent (step S678/No), the process returns to the dialogue loop (steps S440 to S446) in the search phase while keeping the current agent (in the state of canceled matching with the person P), and matching is executed again (at this time, the person P whose matching has been canceled may also be excluded for a fixed period).

Figure 45:
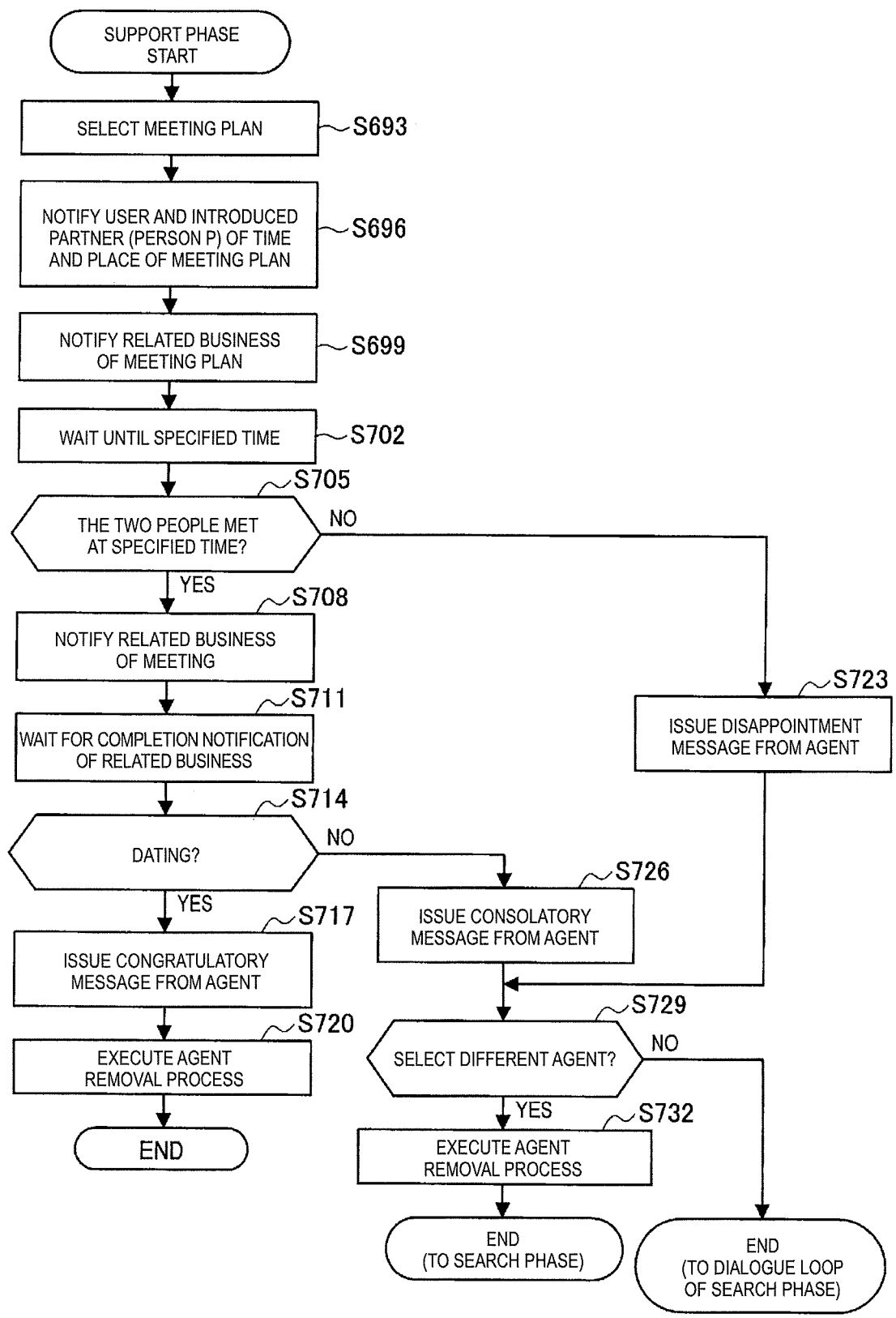
FIG. 45 is a flowchart illustrating an operating process in a support phase according to the example.

On the other hand, in the case in which both press the "Want to Meet" button (step S684/Yes), in the case in which the user desires support (step S685), the support phase illustrated in FIG. 45 is started. In the case in which support is not needed (step S685/Yes), the agent learning section 353 executes an agent removal process (a process of removing the agent program launched on the client terminal 1) (step S688). At this time, the user agent dialogue processing section 350 may also issue a greeting as described later with reference to FIG. 48 for the last time to execute a dialogue control by which the agent leaves the user. Also, in the case in which the support phase is not needed, the user decides a time and place to meet, exchanges contact information, and the like by dialogue with the person P through the agent.

(4-3-5. Support Phase)

Next, an example of the support phase will be described with reference to FIGS. 45 to 48. In the support phase, the user selects an arbitrary scenario (hereinafter also designated a "meeting plan") from a list of scenarios supporting a meeting registered in the scenario DB 359, and a meeting arrangement following the scenario is carried out by a related business. The scenario may also be fee-based.

Figure 46:
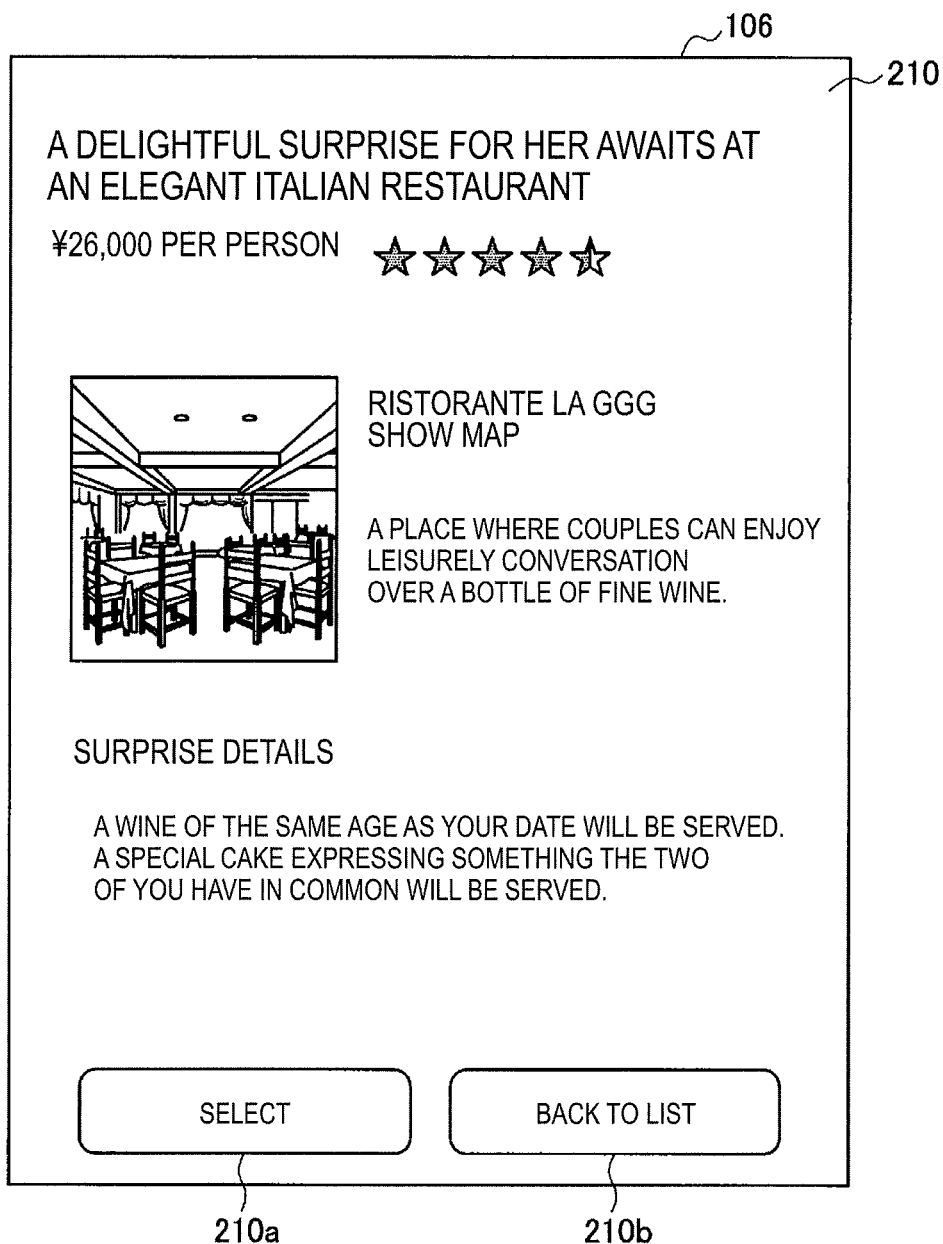
FIG. 46 is a diagram illustrating an example of a meeting plan selection screen according to the example.

FIG. 45 is a flowchart illustrating an operating process in the support phase according to the example. As illustrated in FIG. 45, first, the user selects an arbitrary plan from among multiple meeting plans presented by the scenario management section 358 (step S693). Herein, FIG. 46 illustrates an example of a meeting plan selection screen. In the illustrated example, on a screen 210, detailed information about a meeting plan, such as the title, content, and expenses, as well as a Select button 210a and a Back button 210b are displayed. The meeting plan has a title such as "A delightful surprise for her awaits at an elegant Italian restaurant", for example, and as for the surprise content, content such as preparing a special menu, preparing a special table, or preparing a present is stated. The restaurant or facility that appears in the meeting plan is tied in as an advertisement, for example, and even with a free meeting plan, an effect of attracting customers by guiding the user to the specific restaurant or facility may be expected. Additionally, a paid meeting plan may also be prepared to guide the user to a place that is unrelated to a sponsor.

When the user selects a meeting plan, the user and the person P are notified of the time and place of the meeting plan (step S696). Herein, FIG. 47 illustrates an example of a meeting plan notification screen. The left side of FIG. 47 illustrates a screen 211 displayed on the display section 106A of the client terminal 1 of the person P. On the screen 211, a message from the user M such as "I made a reservation here. I'm looking forward to meeting you!", detailed information about the meeting plan, an Accept button 211a, and a Decline button 211b are displayed. The person P checks the time, place, and the content of the plan, and taps the Accept button 211a if there are no problems, or taps the Decline button 211b in the case of declining the invitation.

Also, the right side of FIG. 47 illustrates a screen 212 displayed on the display section 106B of the client terminal 1 of the user M. On the screen 212, an indication that the person P has been invited, detailed information about the meeting plan, an OK button 212a, and a Start Over button 212b are displayed. The user M checks the time, place, and the content of the plan, and taps the OK button 212a if there are no problems, or taps the Start Over button 212b in the case of changing the time or plan.

Next, if both agree to the meeting plan, the scenario management section 358 notifies a related business (such as a restaurant or facility) of the meeting plan (step S699).

Next, the flow waits until the specified time (step S702), and when the specified time arrives, the scenario management section 358 checks whether or not the two people have met at the specified time and place (step S705). Whether or not the two people have actually met may be determined automatically from position information about the two people detected by GPS or the like, or a notification of meeting may be issued manually from the user M.

Next, in the case in which the two people have met at the specified time and place (step S705/Yes), the scenario management section 358 notifies the related business that the two people have met (step S708). Note that in the case of a restaurant, it is possible to ascertain explicitly that the two people of a reservation have arrived. Subsequently, the related business provides the content of the meeting plan to the two people.

Next, the scenario management section 358 waits for a completion notification from the related business (step S711), and upon receiving the completion notification, causes the agent to ask the user M if the two have decided to date (step S714). The timing of asking may also be after a fixed period has elapsed.

Next, in the case of dating (step S714/Yes), the user agent dialogue processing section 350 controls the dialogue to express a congratulatory message and have the agent leave (step S717). Herein, FIG. 48 illustrates an example of a final congratulatory message screen by the agent. In the illustrated example, on a screen 213, a message of the agent "Saki" asking the user M "Are you dating her?", a "We're Dating" button 213a, and a "It Didn't Work Out" button 213b are displayed. In the case of dating the person P, the user M taps the "We're Dating" button 213a. Subsequently, as illustrated on the right side of FIG. 48, on a screen 214, a final congratulatory message from the agent "Saki" such as "Oh . . . congratulations! I'm so happy for you. I mean, I'm a copy of her. My work here is done. You've come this far, so be happy. I have to go now. Goodbye." is displayed.

Subsequently, the agent learning section 353 executes the agent removal process (the process of removing the agent application launched on the client terminal 1) (step S720).

On the other hand, in the case in which the two people could not meet at the specified time (step S705/No), the user agent dialogue processing section 350 presents a message expressing disappointment from the agent to the user M (step S723).

Also, in the case of not dating (step S714/No), the user agent dialogue processing section 350 presents a message of consolation and encouragement from the agent to the user M (step S726).

Additionally, in the case in which the user selects a different agent (step S729/Yes), the agent learning section 353 removes the agent, and restarts the process from the agent selection (steps S413 to S437) of the search phase.

Alternatively, in the case in which the user does not select a different agent (step S729/No), the process returns to the dialogue loop (steps S440 to S446) in the search phase while keeping the current agent (in the state of canceled matching with the person P), and matching is executed again (at this time, the person P whose matching has been canceled may also be excluded for a fixed period).

<<5. Conclusion>>

As described above, the communication control system according to an embodiment of the present disclosure is able to connect dialogue with an agent seamlessly to communication with a person in the real world.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, ROM, and RAM built into the client terminal 1 or the agent server 2 described above to exhibit the functions of the client terminal 1 or the agent server 2. Also, a computer-readable storage medium storing the computer program is provided.

In addition, the embodiment described above illustrates a configuration in which various functions are realized by the agent server 2 on the Internet, but the present embodiment is not limited thereto, and at least part of the configuration of the agent server 2 may also be in the client terminal 1 (a smartphone, wearable terminal, or the like) of the user. Also, the entire configuration of the agent server 2 may be provided in the client terminal 1, and all processes may be executed on the client terminal 1.

Also, although the example described above describes a case of assuming a male user and introducing a female marriage-seeking member, obviously the above is also applicable to a case of assuming a female user and introducing a male marriage-seeking member.

Also, the technology is not limited to the matching of men and women using the marriage-seeking member information of a marriage consulting service, and is also applicable to friend matching (either for the same sex or the opposite sex) on an SNS using information registered in the SNS, for example. Alternatively, the technology is also applicable to matching between human resources and job seekers using job-seeking information.

In this way, the present embodiment is broadly applied to the matching of persons in a variety of contexts.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:
  a storage section that stores information about a plurality of agents capable of dialogue with a user, each agent having different attributes;
  a communication section that receives a message from the user from a client terminal, and also replies to the client terminal with a response message; and
  a control section that executes control to
    select a specific agent from the plurality of agents, according to an instruction from the user,
    record attributes of the specific agent updated according to dialogue between the specific agent and the user as the attributes of a user agent,
    specify a partner user who most resembles the attributes of the user agent by comparing the attributes of the user agent and attributes of a plurality of actually existing partner users, and
    notify the user of the existence of the partner user at a predetermined timing.

(2)

The information processing system according to (1), in which
  the control section
    records attributes of the specific agent updated to be closer to attributes of the user as the attributes of the user agent, and
    selects the partner user who most resembles the attributes of the user agent on a fixed interval, and in a case in which a same person is selected a predetermined number of times, specifies the person as the partner user.

(3)

The information processing system according to (1) or (2), in which
  the control section updates the attributes of the user agent according to the attributes of the partner user who most resembles the attributes of the user agent.

(4)

The information processing system according to any one of (2) to (3), in which
  when the partner user who most resembles the attributes of the user agent is the same for a fixed period, the attributes of the user agent are updated according to the attributes of the partner user.

(5)

The information processing system according to (4), in which
  the attributes of the plurality of actually existing partner users are acquired from an external apparatus.

(6)

The information processing system according to (4) or (5), in which
  if a closeness between the user and the user agent exceeds a threshold value, the control section notifies the user of the existence of the partner user.

(7)

The information processing system according to (6), in which
  the control section additionally notifies the partner user of the existence of the user.

(8)

The information processing system according to (7), in which
  if a request signal indicating a desire to meet is received from both the user and the partner user, the control section becomes able to provide a scenario of a meeting to the user.

(9)

The information processing system according to (8), in which
  if a notification indicating a commencement of a relationship with the partner user is received from the user, the control section executes control to transmit a congratulatory message to the user, and also to remove an agent application on the client terminal.

(10)

The information processing system according to any one of (1) to (9), in which
the attributes are at least one of profile information, preference information, personality information, ideal profile condition information, and ideal personality information.

(11)

An information processing apparatus including:
a communication section that transmits a message from a user to a server apparatus storing information about a plurality of agents capable of dialogue with the user, each agent having different attributes, and also receives a response message with respect to the message; and
a control section that executes control to
select a specific agent from the plurality of agents, according to an instruction by the user, and
receive, from the server apparatus through the communication section at a predetermined timing, a notification indicating an existence of an actually existing partner user who most resembles the attributes of a user agent obtained by updating the attributes of the specific agent according to dialogue between the specific agent and the user.

(12)

The information processing apparatus according to (11), in which
the control section receives, from the server apparatus, a notification of the existence of the partner user at a timing when it is determined that a closeness between the user and the user agent exceeds a threshold value.

(13)

The information processing apparatus according to (12), in which
the control section receives, from the server apparatus, a scenario of a meeting with the partner user.

(14)

The information processing apparatus according to (13), in which
the control section executes control to
transmit, to the server apparatus, a notification indicating a commencement of a relationship with the partner user, according to an instruction of the user, and
receive, from the server apparatus in response to the notification indicating a commencement of a relationship, a congratulatory message and a control signal with an instruction for a removal of an agent application installed in the information processing apparatus, and remove the agent application according to the control signal.

(15)

The information processing apparatus according to any one of (11) to (14), in which
the attributes are at least one of profile information, preference information, personality information, ideal profile condition information, and ideal personality information.

(16)

An information processing method, executed by a processor, including:
storing, in a storage section, information about a plurality of agents capable of dialogue with a user, each agent having different attributes;
receiving a message from the user from a client terminal, and also replying by a communication section to the client terminal with a response message; and
executing control to
select a specific agent from the plurality of agents, according to an instruction from the user,
record attributes of the specific agent updated according to dialogue between the specific agent and the user as the attributes of a user agent,
specify a partner user who most resembles the attributes of the user agent by comparing the attributes of the user agent and attributes of a plurality of actually existing partner users, and
notify the user of the existence of the partner user at a predetermined timing.

(17)

A program causing a computer to function as:
a communication section that transmits a message from a user to a server apparatus storing information about a plurality of agents capable of dialogue with the user, each agent having different attributes, and also receives a response message with respect to the message; and
a control section that executes control to
select a specific agent from the plurality of agents, according to an instruction by the user, and
receive, from the server apparatus through the communication section at a predetermined timing, a notification indicating an existence of an actually existing partner user who most resembles the attributes of a user agent obtained by updating the attributes of the specific agent according to dialogue between the specific agent and the user.

REFERENCE SIGNS LIST 1 client terminal
2 agent server
30 dialogue processing section
300 dialogue processing section
310 question search section
320 response generation section
330 conversation DB
340 phoneme data acquisition section
30a dialogue processing section
31 basic dialogue processing section
32 character A dialogue processing section
33 person B dialogue processing section
34 person C dialogue processing section
35 matching section
350 user agent dialogue processing section
351 user/agent information management section 351
352 user information DB
353 agent learning section
354 user agent DB
355 user-to-introduce selection section
356 closeness computation section
357 introduction processing section
358 scenario management section
359 scenario DB
360 agent information DB
36 communication section
40 phoneme storage section
41 basic phoneme DB
42 character A phoneme DB
43 person B phoneme DB
44 person C phoneme DB
50 conversation DB generation section
60 phoneme DB generation section
70 advertisement insertion processing section 72 advertisement DB
80 feedback acquisition processing section
3 network
10 agent

The invention claimed is:
1. An information processing system, comprising:
a storage configured to store information about a plurality of agents capable of dialogue with a user, each agent having different attributes;
a communication interface configured to receive a message from the user from a client terminal; and also replies to the client terminal with a response message; and
a processor configured to:
 select a specific agent from the plurality of agents, according to an instruction from the user,
 receive information corresponding to a dialogue between the specific agent and the user,
 record attributes of the specific agent updated according to the dialogue between the specific agent and the user as attributes of a user agent,
 specify a partner user, among a plurality of actually existing partner users, who has attributes including personality information that have a similarity to the attributes of the user agent that exceeds a predetermined threshold value determined by comparing the attributes of the user agent and attributes of the plurality of actually existing partner users,
 update the attributes of the user agent to be similar to the attributes of the partner user based on the dialogue by determining a user positivity or negativity with respect to a certain phenomenon and causing the attributes of the user agent to be updated such that a determination result is reflected in the user agent, and
 notify the user of an existence of the partner user at a predetermined timing.

2. The information processing system according to claim 1, wherein
the processor is configured to:
 record the attributes of the specific agent updated to be closer to attributes of the user as e attributes of the user agent, and
 select the partner user on a fixed interval, and in a case in which a same person is selected a predetermined number of times, specify the person as the partner user.

3. The information processing system according to claim 2, wherein
when the partner user is the same for a fixed period, the attributes of the user agent are updated according to the attributes of the partner user.

4. The information processing system according to claim 3, wherein
the attributes of the plurality of actually existing partner users are acquired from an external apparatus.

5. The information processing system according to claim 3, wherein
if a closeness between the user and the user agent exceeds the predetermined threshold value, the processor is configured to notify the user of the existence of the partner user.

6. The information processing system according to claim 5, wherein
the processor is configured to further notify the partner user of an existence of the user.

7. The information processing system according to claim 6, wherein
if a request signal indicating a desire to meet is received from both the user and the partner user, the processor is configured to provide a scenario of a meeting to the user.

8. The information processing system according to claim 7, wherein
if a notification indicating a commencement of a relationship with the partner user is received from the user, the processor is configured to control to transmit a congratulatory message to the user, and to remove an agent application on the client terminal.

9. The information processing system according to claim 1, wherein
the attributes further include at least one of profile information, preference information, ideal profile condition information, and ideal personality information.

10. An information processing apparatus, comprising:
a communication interface configured to transmit a message from a user to a server apparatus storing information about a plurality of agents capable of dialogue with the user, each agent having different attributes, and receives a response message with respect to the message; and
a processor configured to:
 select a specific agent from the plurality of agents, according to an instruction by the user, and
 receive, from the server apparatus through the communication interface at a predetermined timing, a notification indicating an existence of an actually existing partner user, among a plurality of actually existing partner users, who has attributes including personality information that have a similarity to attributes of a user agent that exceeds a predetermined threshold value determined by comparing the attributes of the user agent and attributes of the plurality of actually existing partner users, obtained by updating attributes of the specific agent according to a dialogue between the specific agent and the user and then by updating the attributes of the user agent to be similar to the attributes of the actually existing partner user based on the dialogue by determining a user positivity or negativity with respect to a certain phenomenon and causing the attributes of the user agent to be updated such that a determination result is reflected in the user agent.

11. The information processing apparatus according to claim 10, wherein
the processor is configured to receive, from the server apparatus, the notification of the existence of the actually existing partner user at a timing when it is determined that a closeness between the user and the user agent exceeds the predetermined threshold value.

12. The information processing apparatus according to claim 11, wherein
the processor is configured to receive, from the server apparatus, a scenario of a meeting with the actually existing partner user.

13. The information processing apparatus according to claim 12, wherein
the processor is configured to:
 transmit, to the server apparatus, a notification indicating a commencement of a relationship with the actually existing partner user, according to an instruction of the user, and receive, from the server apparatus in response to the notification indicating the commencement of the relationship, a congratulatory message and a control signal with an instruction for a removal of an agent application installed in the information processing apparatus, and remove the agent application according to the control signal.

14. The information processing apparatus according to claim 10, wherein
the attributes are at least one of profile information, preference information, ideal profile condition information, and ideal personality information.

15. An information processing method, executed by a processor, comprising:
storing, in a storage, information about a plurality of agents capable of dialogue with a user, each agent having different attributes;
receiving a message from the user from a client terminal, and replying by a communication interface to the client terminal with a response message;
selecting a specific agent from the plurality of agents, according to an instruction from the user;
receiving information corresponding to a dialogue between the specific agent and the user;
recording attributes of the specific agent updated according to the dialogue between specific agent and the user as attributes of a user agent;
specifying a partner user, among a plurality of actually existing partner users, who has attributes including personality information that have a similarity to the attributes of the user agent that exceeds a predetermined threshold value determined by comparing the attributes of the user agent and attributes of the plurality of actually existing partner users,
updating the attributes of the user agent to be similar to the attributes of the partner user based on the dialogue by determining a user positivity or negativity with respect to a certain phenomenon and causing the attributes of the user agent to be updated such that a determination result is reflected in the user agent; and notifying the user of an existence of the partner user at a predetermined timing.

16. A non-transitory computer readable medium storing instructions which when executed by a processor cause the processor to perform a method, the method comprising:
transmitting a message from a user to a server apparatus storing information about a plurality of agents capable of dialogue with the user, each agent having different attributes, and receiving a response message with respect to the message;
selecting a specific agent from the plurality of agents, according to an instruction by the user; and
receiving, from the server apparatus through a communication interface at a predetermined timing, a notification indicating an existence of an actually existing partner user, among a plurality of actually existing partner users, who has attributes including personality information that have a similarity to attributes of a user agent that exceeds a predetermined threshold value determined by comparing the attributes of the user agent and attributes of the plurality of actually existing partner users, obtained by updating attributes of the specific agent according to a dialogue between the specific agent and the user and then by updating the attributes of the user agent to be similar he attributes of the actually existing partner user based on the dialogue by determining a user positivity or negativity with respect to a certain phenomenon and causing the attributes of the user agent to be updated such that a determination result is reflected in the user agent.

17. The information processing system according to claim 1, wherein
the attributes of the specific agent, the attributes of the user agent, the attributes of the plurality of actually existing partner users, the attributes of the partner user, and attributes of the user are the same type of information including at least one of profile information, preference information, personality information, ideal profile condition information, and ideal personality information.

* * * * *